(12) United States Patent
Cleary et al.

(10) Patent No.: US 12,122,714 B2
(45) Date of Patent: Oct. 22, 2024

(54) GLASS WITH UNIQUE FRACTURE BEHAVIOR FOR VEHICLE WINDSHIELD

(71) Applicant: CORNING INCORPORATED, Corning, NY (US)

(72) Inventors: Thomas Michael Cleary, Elmira, NY (US); Timothy Michael Gross, Painted Post, NY (US); Jingshi Wu, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 42 days.

(21) Appl. No.: 17/957,837

(22) Filed: Sep. 30, 2022

(65) Prior Publication Data

US 2023/0110099 A1    Apr. 13, 2023

Related U.S. Application Data

(63) Continuation-in-part of application No. 17/363,266, filed on Jun. 30, 2021, now Pat. No. 11,951,713, and (Continued)

(51) Int. Cl.
    *C03C 3/091* (2006.01)
    *C03C 3/087* (2006.01)
    (Continued)

(52) U.S. Cl.
    CPC ............. *C03C 3/087* (2013.01); *C03C 3/089* (2013.01)

(58) Field of Classification Search
    CPC .................................. C03C 3/087; C03C 3/089
    See application file for complete search history.

(56) References Cited

U.S. PATENT DOCUMENTS

| 1,623,301 A | 4/1927 | Brenner |
| 3,640,738 A | 2/1972 | Detweiler, Jr. et al. |
| (Continued) | | |

FOREIGN PATENT DOCUMENTS

| CA | 2384781 A1 | 2/2002 |
| CH | 357158 A | 9/1961 |
| (Continued) | | |

OTHER PUBLICATIONS

Espe W., Tekhnologiya Elektrovakuumnykh Materialov, Tom 2, Energiya, Moskva, 1968, 3 pages.
(Continued)

*Primary Examiner* — Laura A Auer
(74) *Attorney, Agent, or Firm* — William M. Johnson; Russell S. Magaziner

(57) ABSTRACT

Disclosed herein are embodiments of a borosilicate glass composition comprising $B_2O_3$ in an amount greater than or equal to 11 mol % and less than or equal to 16 mol %; $Al_2O_3$ in an amount greater than or equal to 2 mol % and less than or equal to 5 mol %; one or more alkali metal oxides; one or more alkaline earth metal oxides; a total amount of $Na_2O$, $K_2O$, MgO, and CaO that is greater than or equal to 7.0 mol %°. Amounts of $SiO_2$, $B_2O_3$, the one or more alkali metal oxides, $Al_2O_3$, and the one or more alkaline earth metal oxides, satisfy: $(R_2O+R'O) \geq Al_2O_3$, and $0.80 < (1-[(2R_2O+2R'O)/(SiO_2+2Al_2O_3+2B_2O_3)]) < 0.93$, where $R_2O$ and $R'O$ are sums sum of the concentrations of the one or more alkali metal oxides and the one or more alkaline earth metal oxides, respectively.

30 Claims, 27 Drawing Sheets

Related U.S. Application Data a continuation-in-part of application No. PCT/US2021/061966, filed on Dec. 6, 2021.

(60) Provisional application No. 63/123,863, filed on Dec. 10, 2020, provisional application No. 63/183,292, filed on May 3, 2021, provisional application No. 63/183,271, filed on May 3, 2021.

(51) Int. Cl.
    *C03C 3/089*      (2006.01)
    *C03C 3/097*      (2006.01)
    *C03C 4/18*      (2006.01)

(56) References Cited

U.S. PATENT DOCUMENTS

| | | |
|---|---|---|
| 4,259,118 A | 3/1981 | Sack |
| 4,298,389 A | 11/1981 | Johnson et al. |
| 4,565,791 A | 1/1986 | Boudot et al. |
| 4,870,034 A | 9/1989 | Kiefer |
| 5,292,690 A | 3/1994 | Kawachi et al. |
| 5,591,683 A | 1/1997 | Stempin et al. |
| 5,605,869 A | 2/1997 | Mangat et al. |
| 5,633,090 A | 5/1997 | Rodek et al. |
| 5,656,558 A | 8/1997 | Brix et al. |
| 5,747,399 A | 5/1998 | Kosokabe et al. |
| 5,763,343 A | 6/1998 | Brix et al. |
| 5,858,897 A | 1/1999 | Maeda et al. |
| 6,204,212 B1 | 3/2001 | Kunert et al. |
| 6,284,686 B1 | 9/2001 | Marlor |
| 6,297,182 B1 | 10/2001 | Maeda et al. |
| 6,313,052 B1 | 11/2001 | Nakashima et al. |
| 6,500,778 B1 | 12/2002 | Maeda et al. |
| 6,794,323 B2 | 9/2004 | Peuchert et al. |
| 7,462,411 B2 | 12/2008 | Ikenishi et al. |
| 7,595,273 B2 | 9/2009 | Ikenishi et al. |
| 7,760,977 B2 | 7/2010 | Curdt et al. |
| 7,767,607 B2 | 8/2010 | Kurachi et al. |
| 7,803,472 B2 | 9/2010 | Nagai et al. |
| 7,892,999 B2 | 2/2011 | Nagai et al. |
| 8,168,313 B2 | 5/2012 | Endo et al. |
| 8,283,269 B2 | 10/2012 | Fechner et al. |
| 8,349,454 B2 | 1/2013 | Murata et al. |
| 8,349,751 B2 | 1/2013 | Nagai et al. |
| 8,394,516 B2 | 3/2013 | Matsumoto et al. |
| 8,563,149 B2 | 10/2013 | Nagashima et al. |
| 8,652,979 B2 | 2/2014 | Murata |
| 8,697,592 B2 | 4/2014 | Ikenishi et al. |
| 8,715,829 B2 | 5/2014 | Akiba et al. |
| 8,791,036 B2 | 7/2014 | Tsujimura et al. |
| 8,916,487 B2 | 12/2014 | Kawai et al. |
| 9,007,878 B2 | 4/2015 | Matsumoto et al. |
| 9,120,697 B2 | 9/2015 | Fiorentini et al. |
| 9,346,708 B2 | 5/2016 | Drake et al. |
| 9,724,727 B2 | 8/2017 | Domey et al. |
| 9,831,392 B2 | 11/2017 | Shiratori et al. |
| 10,307,992 B2 | 6/2019 | Lestringant et al. |
| 11,028,008 B2 | 6/2021 | Gross et al. |
| 11,339,084 B2 | 5/2022 | Gross et al. |
| 2002/0147102 A1 | 10/2002 | Yamazaki et al. |
| 2007/0213195 A1 | 9/2007 | Hikata et al. |
| 2009/0023575 A1 | 1/2009 | Fujita et al. |
| 2009/0141478 A1 | 6/2009 | Niguma et al. |
| 2010/0093510 A1 | 4/2010 | Tanaka et al. |
| 2012/0141804 A1 | 6/2012 | Miyabe et al. |
| 2013/0186141 A1 | 7/2013 | Henry |
| 2013/0225389 A1 | 8/2013 | Dick et al. |
| 2013/0302617 A1 | 11/2013 | Akiba et al. |
| 2013/0306145 A1 | 11/2013 | Hanawa et al. |
| 2014/0011035 A1 | 1/2014 | Senshu et al. |
| 2014/0099501 A1* | 4/2014 | Yamamoto .......... C03C 3/083 428/335 |
| 2015/0051061 A1 | 2/2015 | Kiczenski et al. |
| 2015/0068595 A1 | 3/2015 | Kuroiwa et al. |
| 2015/0166402 A1 | 6/2015 | Muguruma et al. |
| 2015/0368146 A1 | 12/2015 | Ellison et al. |
| 2016/0002103 A1 | 1/2016 | Wang et al. |
| 2016/0002104 A1 | 1/2016 | Lehuede et al. |
| 2016/0225396 A1 | 8/2016 | Shimojima |
| 2016/0276544 A1 | 9/2016 | Shiratori et al. |
| 2017/0183255 A1 | 6/2017 | Walther et al. |
| 2017/0283302 A1 | 10/2017 | Choju et al. |
| 2018/0154615 A1 | 6/2018 | Dohn et al. |
| 2018/0237326 A1 | 8/2018 | Fredholm |
| 2019/0352217 A1 | 11/2019 | Lautenschlger et al. |
| 2019/0382303 A1 | 12/2019 | Grimm et al. |
| 2020/0048139 A1 | 2/2020 | Schaut et al. |
| 2020/0171800 A1 | 6/2020 | Cleary et al. |
| 2020/0317559 A1 | 10/2020 | Fan et al. |
| 2020/0407266 A1 | 12/2020 | Suzuki |
| 2021/0108077 A1 | 4/2021 | Berleue et al. |
| 2021/0188696 A1 | 6/2021 | Grimm et al. |
| 2021/0221731 A1 | 7/2021 | Botu et al. |
| 2021/0276915 A1 | 9/2021 | Ritter et al. |
| 2022/0177353 A1 | 6/2022 | Kruger et al. |
| 2022/0184926 A1 | 6/2022 | Cleary et al. |
| 2022/0371940 A1 | 11/2022 | Suzuki et al. |
| 2022/0396522 A1 | 12/2022 | Aaldenberg et al. |
| 2023/0002270 A1 | 1/2023 | Lautenschlger et al. |
| 2023/0071964 A1 | 3/2023 | Li et al. |
| 2023/0083077 A1 | 3/2023 | Nagano |
| 2023/0331622 A1 | 10/2023 | Kado et al. |

FOREIGN PATENT DOCUMENTS

| | | |
|---|---|---|
| CN | 102892722 A | 1/2013 |
| CN | 104024170 A | 9/2014 |
| CN | 103459337 B | 11/2015 |
| CN | 106687422 A | 5/2017 |
| CN | 106715349 A | 5/2017 |
| CN | 110615612 A | 12/2019 |
| CN | 112694254 A | 4/2021 |
| EP | 1743875 A1 | 1/2007 |
| EP | 2617690 A1 | 7/2013 |
| EP | 2796288 A1 | 10/2014 |
| ES | 0424354 A1 | 2/1977 |
| GB | 0782620 A | 9/1957 |
| GB | 1454335 A | 11/1976 |
| JP | 57-191253 A | 11/1982 |
| JP | 01-286936 A | 11/1989 |
| JP | 09-124338 A | 5/1997 |
| JP | 11-180728 A | 7/1999 |
| JP | 11-310433 A | 11/1999 |
| JP | 11-335133 A | 12/1999 |
| JP | 2000-226233 A | 8/2000 |
| JP | 2001-180967 A | 7/2001 |
| JP | 2003-054984 A | 2/2003 |
| JP | 2003-292339 A | 10/2003 |
| JP | 2004-051473 A | 2/2004 |
| JP | 2005-089286 A | 4/2005 |
| JP | 2005-162600 A | 6/2005 |
| JP | 2005-255520 A | 9/2005 |
| JP | 2006-096594 A | 4/2006 |
| JP | 2006-137631 A | 6/2006 |
| JP | 2006-143523 A | 6/2006 |
| JP | 2006-344927 A | 12/2006 |
| JP | 4074731 B2 | 4/2008 |
| JP | 2008-115071 A | 5/2008 |
| JP | 4219343 B2 | 2/2009 |
| JP | 2011-037683 A | 2/2011 |
| JP | 2014-169209 A | 9/2014 |
| JP | 2015-231936 A | 12/2015 |
| SU | 394331 A1 | 8/1973 |
| SU | 482402 A1 | 8/1975 |
| SU | 521238 A1 | 7/1976 |
| SU | 562519 A1 | 6/1977 |
| SU | 863518 A1 | 9/1981 |
| TW | 202000619 A | 1/2020 |
| WO | 98/49111 A1 | 11/1998 |
| WO | 2010/055891 A1 | 5/2010 |
| WO | 2011/025316 A2 | 3/2011 |
| WO | 2011/125316 A1 | 10/2011 |
| WO | 2012/017694 A1 | 2/2012 |

(56) References Cited

FOREIGN PATENT DOCUMENTS

| | | |
|---|---|---|
| WO | 2013/047246 A1 | 4/2013 |
| WO | 2014/203481 A1 | 12/2014 |
| WO | 2015/029902 A1 | 3/2015 |
| WO | 2015/195435 A2 | 12/2015 |
| WO | 2017/070500 A1 | 4/2017 |
| WO | 2018/178883 A1 | 10/2018 |
| WO | 2018/213210 A1 | 11/2018 |
| WO | 2019/038723 A1 | 2/2019 |
| WO | 2019/119341 A1 | 6/2019 |
| WO | 2019/130285 A1 | 7/2019 |
| WO | 2019/181207 A1 | 9/2019 |
| WO | 2019/198363 A1 | 10/2019 |
| WO | 2021/090631 A1 | 5/2021 |
| WO | 2021/102163 A1 | 5/2021 |
| WO | 2021/238475 A1 | 12/2021 |
| WO | 2022/026348 A1 | 2/2022 |
| WO | 2022/076566 A2 | 4/2022 |
| WO | 2022/125400 A1 | 6/2022 |
| WO | 2022/145281 A1 | 7/2022 |
| WO | 2022/155028 A1 | 7/2022 |
| WO | 2022/168964 A1 | 8/2022 |
| WO | 2022/177797 A1 | 8/2022 |
| WO | 2022/225765 A1 | 10/2022 |
| WO | 2023/276922 A1 | 1/2023 |

OTHER PUBLICATIONS

Fujita K., "Crack resistance of glass on Vickers identation", Proc. Xth Intern.Congr.on Glass, Kyoto, 1974, No. 11, pp. 39-46.

Gross et al., "Crack-resistant glass with high shear band density", In Journal of Non-Crystalline Solids, vol. 494, 2018, pp. 13-20.

Gross, "Deformation and cracking behavior of glasses indented with diamond tips of various sharpness", In Journal of Non-Crystalline Solids, vol. 358, 2012, pp. 3445-3452.

Volf M.B., Technical Approach to Glass, 1990, pp. 320-324.

* cited by examiner

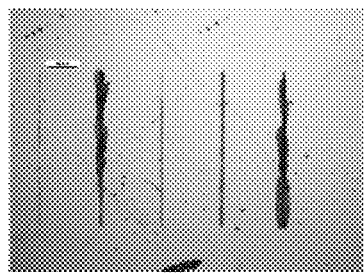 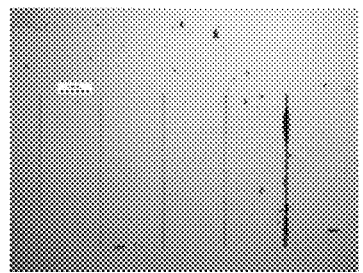 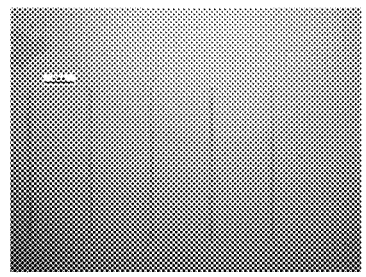
FIG. 18A FIG. 18B FIG. 18C
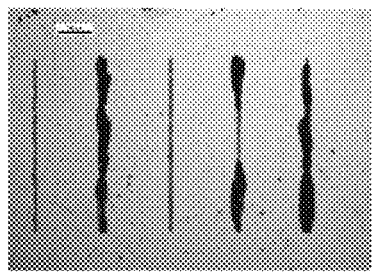 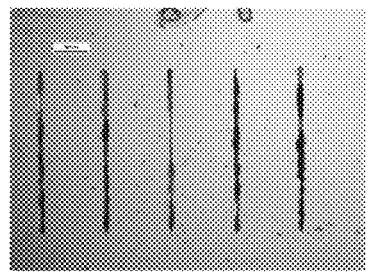 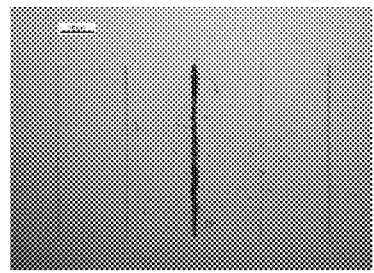
FIG. 19A FIG. 19B FIG. 19C

GLASS WITH UNIQUE FRACTURE BEHAVIOR FOR VEHICLE WINDSHIELD

PRIORITY

This Application is a continuation-in-part of U.S. application Ser. No. 17/363,266, filed Jun. 30, 2021, which claims the benefit of U.S. Application Nos. 63/123,863 filed Dec. 10, 2020, and 63/183,292 filed May 3, 2021, and 63/183,271 filed May 3, 2021. This Application is also a continuation-in-part of International Patent Application No. PCT/US2021/061966 filed Dec. 6, 2021, which claims the benefit of U.S. Application No. 63/123,863 filed Dec. 10, 2020, 63/183,292 filed May 3, 2021, 63/183,271 filed May 3, 2021, and is a continuation-in-part of Ser. No. 17/363,266 filed Jun. 30, 2021. This Application also claims benefit of U.S. Application No. 63/286,270 filed Dec. 6, 2021, and 63/341,603 filed May 13, 2022. The entirety of each of these applications is incorporated by reference herein.

BACKGROUND

The disclosure relates to glass compositions and glass articles made therefrom, and more particularly to borosilicate glass compositions capable of being fusion formed at relatively large thicknesses and glass articles made therefrom.

Glass is used in windows due to its optical clarity and durability. Automotive and architectural windows may include a single glass ply or a laminate that includes two glass plies with an interlayer of a polymeric material disposed in between. For automotive applications in particular, there is a trend toward using laminates for improved fuel economy and/or impact performance. Certain laminate designs may utilize a thicker outer glass ply and a thin inner glass ply. For example, the thicker glass ply may be a soda-lime glass, which is susceptible to thermal shock and to cracking upon impact by, e.g., a rock or other debris thrown from a roadway. Accordingly, there is a need for improved glasses for use as a thicker outer glass ply in a laminate.

SUMMARY

According to an aspect, embodiments of the present disclosure relate to a borosilicate glass composition. Unless otherwise specified, the glass compositions disclosed herein are described in mole percent (mol %) as analyzed on an oxide basis. In one or more embodiments, the borosilicate glass composition includes at least 74 mol % $SiO_2$, at least 10 mol % $B_2O_3$, and $Al_2O_3$ in an amount such that sum of $SiO_2$, $B_2O_3$, and $Al_2O_3$ is at least 90 mol %. In one or more embodiments, the borosilicate glass composition has a liquidus viscosity of greater than 500 kP. In one or more embodiments, the borosilicate glass composition has a temperature at which a viscosity of the borosilicate glass composition is 200 P of 1725° C. or less.

According to another aspect, embodiments of the present disclosure relate to a glass ply. The glass ply has a first major surface and a second major surface opposite to the first major surface. The glass ply is made of one or more embodiments of the borosilicate glass composition as described herein.

According to still another aspect, embodiments of the present disclosure relate to a laminate. The laminate includes a first glass ply according to one or more embodiments of the glass ply described herein. The laminate also includes a second glass ply and an interlayer bonding the first glass ply to the second glass ply.

According to yet another aspect, embodiments of the present disclosure relate to an automotive glazing. The automotive glazing is made from the laminate according to the previously described laminate.

According to a further aspect, embodiments of the present disclosure relate to a vehicle. The vehicle includes a body defining an interior of the vehicle and at least one opening and the automotive glazing as described disposed in the at least one opening. In the vehicle, the second glass ply is arranged facing the interior of the vehicle, and the first glass ply faces an exterior of the vehicle. In one or more embodiments, the first glass ply is arranged facing the interior of the vehicle and the second glass ply faces an exterior of the vehicle.

According to still a further aspect, embodiments of the present disclosure relate to a method of forming a glass ply. The glass ply has a first major surface and a second major surface. In the method, a trough in an isopipe is overflowed with at least two streams of a borosilicate glass composition having a liquidus viscosity of greater than 500 kP and a temperature at which the viscosity of the glass composition is 200 P of less than 1725° C. In one or more embodiments, the borosilicate glass composition includes at least 74 mol % $SiO_2$ and at least 10 mol % of $B_2O_3$. Further, in one or more embodiments, the composition includes a combined amount of $SiO_2$, $B_2O_3$, and $Al_2O_3$ is at least 90 mol %. In one or more embodiments of the method, the at least two streams of the borosilicate glass composition are fused at a root of the isopipe to form the glass ply having a thickness of at least 2 mm between the first major surface and the second major surface.

According to yet another aspect, embodiments of the present disclosure relate to a glass ply. The glass ply has a first major surface and a second major surface opposite to the first major surface. The glass ply is made of a borosilicate glass composition. When the glass ply is subjected to a quasi-static 2 kgf indentation load with a Vickers tip, the glass ply exhibits a ring crack and a plurality of radial cracks, and each radial crack of the plurality of radial cracks is bounded by the ring crack.

According to still yet another aspect, embodiments of the present disclosure relate to a glass laminate. The glass laminate includes a first glass ply, a second glass ply, and an interlayer. The first glass ply has a first major surface and a second major surface opposite to the first major surface. The first glass ply is made of a borosilicate glass composition. The second glass ply has a third major surface and a fourth major surface opposite to the third major surface. The interlayer bonds the second major surface of the first glass ply to the third major surface of the second glass ply. The borosilicate glass composition includes at least 74 mol % $SiO_2$, at least 10 mol % $B_2O_3$, and $Al_2O_3$ in an amount such that sum of $SiO_2$, $B_2O_3$, and $Al_2O_3$ is at least 90 mol %.

According to a still further embodiment, embodiments of the present disclosure relate to a system including a sensor and a glass laminate. The glass laminate includes a first glass ply having a first major surface and a second major surface opposite to the first major surface. The first glass ply is made of a borosilicate glass composition. The glass laminate includes a second glass ply having a third major surface and a fourth major surface opposite to the third major surface. An interlayer bonds the second major surface of the first glass ply to the third major surface of the second glass ply. The borosilicate glass composition includes at least 74 mol % $SiO_2$, at least 10 mol % $B_2O_3$, and $Al_2O_3$ in an amount such that sum of $SiO_2$, $B_2O_3$, and $Al_2O_3$ is at least 90 mol %. The sensor is configured to receive, transmit, or both receive and transmit signals through the glass laminate, and the signals have a peak wavelength in a range of 400 nm to 750 nm or a range of 1500 nm or greater.

According to a still further embodiment, embodiments of the present disclosure relate to a glass laminate. The glass laminate includes a first glass ply having a first major surface and a second major surface opposite to the first major surface. The first glass ply is a fusion-formed borosilicate glass composition. The glass laminate also includes a second glass ply having a third major surface and a fourth major surface opposite to the third major surface. Further, the glass laminate includes an interlayer bonding the second major surface of the first glass ply to the third major surface of the second glass ply. Transmission of ultraviolet light having a wavelength in a range of 300-380 nm through the glass laminate is 75% or less. Transmission of light in the visible spectrum through the glass laminate is 73% or more, and total solar transmission through the glass laminate is 61% or less.

According to a still further embodiment, embodiments of the present disclosure relate to a glass composition made up of $SiO_2$ in an amount in a range from about 72 mol % to about 80 mol %, $Al_2O_3$ in an amount in a range from about 2.5 mol % to about 5 mol %, and $B_2O_3$ in an amount in a range from about 11.5 mol % to about 14.5 mol %. The glass composition has a liquidus viscosity of greater than 500 kP, and the glass composition has a temperature at which a viscosity of the borosilicate glass composition is 200 P of 1725° C. or less.

According to a still further embodiment, embodiments of the present disclosure relate to a glass composition made up of 74 mol % to 80 mol % of $SiO_2$, 2.5 mol % to 5 mol % of $Al_2O_3$, 11.5 mol % to 14.5 mol % $B_2O_3$, 4.5 mol % to 8 mol % $Na_2O$, 0.5 mol % to 3 mol % $K_2O$, 0.5 mol % to 2.5 mol % MgO, and 0 mol % to 4 mol % CaO.

According to a still further embodiment, embodiments of the present disclosure relate to borosilicate glass composition comprising $B_2O_3$ in an amount greater than or equal to 11 mol % and less than or equal to 16 mol %; $Al_2O_3$ in an amount greater than or equal to 2 mol % and less than or equal to 5 mol %; one or more alkali metal oxides; one or more alkaline earth metal oxides; a total amount of $Na_2O$, $K_2O$, MgO, and CaO that is greater than or equal to 7.0 mol %°. Amounts of $SiO_2$, $B_2O_3$, the one or more alkali metal oxides, $Al_2O_3$, and the one or more alkaline earth metal oxides, satisfy: $(R_2O+R'O) \geq Al_2O_3$, and $0.80 < (1-[(2R_2O+2R'O)/(SiO_2+2Al_2O_3+2B_2O_3)]) < 0.93$, where $R_2O$ and $R'O$ are sums sum of the concentrations of the one or more alkali metal oxides and the one or more alkaline earth metal oxides, respectively.

According to a still further embodiment, embodiments of the present disclosure relate to borosilicate glass composition comprising $SiO_2$ in an amount greater than or equal to 72 mol % and less than or equal to 85 mol %; $B_2O_3$ in an amount greater than or equal to 12 mol %; $Al_2O_3$ in an amount greater than or equal to 2 mol % and less than or equal to 5 mol %; one or more alkali metal oxides, including $Na_2O$ in an amount that is greater than or equal to 4 mol % and less than or equal to 8 mol % and greater than the amount of $Al_2O_3$; one or more alkaline earth metal oxides; a total amount of $Na_2O$, $K_2O$, MgO, and CaO that is greater than or equal to 7.0 mol %; an annealing point that is greater than or equal to 520° and less than or equal to 590°; and a strain point that is greater than or equal to 490° and less than or equal to 560°, wherein a viscosity of the borosilicate glass composition is 200 P at a temperature ($T_{200P}$) that is greater than or equal to 1525° C. and less than or equal to 1725° C.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. In the drawings:

FIG. 18A is an image of a sample constructed in accordance with a counter example composition described herein having scratches from a Knoop scratching test prior to weathering, according to exemplary embodiments.

FIG. 18B is an image of a sample constructed in accordance with a counter example composition described herein having scratches from a Knoop scratching test prior to weathering, according to exemplary embodiments.

FIG. 18C is an image of a sample constructed in accordance with an example composition described herein having scratches from a Knoop scratching test prior to weathering, according to exemplary embodiments.

FIG. 19A is an image of a sample constructed in accordance with a counter example composition described herein having scratches from a Knoop scratching test after weathering, according to exemplary embodiments.

FIG. 19B is an image of a sample constructed in accordance with a counter example composition described herein having scratches from a Knoop scratching test after weathering, according to exemplary embodiments.

FIG. 19C is an image of a sample constructed in accordance with an example composition described herein having scratches from a Knoop scratching test after weathering, according to exemplary embodiments.

DETAILED DESCRIPTION

Reference will now be made in detail to various embodiments, examples of which are illustrated in the accompanying drawings. Embodiments of the disclosure relate to a borosilicate glass composition that is able to be fusion formed or is fusion-formed to a glass ply having a thicknesses of at least 2 mm, in particular, at least 3 mm, at least 3.3 mm, or at least 3.8 mm. In embodiments, the borosilicate glass composition includes at least 74 mol % $SiO_2$, at least 10 mol % $B_2O_3$, and at least some $Al_2O_3$, and in embodiments, the total amount of $SiO_2$, $B_2O_3$, and $Al_2O_3$ is at least 90 mol %. The borosilicate glass compositions described herein exhibit a liquidus viscosity of at least 500 kiloPoise (kP) and a temperature ($T_{200P}$) at which the viscosity is 200 Poise (P) of 1725° C. or less.

Further, embodiments of the borosilicate glass composition disclosed herein are particularly suitable for use in laminates for automotive glazing applications. In one or more embodiments, the borosilicate glass composition is used as an outer ply in such laminates. As compared to conventional automotive glazings including soda-lime glass plies, the glass plies made of the disclosed borosilicate glass composition densify during deformation, helping prevent formation (initiation) or spread (propagation) of radial or median cracks that tend to compromise the strength of the glass ply. Further, the borosilicate glass composition disclosed herein is more resistant to thermal shock than soda-lime glass, which also helps to prevent crack initiation and propagation. These performance advantages can be useful when the borosilicate glass composition is used as an inner glass ply or an outer glass ply of a glass laminate. In some instances, these performance advantages are particularly useful when the borosilicate glass composition is used as an outer glass ply in a laminate. These and other aspects and advantages of the disclosed borosilicate glass composition and articles formed therefrom will be described more fully below. The embodiments discussed herein are presented by way of illustration and not limitation.

As used herein, the term "softening point" refers to the temperature at which the viscosity of the glass composition is $10^{7.6}$ poise.

Figure 1:
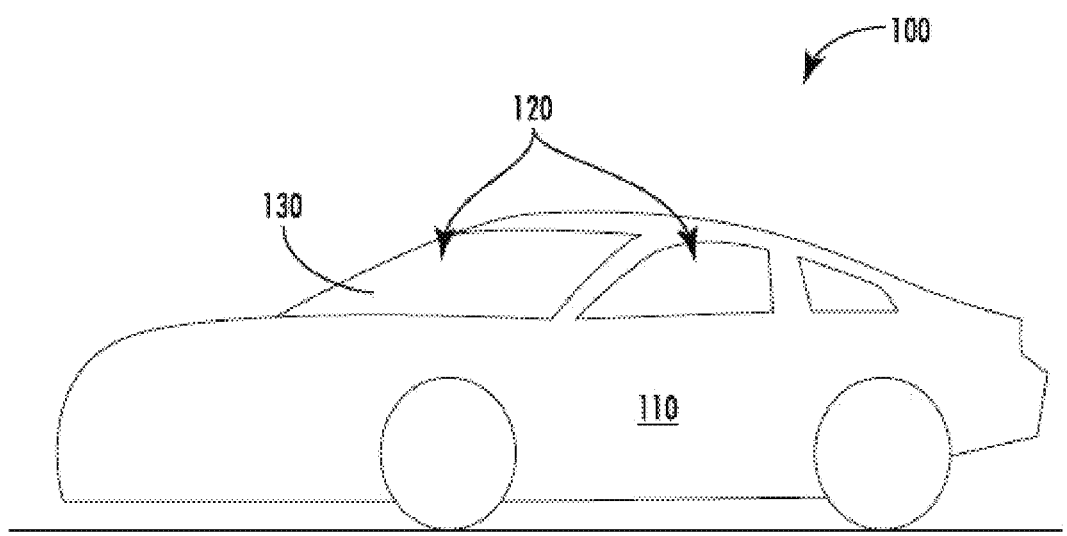
FIG. 1 is an illustration of a vehicle including a glass article or laminate according to one or more embodiments.

Embodiments to the borosilicate glass composition are described herein in relation to a vehicle 100 as shown in FIG. 1. The vehicle 100 includes a body 110 defining an interior and at least one opening 120 in communication with the interior. The vehicle 100 further includes an automotive glazing 130, i.e., window, disposed in the opening 120. The automotive glazing comprises at least one ply of the borosilicate glass composition described herein. The automotive glazing 130 may form at least one of the sidelights, windshield, rear window, windows, and sunroofs in the vehicle 100. In some embodiments, the automotive glazing 130 may form an interior partition (not shown) within the interior of the vehicle 100, or may be disposed on an exterior surface of the vehicle 100 and form, e.g., an engine block cover, headlight cover, taillight cover, door panel cover, or pillar cover. As used herein, vehicle includes automobiles (an example of which is shown in FIG. 1), rolling stock, locomotive, boats, ships, and airplanes, helicopters, drones, space craft, and the like. Further, while the present disclosure is framed in terms of a vehicle, the borosilicate glass composition may be used in other contexts, such as architectural glazing or bullet-resistant glazing applications.

Figure 2:
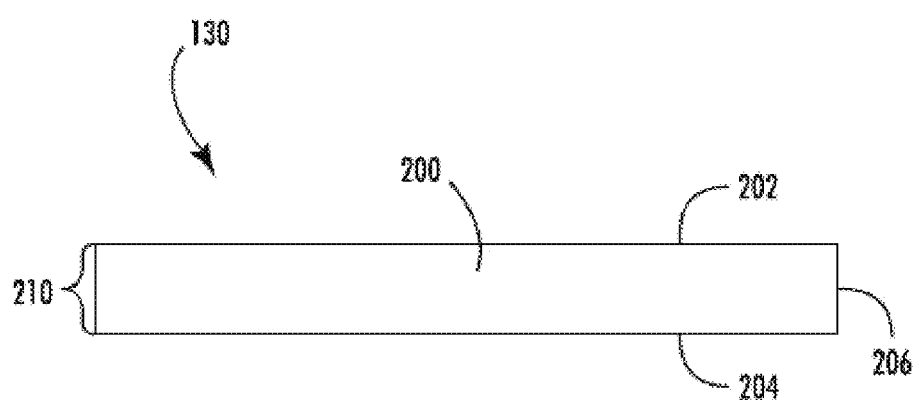
FIG. 2 is a side view illustration of a glass article according to one or more embodiments.

As shown in FIG. 2, in embodiments, the automotive glazing 130 includes at least one glass ply 200 comprising, consisting of or consisting essentially of the embodiments of the borosilicate glass composition described herein. In one or more embodiments, the automotive glazing 130 includes only a single glass ply 200 (i.e., the single glass ply is sometimes referred in the industry as a monolith). As can be seen in FIG. 2, the glass ply 200 has a first major surface 202 and a second major surface 204. The first major surface 202 is opposite to the second major surface 204. A minor surface 206 extends around the periphery of the glass ply 200 and connects the first major surface 202 and the second major surface 204.

A first thickness 210 is defined between the first major surface 202 and the second major surface 204. In embodiments, the first thickness 210 is at least 0.5 mm, at least 1 mm, at least 2 mm, at least 3 mm, at least 3.3 mm, or at least 3.8 mm. In one or more embodiments, the first thickness is in a range from about 0.1 mm to about 6 mm, 0.2 mm to about 6 mm, 0.3 mm to about 6 mm, 0.4 mm to about 6 mm, 0.5 mm to about 6 mm, 0.6 mm to about 6 mm, 0.7 mm to about 6 mm, 0.8 mm to about 6 mm, 0.9 mm to about 6 mm, 1 mm to about 6 mm, 1.1 mm to about 6 mm, 1.2 mm to about 6 mm, 1.3 mm to about 6 mm, 1.4 mm to about 6 mm, 1.5 mm to about 6 mm, 1.6 mm to about 6 mm, from about 1.8 mm to about 6 mm, from about 2 mm to about 6 mm, from about 2.2 mm to about 6 mm, from about 2.4 mm to about 6 mm, from about 2.6 mm to about 6 mm, from about 2.8 mm to about 6 mm, from about 3 mm to about 6 mm, from about 3.1 mm to about 6 mm, from about 3.2 mm to about 6 mm, from about 3.3 mm to about 6 mm, from about 3.4 mm to about 6 mm, from about 3.5 mm to about 6 mm, from about 3.6 mm to about 6 mm, from about 3.7 mm to about 6 mm, from about 3.8 mm to about 6 mm, from about 3.9 mm to about 6 mm, from about 4 mm to about 6 mm, from about 4.2 mm to about 6 mm, from about 4.4 mm to about 6 mm, from about 4.5 mm to about 6 mm, from about 4.6 mm to about 6 mm, from about 4.8 mm to about 6 mm, from about 5 mm to about 6 mm, from about 5.2 mm to about 6 mm, from about 5.4 mm to about 6 mm, from about 5.5 mm to about 6 mm, from about 5.6 mm to about 6 mm, from about 5.8 mm to about 6 mm, from about 1.6 mm to about 5.8 mm, from about 1.6 mm to about 5.6 mm, from about 1.6 mm to about 5.5 mm, from about 1.6 mm to about 5.4 mm, from about 1.6 mm to about 5.2 mm, from about 1.6 mm to about 5 mm, from about 1.6 mm to about 4.8 mm, from about 1.6 mm to about 4.6 mm, from about 1.6 mm to about 4.4 mm, from about 1.6 mm to about 4.2 mm, from about 1.6 mm to about 4 mm, from about 1.6 mm to about 3.9 mm, from about 1.6 mm to about 3.8 mm, from about 1.6 mm to about 3.7 mm, from about 1.6 mm to about 3.6 mm, from about 1.6 mm to about 3.5 mm, from about 1.6 mm to about 3.4 mm, from about 1.6 mm to about 3.3 mm, from about 1.6 mm to about 3.2 mm, from about 1.6 mm to about 3.1 mm, from about 1.6 mm to about 3 mm, from about 1.6 mm to about 2.8 mm, from about 1.6 mm to about 2.6 mm, from about 1.6 mm to about 2.4 mm, from about 1.6 mm to about 2.2 mm, from about 1.6 mm to about 2 mm, from about 1.6 mm to about 1.8 mm, from about 3 mm to about 5 mm, or from about 3 mm to about 4 mm. In other embodiments, the glass ply may be thinner than 2 mm or thicker than 6 mm.

In some embodiments, the glass ply may have curvature, such as rounded geometry or tubular, such as where the first major surface is an exterior and the second major surface is an interior surface of the tube. In some embodiments, a perimeter of the glass ply is generally rectilinear and in other embodiments the perimeter is complex. The first major surface may have apertures, slots, holes, bumps, dimples, or other geometry.

As will be discussed more fully below, in one or more embodiments, the glass ply 200 is a fusion-formed borosilicate glass composition having a liquidus viscosity of at least 500 kP and a $T_{200P}$ of 1725° C. or less.

Figure 3:
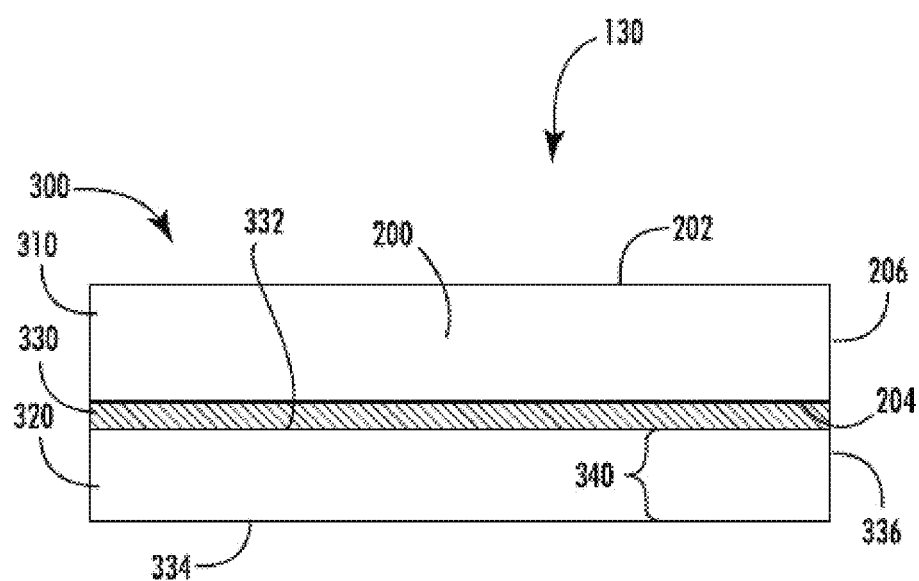
FIG. 3 is a side view illustration of a laminate including a glass article according to one or more embodiments.

FIG. 3 depicts an embodiment of the automotive glazing 130 in which the automotive glazing 130 is a laminate structure 300 including the glass ply 200 of FIG. 2 as a first glass ply 310. As referenced above, the glass ply 200 can comprise, consist of or consist essentially of an embodiment of the borosilicate glass composition described herein. In the embodiment shown in FIG. 3, the first glass ply 310 is joined to a second glass ply 320 by an interlayer 330. In particular, the second glass ply 320 has a third major surface 332 and a fourth major surface 334. The third major surface 332 is opposite to the fourth major surface 334. A minor surface 336 extends around the periphery of the second glass ply 320 and connects the third major surface 332 and the fourth major surface 334.

A second thickness 340 is defined between the third major surface 332 and the fourth major surface 334. In embodiments, the second thickness 340 is less than the first thickness 210 of the first glass ply 310. In embodiments, the second glass thickness is 2 mm or less. In embodiments, the total glass thickness (i.e., the first thickness 210 plus the second thickness 340) is 8 mm or less, 7 mm or less, 6.5 mm or less, 6 mm or less, 5.5 mm or less, or 5 mm or less. In embodiments, the lower limit of the total glass thickness is about 2 mm.

In embodiments, the second glass ply 320 comprises a glass composition that is different from the borosilicate glass composition of the first glass ply 310. In embodiments, the second glass composition comprises a soda lime silicate composition, an aluminosilicate glass composition, an alkali aluminosilicate glass composition, an alkali containing borosilicate glass composition, an alkali aluminophosphosilicate glass composition, or an alkali aluminoborosilicate glass composition.

Further, in embodiments, the first glass ply 310 and/or the second glass ply 320 may be strengthened. For example, the first glass ply 310 and/or the second glass ply 320 may be thermally, chemically and/or mechanically strengthened. In particular, in embodiments, the first glass ply 310 and/or the second glass ply 320 is chemically strengthened through an ion-exchange treatment. In one or more embodiments, the first glass ply 310 and/or the second glass ply 320 is mechanically strengthened by utilizing a mismatch of the coefficient of thermal expansion between portions of the ply to create a compressive stress region and a central region exhibiting a tensile stress. In some embodiments, the first glass ply 310 and/or the second glass ply 320 may be strengthened thermally by heating the glass ply to a temperature above the glass transition point and then rapidly quenching. In some embodiments, various combinations of chemical, mechanical and thermal strengthening may be used to strengthen the second glass ply 320. In one or more embodiments, the second glass ply 320 is strengthened while the first glass ply 310 is unstrengthened (but may optionally be annealed), and exhibits a surface compressive stress of less than about 3 MPa, or about 2.5 MPa or less, 2 MPa or less, 1.5 MPa or less, 1 MPa or less, or about 0.5 MPa or less.

In one or more embodiments, the interlayer 330 bonds the second major surface 204 of the first glass ply 310 to the third major surface 332 of the second glass ply 320. In embodiments, the interlayer 330 comprises a polymer, such as at least one of polyvinyl butyral (PVB), acoustic PVB (APVB), an ionomer, an ethylene-vinyl acetate (EVA) and a thermoplastic polyurethane (TPU), a polyester (PE), a polyethylene terephthalate (PET), or the like. The thickness of the interlayer may be in the range from about 0.5 mm to about 2.5 mm, in particular from about 0.7 mm to about 1.5 mm. In other embodiments the thickness may be less than 0.5 mm or more than 2.5 mm. Further, in embodiments, the interlayer 330 may comprise multiple polymeric layers or films providing various functionalities to the laminate structure 300. For example, the interlayer 330 may incorporate at least one of a display feature, solar insulation, sound dampening, an antenna, an anti-glare treatment, or an anti-reflective treatment, among others. In particular embodiments, the interlayer 330 is modified to provide ultraviolet (UV) absorption, infrared (IR) absorption, IR reflection, acoustic control/dampening, adhesion promotion, and tint. The interlayer 330 can be modified by a suitable additive such as a dye, a pigment, dopants, etc. to impart the desired property.

In one or more embodiments, the first glass ply 310 or second glass ply 320 may be provided with a functional or decorative coating in addition to or in the alternative to the functional or decorative film of the interlayer 330. In embodiments, the coating is at least one of an infrared reflective (IRR) coating, frit, anti-reflective coating, or pigment coating. In an example embodiment of an IRR, the second major surface 204 of the first glass ply 310 or the third major surface 332 of the second glass ply 320 is coated with an infrared-reflective film and, optionally, one or more layers of a transparent dielectric film. In embodiments, the infrared-reflecting film comprises a conductive metal, such as silver, gold, or copper, that reduces the transmission of heat through the coated ply 310, 320. In embodiments, the optional dielectric film can be used to anti-reflect the infrared-reflecting film and to control other properties and characteristics of the coating, such as color and durability. In embodiments, the dielectric film comprises one or more oxides of zinc, tin, indium, bismuth, and titanium, among others. In an example embodiment, the IRR coating includes one or two silver layers each sandwiched between two layers of a transparent dielectric film. In embodiments, the IRR coating is applied using, e.g., physical or chemical vapor deposition or via lamination.

In embodiments, one or both of the first glass ply 310 and the second glass ply 320 includes frit. In embodiments, the frit is applied, e.g., to the second major surface 204 of the first glass ply 310, the third major surface 332 of the second glass ply 320, and/or the fourth major surface 334 of the second glass ply 320. In embodiments, the frit provides an enhanced bonding surface for adhesives such as the interlayer 330 or an adhesive joining the glazing 130 to a bonding surface defining an opening 120 in the vehicle body 110. Additionally, in embodiments, the frit provides a decorative border for the glazing 130. Further, in embodiments, the frit may be used in addition to the IRR coating described above. In embodiments, the frit is an enamel frit. In other embodiments, the frit is designed such that it is ion-exchangeable. That is, the frit can be applied to an ion-exchangeable glass prior to undergoing an ion-exchange treatment. Such frit is configured to allow the exchange of ions between the glass and the treatment bath. In embodiments, the frit is a Bi-Si-B alkali system, a Zn-based Bi-system, a Bi-Zn-system, a Bi-system, an Si-Zn-B-Ti system with no or low Bi, an Si-Bi-Zn-B-alkali system, and/or an Si-Bi-Ti-B-Zn-alkali system, among others. An example of an ion-exchangeable frit, including colorant, comprises 45.11 mol % $Bi_2O_3$, 20.61 mol % $SiO_2$, 13.56 mol % $Cr_2O_3$, 5.11 mol % CuO, 3.48 mol % MnO, 3.07 mol % ZnO, 2.35 mol % $B_2O_3$, 1.68 mol % $TiO_2$, 1.60 mol % $Na_2O$, 1.50 mol % $Li_2O$, 0.91 mol % $K_2O$, 0.51 mol % $Al_2O_3$, 0.15 mol % $P_2O_5$, 0.079 mol % $SO_3$, 0.076 mol % BaO, 0.062 mol % $ZrO_2$, 0.060 mol % $Fe_2O_3$, 0.044 mol % $MoO_3$, 0.048 mol % CaO, 0018 mol % $Nb_2O_5$, 0.006 mol % Cl, and 0.012 mol % SrO. Other examples of ion-exchangeable frits are disclosed in U.S. Pat. No. 9,346,708B2 (application Ser. No. 13/464,493, filed May 4, 2012) and U.S. Publication No. 2016/0002104A1 (application Ser. No. 14/768,832, filed Aug. 19, 2015), both of which are incorporated herein by reference in their entireties.

In embodiments, the second glass ply 320 may be provided with a colorant coating comprised of an ink, such as an organic ink. In embodiments particularly suitable for such a colorant coating, the colorant coating is applied to the third major surface 332 of the second glass ply 320 or to the fourth major surface 334 of the second glass ply 320, and the second glass ply 320 is cold-formed against the first glass ply 310. Advantageously, such colorant coatings can be applied to the second glass ply 320 while the second glass ply 320 is in a planar configuration, and then the second glass ply 320 can be cold formed to a curved configuration without disrupting the colorant coating, e.g., organic ink coating. In an embodiment, the colorant coating comprises at least one pigment, at least one mineral filler, and a binder comprising an alkoxysilane functionalized isocyanurate or an alkoxysilane functionalized biuret. Examples of such colorant coatings are described in European Patent No. 2617690B1, incorporated herein by reference in its entirety. Other suitable colorant coatings and methods of applying the colorant coatings are described in U.S. Publication No. 2020/0171800A1 (application Ser. No. 16/613,010, filed on Nov. 12, 2019) and U.S. Pat. No. 9,724,727 (application Ser. No. 14/618,398, filed Feb. 10, 2015), both of which are incorporated herein by reference in their entireties.

In embodiments, the coating is an anti-reflective coating. In particular embodiments, the anti-reflective coating is applied to the fourth major surface 334 of the second glass ply 320. In embodiments, the anti-reflective coating comprises multiple layers of low and high index materials or low, medium, and high index materials. For example, in embodiments, the anti-reflective coating includes from two to twelve layers of alternating low and high index materials, such as silica (low index) and niobia (high index). In another example embodiment, the anti-reflective coating includes from three to twelve layers of repeating low, medium, and high index materials, such as silica (low index), alumina (medium index), and niboia (high index). In still other embodiments, the low index material in the stack may be an ultra-low index material, such as magnesium fluoride or porous silica. In general, anti-reflective coatings having more layers in the stack will perform better at higher angles of incidence than anti-reflective coatings having less layers in the stack. For example, at an angle of incidence of, e.g., greater than 60°, an anti-reflective coating stack having four layers will perform better (less reflection) than an anti-reflective coating stack having two layers. Further, in embodiments, an anti-reflective coating stack having an ultra-low index material will perform better (less reflection) than an anti-reflective coating stack having a low index material. Other anti-reflective coatings known in the art may also be suitable for application to the laminate 300.

In embodiments, the glass ply 200 or laminate 300 exhibits at least one curvature comprising a radius of curvature that is in the range of 300 mm to about 10 m along at least a first axis. In embodiments, the glass ply 200 or laminate 300 exhibits at least one curvature comprising a radius of curvature that is in the range of 300 mm to about 10 m along a second axis that is transverse, in particular perpendicular, to the first axis. In other embodiments the glass ply exhibits curvature but the curvature has a radius of curvature less than 300 μm or greater than 10 m. In some embodiments, the curvature is complex and changing.

In embodiments, the curvature(s) are introduced into the glass ply 200 or each glass ply 310, 320 of the glass laminate 300 through a thermal process. The thermal process may include a sagging process that uses gravity to shape the glass ply 200 or glass plies 310, 320 when heated. In the sagging step, a glass ply, such as glass ply 200, is placed on a mold having an open interior, heated in a furnace (e.g., a box furnace, or a lehr furnace), and allowed to gradually sag under the influence of gravity into the open interior of the mold. In one or more embodiments, the thermal process may include a pressing process that uses a mold to shape the glass ply 200 or glass plies 310, 320 when heated or while heating. In some embodiments, two glass plies, such as glass plies 310, 320, are shaped together in a "pair-shaping" process. In such a process, one glass ply is placed on top of another glass ply to form a stack (which may also include an intervening release layer), which is placed on the mold. In embodiments, to facilitate the pair-shaping process, the glass ply 310, 320 used as an inner and/or thinner glass ply has a pair-shaping temperature (temperature at $10^{11}$ Poise) that is greater than the outer and/or thicker glass ply 310, 320.

In one or more embodiments, the mold may have an open interior for use in a sagging process. The stack and mold are both heated by placing them in the furnace, and the stack is gradually heated to the bend or sag temperature of the glass plies. During this process, the plies are shaped together to a curved shape. Advantageously, the viscosity curve for at least some of the presently disclosed borosilicate glass composition at a viscosity of $10^{11}$ Poise is similar to conventional float-formed borosilicate glass compositions, allowing for existing equipment and techniques to be utilized for forming the glass ply 200 or plies 310, 320.

According to an exemplary embodiment, heating time and temperature are selected to obtain the desired degree of curvature and final shape. Subsequently, the glass ply or glass plies are removed from the furnace and cooled. For pair-shaped glass plies, the two glass plies are separated, re-assembled with an interlayer, such as interlayer 330, between the glass plies and heated, e.g., under vacuum to seal the glass plies and interlayer together into a laminate.

In one or more embodiments, only one glass ply is curved using heat (e.g., by a sag process or press process), and the other glass ply is curved using a cold-forming process by pressing the glass ply to be curved into conformity with the already curved glass ply at a temperature less than the softening temperature of the glass composition (in particular at a temperature of 200° C. or less, 100° C. or less, 50° C. or less, or at room temperature). Pressure to cold-form the glass ply against the other glass ply may be provided by, e.g., a vacuum, a mechanical press, or one or more clamps. The cold-formed glass ply may be held into conformity with the curved glass ply via the interlayer and/or mechanically clamped thereto or otherwise coupled.

Figure 4:
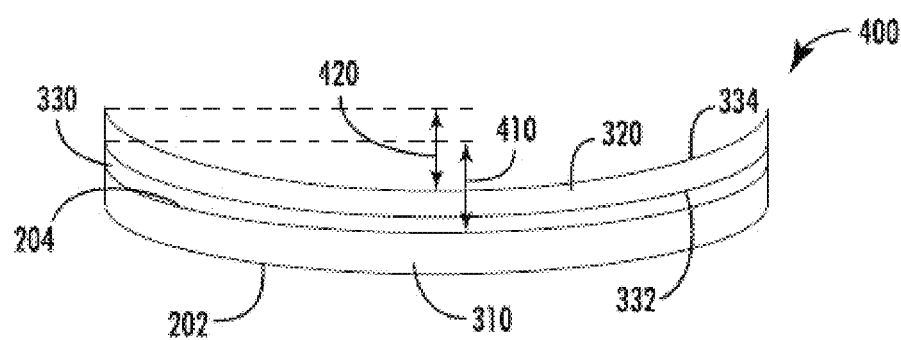
FIG. 4 is a side view illustration of a laminate including a glass article according to one or more embodiments.

FIG. 4 depicts an exemplary embodiment of a curved glass laminate 400. As can be seen in FIG. 4, the second major surface 204 of the first glass ply 310 has a first curvature depth 410 defined as the maximum depth from planar (dashed line) of the second major surface 204. In embodiments in which the second glass ply 320 is curved, the fourth major surface 334 of the second glass ply 320 has a second curvature depth 420 defined as the maximum depth from planar (dashed line) of the fourth major surface 334.

In embodiments, one or both the first curvature depth 410 and the second curvature depth 420 is about 2 mm or greater. Curvature depth may be defined as maximum distance a surface is distanced orthogonally from a plane defined by points on a perimeter of that surface. For example, one or both the first curvature depth 410 and the second curvature depth 420 may be in a range from about 2 mm to about 30 mm. In embodiments, the first curvature depth 410 and the second curvature depth 420 are substantially equal to one another. In one or more embodiments, the first curvature depth 410 is within 10% of the second curvature depth 420, in particular within 5% of the second curvature depth 420. For illustration, the second curvature depth 420 is about 15 mm, and the first curvature depth 410 is in a range from about 13.5 mm to about 16.5 mm (or within 10% of the second sag depth 420).

In one or more embodiments, the first curved glass ply 310 and the second curved glass ply 330 comprise a shape deviation therebetween the first curved glass ply 310 and the second curved glass ply 320 of ±5 mm or less as measured by an optical three-dimensional scanner such as the ATOS Triple Scan supplied by GOM GmbH, located in Braunschweig, Germany. In one or more embodiments, the shape deviation is measured between the second major surface 204 and the third major surface 332, or between the first major surface 202 and the fourth major surface 334. In one or more embodiments, the shape deviation between the first glass ply 310 and the second glass ply 320 is about ±4 mm or less, about ±3 mm or less, about ±2 mm or less, about ±1 mm or less, about ±0.8 mm or less, about ±0.6 mm or less, about ±0.5 mm or less, about ±0.4 mm or less, about ±0.3 mm or less, about ±0.2 mm or less, or about ±0.1 mm or less. As used herein, the shape deviation applies to stacked glass plies (i.e., with no interlayer) and refers to the maximum deviation from the desired curvature between coordinating positions on the respective second major surface 204 and third major surface 332 or the first major surface 202 and the fourth major surface 334.

In one or more embodiments, one of or both the first major surface 202 and the fourth major surface 334 exhibit minimal optical distortion. For example, one of or both the first major surface 202 and the fourth major surface 334 exhibit less than about 400 millidiopters, less than about 300 millidiopters, less than about 250 millidiopters, or less than about 200 millidiopters as measured by an optical distortion detector using transmission optics according to ASTM 1561. A suitable optical distortion detector is supplied by ISRA VISIION AG, located in Darmstadt, Germany, under the tradename SCREENSCAN-Faultfinder. In one or more embodiments, one of or both the first major surface 202 and the fourth major surface 334 exhibit about 190 millidiopters or less, about 180 millidiopters or less, about 170 millidiopters or less, about 160 millidiopters or less, about 150 millidiopters or less, about 140 millidiopters or less, about 130 millidiopters or less, about 120 millidiopters or less, about 110 millidiopters or less, about 100 millidiopters or less, about 90 millidiopters or less, about 80 millidiopters or less, about 70 millidiopters or less, about 60 millidiopters or less, or about 50 millidiopters or less. As used herein, the optical distortion refers to the maximum optical distortion measured on the respective surfaces.

It is believed that the reduction in optical distortion for the glass ply 200 or plies 310, 320 is related to both the borosilicate glass composition disclosed herein and the fusion forming process made possible by the disclosed borosilicate glass composition. As related to the forming process, conventional float glass techniques for forming borosilicate glass compositions involve floating molten glass on liquid tin, and the glass naturally has a thickness of 6 mm or more when floating on tin. To produce lower thicknesses, the glass is stretched or drawn while floating, which produces variations in the thickness across the surface of the glass known as draw lines and which produces internal stresses. The draw lines and internal stresses can both contribute to optical distortion. By fusion forming the borosilicate glass composition according to the present disclosure, such draw lines and internal stresses are substantially avoided. Further, the outer surfaces of the glass ply 200 or plies 310, 320 are not in contact with any structures during fusion forming, which also reduces optical distortion. With respect to the composition, the borosilicate glass disclosed herein allows for fusion forming of the glass ply 200 or plies 310, 320 by providing a liquidus viscosity of at least 500 kP and a $T_{200P}$ of 1725° C. or less. Moreover, the borosilicate glass composition according to the present disclosure is also believed to reduce refractive index variation across the surface of the glass ply 200 or plies 310, 320 as compared to conventionally used soda-lime silicate glass compositions. Variation in refractive index is also known to cause optical distortion, and thus, reduction in refractive index variation is expected to decrease optical distortion.

In one or more embodiments, the first major surface or the second major surface of the first curved glass ply exhibits low membrane tensile stress. Membrane tensile stress can occur during cooling of curved plies and laminates. As the glass cools, the major surfaces and edge surfaces (orthogonal to the major surfaces) can develop surface compression, which is counterbalanced by a central region exhibiting a tensile stress. Such stresses can, in certain circumstances, be problematic around the periphery where edge cooling effects set up stresses and bending tools create thermal gradients that generate stresses. The low CTE associated with embodiments of the presently disclosed borosilicate glass composition minimizes adverse residual stresses that may arise during the annealing process of hot forming. Such stresses are proportional to the CTE, and thus, by decreasing the CTE of the borosilicate glass composition, the residual stresses are also decreased.

Bending or shaping can introduce additional surface tension near the edge and causes the central tensile region to approach the glass surface. Accordingly, membrane tensile stress is the tensile stress measured near the edge (e.g., about 10-25 mm from the edge surface). In one or more embodiments, the membrane tensile stress at the first major surface or the second major surface of the first curved glass ply is less than about 7 megapascals (MPa) as measured by an edge stress meter according to ASTM C1279. An example of such a surface stress meter is an Edge Stress Meter or VRP (both commercially available from Strainoptic Technologies). In one or more embodiments, the membrane tensile stress at the first major surface or the second major surface of the first curved glass ply is about 6 MPa or less, about 5 MPa or less, about 4 MPa or less, or about 3 MPa or less. In one or more embodiments, the lower limit of membrane tensile stress is about 0.01 MPa or about 0.1 MPa. In other embodiments, membrane tensile stress may be negligible (e.g., about 0). As recited herein, stress is designated as either compressive or tensile, with the magnitude of such stress provided as an absolute value.

In one or more embodiments, the laminate 300, 400 may have a thickness of 10 mm or less, 9 mm or less, 8 mm or less, 7 mm or less, or 6 mm or less where the thickness comprises the sum of thicknesses of the first glass ply 310, the second glass ply 320, and the interlayer 330. In various embodiments, the laminate 300, 400 may have a thickness in the range of about 1.8 mm to about 10 mm, or in the range of about 1.8 mm to about 9 mm, or in the range of about 1.8 mm to about 8 mm, or in the range of about 1.8 mm to about 7 mm, or in the range of about 1.8 mm to about 6 mm, or in the range of about 1.8 mm to about 5 mm, or 2.1 mm to about 10 mm, or in the range of about 2.1 mm to about 9 mm, or in the range of about 2.1 mm to about 8 mm, or in the range of about 2.1 mm to about 7 mm, or in the range of about 2.1 mm to about 6 mm, or in the range of about 2.1 mm to about 5 mm, or in the range of about 2.4 mm to about 10 mm, or in the range of about 2.4 mm to about 9 mm, or in the range of about 2.4 mm to about 8 mm, or in the range of about 2.4 mm to about 7 mm, or in the range of about 2.4 mm to about 6 mm, or in the range of about 2.4 mm to about 5 mm, or in the range of about 3.4 mm to about 10 mm, or in the range of about 3.4 mm to about 9 mm, or in the range of about 3.4 mm to about 8 mm, or in the range of about 3.4 mm to about 7 mm, or in the range of about 3.4 mm to about 6 mm, or in the range of about 3.4 mm to about 5 mm. In other embodiments, the laminate thickness may be less than 1.8 mm or greater than 10 mm.

In one or more embodiments the second curved glass ply (or the second glass ply used to form the second curved glass ply) is relatively thin in comparison to the first curved glass ply (or the first glass ply used to form the first curved glass ply). In other words, the first curved glass ply (or the first glass ply used to form the first curved glass ply) has a thickness greater than the second curved glass ply (or the second glass ply used to form the second curved glass ply). In one or more embodiments, the first thickness (or the thickness of the first glass ply used to form the first curved glass ply) is more than two times the second thickness. In one or more embodiments, the first thickness (or the thickness of the first glass ply used to form the first curved glass ply) is in the range from about 1.5 times to about 10 times the second thickness (e.g., from about 1.75 times to about 10 times, from about 2 times to about 10 times, from about 2.25 times to about 10 times, from about 2.5 times to about 10 times, from about 2.75 times to about 10 times, from about 3 times to about 10 times, from about 3.25 times to about 10 times, from about 3.5 times to about 10 times, from about 3.75 times to about 10 times, from about 4 times to about 10 times, from about 1.5 times to about 9 times, from about 1.5 times to about 8 times, from about 1.5 times to about 7.5 times, from about 1.5 times to about 7 times, from about 1.5 times to about 6.5 times, from about 1.5 times to about 6 times, from about 1.5 times to about 5.5 times, from about 1.5 times to about 5 times, from about 1.5 times to about 4.5 times, from about 1.5 times to about 4 times, from about 1.5 times to about 3.5 times, from about 2 times to about 7 times, from about 2.5 times to about 6 times, from about 3 times to about 6 times). In other embodiments, the plies may be otherwise sized, such as the second ply being thicker or the same thickness as the first.

In one or more embodiments, the second thickness (or the thickness of the second glass ply used to form the second curved glass ply) is less than 2.0 mm (e.g., 1.95 mm or less, 1.9 mm or less, 1.85 mm or less, 1.8 mm or less, 1.75 mm or less, 1.7 mm or less, 1.65 mm or less, 1.6 min or less, 1.55 mm or less, 1.5 mm or less, 1.45 mm or less, 1.4 mm or less, 1.35 mm or less, 1.3 mm or less, 1.25 mm or less, 1.2 mm or less, 1.15 mm or less, 1.1 mm or less, 1.05 mm or less, 1 mm or less, 0.95 mm or less, 0.9 mm or less, 0.85 mm or less, 0.8 mm or less, 0.75 mm or less, 0.7 mm or less, 0.65 mm or less, 0.6 mm or less, 0.55 mm or less, 0.5 mm or less, 0.45 mm or less, 0.4 mm or less, 0.35 mm or less, 0.3 mm or less, 0.25 mm or less, 0.2 mm or less, 0.15 mm or less, or about 0.1 mm or less). The lower limit of thickness may be 0.1 mm, 0.2 mm or 0.3 mm. In some embodiments, the second thickness (or the thickness of the second glass ply used to form the second curved glass ply) is in the range from about 0.1 mm to less than about 2.0 mm, from about 0.1 mm to about 1.9 mm, from about 0.1 mm to about 1.8 mm, from about 0.1 mm to about 1.7 mm, from about 0.1 mm to about 1.6 mm, from about 0.1 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1 mm, from about 0.1 mm to about 0.9 mm, from about 0.1 mm to about 0.8 mm, from about 0.1 mm to about 0.7 mm, from about 0.2 mm to less than about 2.0 mm, from about 0.3 mm to less than about 2.0 mm, from about 0.4 mm to less than about 2.0 mm, from about 0.5 mm to less than about 2.0 mm, from about 0.6 mm to less than about 2.0 mm, from about 0.7 mm to less than about 2.0 mm, from about 0.8 mm to less than about 2.0 mm, from about 0.9 mm to less than about 2.0 mm, or from about 1.0 mm to about 2.0 mm. In other embodiments, the second ply can be thicker than 2.0 mm or thinner than 0.1 mm, such as less than 700 µm, 500 µm, 300 µm, 200 µm, 100 µm, 80 µm, 40 µm, and/or at least 10 µm.

In some embodiments, the first thickness (or the thickness of the first glass ply used to form the first curved glass ply) is about 2.0 mm or greater. In such embodiments, first thickness (or the thickness of the first glass ply used to form the first curved glass ply) and the second thickness (or the thickness of the second glass ply used to form the second curved glass ply) differ from one another. For example, the first thickness (or the thickness of the first glass ply used to form the first curved glass ply) is about 2.0 mm or greater, about 2.1 mm or greater, about 2.2 mm or greater, about 2.3 mm or greater, about 2.4 mm or greater, about 2.5 mm or greater, about 2.6 mm or greater, about 2.7 mm or greater, about 2.8 mm or greater, about 2.9 mm or greater, about 3.0 mm or greater, about 3.1 mm or greater, about 3.2 mm or greater, about 3.3 mm or greater, 3.4 mm or greater, 3.5 mm or greater, 3.6 mm or greater, 3.7 mm or greater, 3.8 mm or greater, 3.9 mm or greater, 4 mm or greater, 4.2 mm or greater, 4.4 mm or greater, 4.6 mm or greater, 4.8 mm or greater, 5 mm or greater, 5.2 mm or greater, 5.4 mm or greater, 5.6 mm or greater, 5.8 mm or greater, or 6 mm or greater. In some embodiments the first thickness (or the thickness of the first glass ply used to form the first curved glass ply) is in a range from about 2.0 mm to about 6 mm, from about 2.1 mm to about 6 mm, from about 2.2 mm to about 6 mm, from about 2.3 mm to about 6 mm, from about 2.4 mm to about 6 mm, from about 2.5 mm to about 6 mm, from about 2.6 mm to about 6 mm, from about 2.8 mm to about 6 mm, from about 3 mm to about 6 mm, from about 3.2 mm to about 6 mm, from about 3.4 mm to about 6 mm, from about 3.6 mm to about 6 mm, from about 3.8 mm to about 6 mm, from about 4 mm to about 6 mm, from about 2.0 mm to about 5.8 mm, from about 2.0 mm to about 5.6 mm, from about 2.0 mm to about 5.5 mm, from about 2.0 mm to about 5.4 mm, from about 2.0 mm to about 5.2 mm, from about 2.0 mm to about 5 mm, from about 2.0 mm to about 4.8 mm, from about 2.0 mm to about 4.6 mm, from about 2.0 mm to about 4.4 mm, from about 2.0 mm to about 4.2 mm, from about 2.0 mm to about 4 mm, from about 2.0 mm to about 3.8 mm, from about 2.0 mm to about 3.6 mm, from about 2.0 mm to about 3.4 mm, from about 2.0 mm to about 3.2 mm, or from about 2.0 mm to about 3 mm. In other embodiments the first ply can be thicker than 10.0 mm or thinner than 2.0 mm, such as less than 1.5 mm, 1.0 mm, 700 nm, 500 nm, 300 nm, 200 nm, 100 nm, 80 nm, 40 nm, and/or at least 10 nm.

In one or more specific examples, the first thickness (or the thickness of the first glass ply used to form the first curved glass ply) is from about 2.0 mm to about 3.5 mm, and the second thickness (or the thickness of the second glass ply used to form the second curved glass ply) is in a range from about 0.1 mm to less than about 2.0 mm. In embodiments, the ratio of first thickness to total glass thickness is at least 0.7, or at least 0.75, or at least 0.8, or at least 0.85, or at least 0.9.

In one or more embodiments, the laminate 300, 400 is substantially free of visual distortion as measured by ASTM C1652/C1652M. In specific embodiments, the laminate, the first curved glass ply and/or the second curved glass ply are substantially free of wrinkles or distortions that can be visually detected by the naked eye, according to ASTM C1652/C1652M.

In one or more embodiments, the first major surface 202 or the second major surface 204 comprises a surface compressive stress of less than 3 MPa as measured by a surface stress meter, such as the surface stress meter commercially available under the tradename FSM-6000, from Orihara Industrial Co., Ltd. (Japan) ("FSM"). In some embodiments, the first curved glass ply is unstrengthened as will be described herein (but may optionally be annealed), and exhibits a surface compressive stress of less than about 3 MPa, or about 2.5 MPa or less, 2 MPa or less, 1.5 MPa or less, 1 MPa or less, or about 0.5 MPa or less. In some embodiments, such surface compressive stress ranges are present on both the first major surface and the second major surface.

In one or more embodiments, the first and second glass plies used to form the first curved glass ply and second curved ply are substantially planar prior to being pair shaped to form a first curved glass ply and second curved glass ply. In some instances, one or both of the first glass ply and the second glass ply used to form the first curved glass ply and second curved ply may have a 3D or 2.5D shape that does not exhibit the curvature depth desired and will eventually be formed during the pair shaping process and present in the resulting laminate. Additionally or alternatively, the thickness of the one or both of the first curved glass ply (or the first glass ply used to form the first curved glass ply) and the second curved glass ply (or the second glass ply used to form the second curved glass ply) may be constant along one or more dimension or may vary along one or more of its dimensions for aesthetic and/or functional reasons. For example, the edges of one or both of the first curved glass ply (or the first glass ply used to form the first curved glass ply) and the second curved glass ply (or the second glass ply used to form the second curved glass ply) may be thicker as compared to more central regions of the glass ply.

The length (e.g., longest centerline of surface (e.g., first major surface)), width (e.g., longest dimension of the surface orthogonal to the length), and thickness (e.g., dimension of the ply orthogonal to the length and the width) dimensions of the first curved glass ply (or the first glass ply used to form the first curved glass ply) and the second curved glass ply (or the second glass ply used to form the second curved glass ply) may also vary according to the article application or use. In one or more embodiments, the first curved glass ply (or the first glass ply used to form the first curved glass ply) includes a first length and a first width (the first thickness is orthogonal both the first length and the first width), and the second curved glass ply (or the second glass ply used to form the second curved glass ply) includes a second length and a second width orthogonal the second length (the second thickness is orthogonal both the second length and the second width). In one or more embodiments, either one of or both the first length and the first width is about 0.25 meters (m) or greater. For example, the first length and/or the second length may be in a range from about 1 m to about 3 m, from about 1.2 m to about 3 m, from about 1.4 m to about 3 m, from about 1.5 m to about 3 m, from about 1.6 m to about 3 m, from about 1.8 m to about 3 m, from about 2 m to about 3 m, from about 1 m to about 2.8 m, from about 1 m to about 2.8 m, from about 1 m to about 2.8 m, from about 1 m to about 2.8 m, from about 1 m to about 2.6 m, from about 1 m to about 2.5 m, from about 1 m to about 2.4 m, from about 1 m to about 2.2 m, from about 1 m to about 2 m, from about 1 m to about 1.8 m, from about 1 m to about 1.6 m, from about 1 m to about 1.5 m, from about 1.2 m to about 1.8 m or from about 1.4 m to about 1.6 m. In some embodiments, a surface dimension from perimeter to perimeter through a centroid of the respective surface (e.g., first surface, second surface, monolith major surface, ply surface) is at least 1 mm, at least 1 cm, at least 10 cm, at least 1 m, and/or no more than 10 m, whereby a contained fracture may not result in failure of the respective ply. In other embodiments, the ply may be otherwise sized.

For example, the first width and/or the second width may be in a range from about 0.5 m to about 2 m, from about 0.6 m to about 2 m, from about 0.8 m to about 2 m, from about 1 m to about 2 m, from about 1.2 m to about 2 m, from about 1.4 m to about 2 m, from about 1.5 m to about 2 m, from about 0.5 m to about 1.8 m, from about 0.5 m to about 1.6 m, from about 0.5 m to about 1.5 m, from about 0.5 m to about 1.4 m, from about 0.5 m to about 1.2 m, from about 0.5 m to about 1 m, from about 0.5 m to about 0.8 m, from about 0.75 m to about 1.5 m, from about 0.75 m to about 1.25 m, or from about 0.8 m to about 1.2 m. In other embodiments, the ply may be otherwise sized.

In one or more embodiments, the second length is within 5% of the first length (e.g., about 5% or less, about 4% or less, about 3% or less, or about 2% or less). For example if the first length is 1.5 m, the second length may be in a range from about 1.425 m to about 1.575 m and still be within 5% of the first length. In one or more embodiments, the second width is within 5% of the first width (e.g., about 5% or less, about 4% or less, about 3% or less, or about 2% or less). For example if the first width is 1 m, the second width may be in a range from about 1.05 m to about 0.95 m and still be within 5% of the first width.

Having described the glass ply, laminate structure thereof, and uses therefor, the borosilicate glass composition is now described in more detail. In embodiments, the borosilicate glass composition comprises at least 74 mol % $SiO_2$, at least 10 mol % $B_2O_3$, and at least some $Al_2O_3$. In particular embodiments, the borosilicate glass composition includes at least 0.03 mol % of an iron oxide (e.g., $Fe_2O_3$ or FeO). In more particular embodiments, $SiO_2$, $Al_2O_3$, and $B_2O_3$ make up at least 90 mol % of the borosilicate glass composition. Further, the borosilicate glass composition has a liquidus viscosity of at least 500 kiloPoise (kP) and a temperature ($T_{200P}$) at which the viscosity is 200 Poise (P) of 1725° C. or less.

In embodiments, the borosilicate glass composition includes $SiO_2$ in an amount in the range of at least about 72 mol %, more particularly about 72 mol % to about 80 mol %, in particular 74 mol % to 80 mol %. For example, the borosilicate glass composition includes $SiO_2$ in an amount in the range from about 72 mol % to about 85 mol %, from about 73 mol % to about 85 mol %, from about 74 mol % to about 85 mol %, from about 75 mol % to about 85 mol %, from about 76 mol % to about 85 mol %, from about 77 mol % to about 85 mol %, from about 78 mol % to about 85 mol %, from about 79 mol % to about 85 mol %, from about 80 mol % to about 85 mol %, from about 81 mol % to about 85 mol %, from about 82 mol % to about 85 mol %, from about 83 mol % to about 85 mol %, from about 84 mol % to about 85 mol %, from about 74 mol % to about 84 mol %, from about 74 mol % to about 84 mol %, from about 74 mol % to about 83 mol %, from about 74 mol % to about 82 mol %, from about 74 mol % to about 81 mol %, from about 74 mol % to about 80 mol %, from about 74 mol % to about 79 mol %, from about 74 mol % to about 78 mol %, from about 74 mol % to about 77 mol %, from about 74 mol % to about 76 mol %, and all ranges and sub-ranges therebetween. In other embodiments, the glass may have less than 74 mol % $SiO_2$. $SiO_2$ may be a major glass network former in the glass compositions described herein.

In embodiments, the borosilicate glass composition comprises $B_2O_3$ in an amount in the range from about 10 mol % to about 16 mol %, in particular about 11.5 mol % to about 14.5 mol %. In various embodiments, the borosilicate glass composition comprises $B_2O_3$ in an amount in the range from about 10 mol % to about 16 mol %, from about 11 mol % to about 16 mol %, from about 12 mol % to about 16 mol %, from about 13 mol % to about 16 mol %, from about 14 mol % to about 16 mol %, from about 15 mol % to about 16 mol %, from about 11 mol % to about 15 mol %, from about 11 mol % to about 14 mol %, from about 11 mol % to about 13 mol %, from about 11 mol % to about 12 mol %, from about 12 mol % to about 13 mol %, from about 12 mol % to about 14 mol %, from about 14 mol % to about 15 mol %, or any range or sub-ranges therebetween. In other embodiments, the glass may have less than 10 mol % $B_2O_3$ or more than 16 mol % $B_2O_3$.

In embodiments, the borosilicate glass composition includes $Al_2O_3$ in an amount in the range from about 2 mol % to about 6 mol %, in particular about 2.5 mol % to about 5 mol %. In various embodiments, the borosilicate glass composition includes $Al_2O_3$ in an amount in the range from about 2 mol % to about 6 mol %, from about 3 mol % to about 6 mol %, from about 4 mol % to about 6 mol %, from about 5 mol % to about 6 mol %, from about 3 mol % to about 5 mol %, from about 3 mol % to about 4 mol %, from about 4 mol % to about 5 mol %, or any range or sub-ranges therebetween. Advantageously, the $Al_2O_3$ present in these amounts helps prevent phase separation of the borosilicate glass composition. In other embodiments, the glass may have less than 2 mol % $Al_2O_3$ or more than 6 mol % $Al_2O_3$.

In embodiments, the borosilicate glass composition comprises $Na_2O$ in an amount in the range from about 3 mol % to about 8 mol %, in particular from about 4.5 mol % to about 8 mol %. In various embodiments, the borosilicate glass composition comprises $Na_2O$ in an amount in the range from about 3 mol % to about 8 mol %, from about 4 mol % to about 8 mol %, from about 5 mol % to about 8 mol %, from about 6 mol % to about 8 mol %, from about 7 mol % to about 8 mol %, from about 3 mol % to about 7 mol %, from about 4 mol % to about 7 mol %, from about 5 mol % to about 7 mol %, from about 6 mol % to about 7 mol %, from about 4 mol % to about 6 mol %, from about 5 mol % to about 6 mol %, or any ranges and sub-ranges therebetween. In other embodiments, the glass may have less than 3 mol % $Na_2O$ or more than 8 mol % $Na_2O$.

In embodiments, the borosilicate glass composition comprises $K_2O$ in an amount in the range from about 0.5 mol % to about 5 mol %, in particular from about 0.5 mol % to about 3 mol %. In various embodiments, the borosilicate glass composition comprises $K_2O$ in an amount in the range from about 0.5 mol % to about 5 mol %, from about 0.6 mol % to about 5 mol %, from about 0.7 mol % to about 5 mol %, from about 0.8 mol % to about 5 mol %, from about 0.9 mol % to about 5 mol %, from about 1 mol % to about 5 mol %, from about 2 mol % to about 5 mol %, from about 3 mol % to about 5 mol %, from about 4 mol % to about 5 mol %, from about 2 mol % to about 4 mol %, in the range of 3 mol % to 4 mol %, or any ranges and sub-ranges therebetween. In other embodiments, the glass may have less than 0.8 mol % $K_2O$ or more than 5 mol % $K_2O$.

The presence of $Na_2O$ and $K_2O$ has an effect on the liquidus viscosity. Thus, in embodiments, at least one of $Na_2O$ or $K_2O$ is present in an amount of at least 4 mol %. In embodiments, the combined amount of $Na_2O$ and $K_2O$ is present in an amount of at least 5.5 mol % when other alkaline earth oxides (e.g., CaO or MgO) are present in an amount of at least 1.5 mol %. In other embodiments, the combined amount of $Na_2O$ and $K_2O$ is present in an amount of at least 8 mol % without regard to alkaline earth oxides. In certain instances, it is believed that $K_2O$ and $Na_2O$ tend to decrease the liquidus temperature, thereby increasing the liquid viscosity. Further, in combination with $B_2O_3$ and $Al_2O_3$, $K_2O$ and $Na_2O$ tend to increase the liquidus viscosity.

In embodiments, the ratio of $K_2O$ to $Na_2O$ is from about 0.1 to about 0.75. In embodiments, the ratio of $K_2O$ to $Na_2O$ is about 0.15 to about 0.75, about 0.20 to about 0.75, about 0.25 to about 0.75, about 0.30 to about 0.75, about 0.35 to about 0.75, about 0.40 to about 0.75, about 0.45 to about 0.75, about 0.50 to about 0.75, about 0.55 to about 0.75, about 0.60 to about 0.75, about 0.65 to about 0.75, about 0.70 to about 0.75, about 0.1 to about 0.70, about 0.1 to about 0.65, about 0.1 to about 0.60, about 0.1 to about 0.55, about 0.1 to about 0.50, about 0.1 to about 0.45, about 0.1 to about 0.40, about 0.1 to about 0.35, about 0.1 to about 0.30, about 0.1 to about 0.25, about 0.1 to about 0.20, or about 0.1 to about 0.15.

In embodiments, the borosilicate glass composition comprises $P_2O_5$ in an amount in the range from 0 mol % to about 4 mol %, from about 1 mol % to about 4 mol %, from about 2 mol % to about 4 mol %, from about 3 mol % to about 4 mol %, from about 1 mol % to about 3 mol %, from about 2 mol % to about 3 mol %, from about 1 mol % to about 2 mol %, or any ranges and sub-ranges therebetween. $P_2O_5$ tends to lower the density of the borosilicate glass composition, which may result in increased densification during deformation as discussed below. Further, it is contemplated that $P_2O_5$ may increase the liquidus viscosity.

In embodiments, the borosilicate glass composition comprises CaO in an amount in the range from 0 mol % to about 5 mol %, from 0 mol % to about 4 mol %, from 0 mol % to about 3 mol %, from 0 mol % to about 2 mol %, from 0 mol % to about 1 mol %, from about 1 mol % to about 5 mol %, from about 2 mol % to about 5 mol %, from about 3 mol % to about 5 mol %, from about 4 mol % to about 5 mol %, from about 2 mol % to about 4 mol %, from about 2 mol % to about 3 mol %, from about 3 mol % to about 4 mol %, and all ranges and sub-ranges therebetween.

In embodiments, the borosilicate glass composition comprises MgO in an amount in the range from 0 mol % to about 5 mol %, in particular 0.5 mol % to 2.5 mol %. In various embodiments, the borosilicate glass composition comprises MgO in an amount in the range from 0 mol % to about 5 mol %, from 0 mol % to about 4 mol %, from 0 mol % to about 3 mol %, from 0 mol % to about 2 mol %, from 0 mol % to about 1 mol %, from about 1 mol % to about 5 mol %, from about 2 mol % to about 5 mol %, from about 3 mol % to about 5 mol %, from about 4 mol % to about 5 mol %, from about 2 mol % to about 4 mol %, from about 2 mol % to about 3 mol %, from about 3 mol % to about 4 mol %, and all ranges and sub-ranges therebetween.

In embodiments, the total amount of CaO and MgO is at most 5 mol %. In embodiments, the total amount of CaO and MgO is at least 1.5 mol % where the combined amount of $K_2O$ and $Na_2O$ are less than 7 mol %. Alkaline earth oxides, such as CaO and MgO, tend to reduce liquidus temperature and increase liquidus viscosity.

In embodiments, the borosilicate glass composition comprises $SnO_2$ in an amount up to about 0.25 mol %. In embodiments, the borosilicate glass composition comprises $SnO_2$ in an amount in the range from 0 mol % to about 0.25 mol %, from about 0.05 mol % to about 0.25 mol %, from about 0.10 mol % to about 0.25 mol %, from about 0.15 mol % to about 0.25 mol %, from about 0.20 mol % to about 0.25 mol %, from about 0.05 mol % to about 0.20 mol %, from about 0.05 mol % to about 0.15 mol %, from about 0.05 mol % to about 0.10 mol %, from about 0.10 mol % to about 0.15 mol %, from about 0.10 mol % to about 0.20 mol %, from about 0.15 mol % to about 0.20 mol %, or all ranges and sub-ranges therebetween. In some embodiments, $SnO_2$ may be substituted with another fining agent, such as a multivalent or other oxygen absorbing agent including antimony, arsenic, iron, cerium, and the like.

In embodiments, the borosilicate glass composition includes one or more iron compounds, e.g., in the form of iron (III) oxide ($Fe_2O_3$) or iron (II) oxide (FeO; provided, e.g., from an iron oxalate ($C_2FeO_4$) source), in particular in order to absorb infrared radiation from sunlight. In embodiments, the borosilicate glass composition comprises the iron compound in an amount up to about 0.50 mol %, in particular in a range from about 0.20 to about 0.40 mol %. In embodiments, the borosilicate glass composition comprises the iron compound in an amount in the range from about 0.03 mol % to about 0.50 mol %, from about 0.10 mol % to about 0.50 mol %, from about 0.15 mol % to about 0.50 mol %, from about 0.20 mol % to about 0.50 mol %, from about 0.25 mol % to about 0.50 mol %, from about 0.30 mol % to about 0.50 mol %, from about 0.35 mol % to about 0.50 mol %, from about 0.40 mol % to about 0.50 mol %, from about 0.45 mol % to about 0.50 mol %, or any ranges or sub-ranges therebetween. In other embodiments, other modifiers, such as $TiO_2$ can be used in addition to or in place of the iron compound to reduce transmission of UV radiation. In embodiments, $TiO_2$ can be provided in an amount of about 0.04 mol % to about 0.12 mol %.

In embodiments, the glass composition (or the glass article formed therefrom) exhibits a liquidus viscosity of at least 500 kiloPoise (kP) and up to 50,000 kP. Advantageously, glass compositions having a liquidus viscosity greater than 1000 kP are less susceptible to baggy warp during fusion draw. As used herein, the term "liquidus viscosity" refers to the viscosity of a molten glass at the liquidus temperature, wherein the term "liquidus temperature" refers to the temperature at which crystals first appear as a molten glass cools down from the melting temperature (or the temperature at which the very last crystals melt away as temperature is increased from room temperature).

The borosilicate glass compositions described herein having a liquidus viscosity of at least 500 kP are fusion formable at thicknesses of at least 2 mm, at least 3 mm, at least 3.3 mm, or at least 3.8 mm. In some embodiments, the fusion formed glass ply is substantially free of draw lines that are present in typical float formed glass articles. The liquidus viscosity is determined by the following method. First the liquidus temperature of the glass is measured in accordance with ASTM C829-81 (2015), titled "Standard Practice for Measurement of Liquidus Temperature of Glass by the Gradient Furnace Method." Next the viscosity of the glass at the liquidus temperature is measured in accordance with ASTM C965-96(2012), titled "Standard Practice for Measuring Viscosity of Glass Above the Softening Point."

In embodiments, the borosilicate glass composition exhibits a strain point temperature in a range from about 480° C. to about 560° C., about 490° C. to about 560° C., about 500° C. to about 560° C., about 510° C. to about 560° C., about 520° C. to about 560° C., about 530° C. to about 560° C., about 540° C. to about 560° C., about 550° C. to about 560° C., about 480° C. to about 550° C., about 480° C. to about 540° C., about 480° C. to about 530° C., about 480° C. to about 520° C., about 480° C. to about 510° C., about 480° C. to about 500° C., or any ranges or sub-ranges therebetween. In embodiments, the strain point temperature is determined using the beam bending viscosity method of ASTM C598-93(2013). In embodiments, the strain point is defined as the temperature at which viscosity is $10^{14.68}$ poise.

In embodiments, the borosilicate glass composition exhibits an annealing point temperature in a range from about 520° C. to about 590° C., about 530° C. to about 590° C., about 540° C. to about 590° C., about 550° C. to about 590° C., about 560° C. to about 590° C., about 570° C. to about 590° C., about 580° C. to about 590° C., about 520° C. to about 580° C., about 520° C. to about 570° C., about 520° C. to about 560° C., about 520° C. to about 550° C., about 520° C. to about 540° C., about 520° C. to about 530° C., or any ranges or sub-ranges therebetween. The annealing point is determined using the beam bending viscosity method of ASTM C598-93(2013). In embodiments, the annealing point is defined as the temperature at which viscosity is $10^{13.18}$ poise.

In embodiments, the glass composition exhibits a temperature at a viscosity of about 200 P ($T_{200P}$) that is at most 1725° C., as measured by Fulcher fit to high temperature viscosity (HTV) data (i.e., all the temperature measurements from 100 kP to 100 Poise). For example, the glass composition may exhibit a $T_{200P}$ in a range from about 1500° C. to about 1725° C., about 1525° C. to about 1725° C., about 1550° C. to about 1725° C., about 1575° C. to about 1725° C., about 1600° C. to about 1725° C., about 1625° C. to about 1725° C., about 1650° C. to about 1725° C., about 1675° C. to about 1725° C., about 1700° C. to about 1725° C., about 1500° C. to about 1700° C., about 1500° C. to about 1675° C., about 1500° C. to about 1650° C., about 1500° C. to about 1625° C., about 1500° C. to about 1600° C., about 1500° C. to about 1575° C., about 1500° C. to about 1550° C., about 1500° C. to about 1525° C., or any ranges or sub-ranges therebetween.

In one or more embodiments, the glass composition or the glass article formed therefrom exhibit a density at 20° C. that is less than 2.4 g/cm$^3$. In embodiments, the density at 20° C. is 2.39 g/cm$^3$ or less, 2.38 g/cm$^3$ or less, 2.37 g/cm$^3$ or less, 2.36 g/cm$^3$ or less, 2.35 g/cm$^3$ or less, 2.34 g/cm$^3$ or less, 2.33 g/cm$^3$ or less, 2.32 g/cm$^3$ or less, 2.31 g/cm$^3$ or less, 2.30 g/cm$^3$ or less, 2.29 g/cm$^3$ or less, 2.28 g/cm$^3$ or less, 2.27 g/cm$^3$ or less, 2.26 g/cm$^3$ or less, 2.25 g/cm$^3$ or less, 2.24 g/cm$^3$ or less, 2.23 g/cm$^3$ or less, 2.22 g/cm$^3$ or less, 2.21 g/cm$^3$ or less, or 2.20 g/cm$^3$ or less. In embodiments, the density is determined using the buoyancy method of ASTM C693-93(2013). Advantageously, a density below 2.4 g/cm$^3$ is less than the density of soda-lime glass, which is conventionally used in automotive glazing laminates.

Figure 7:
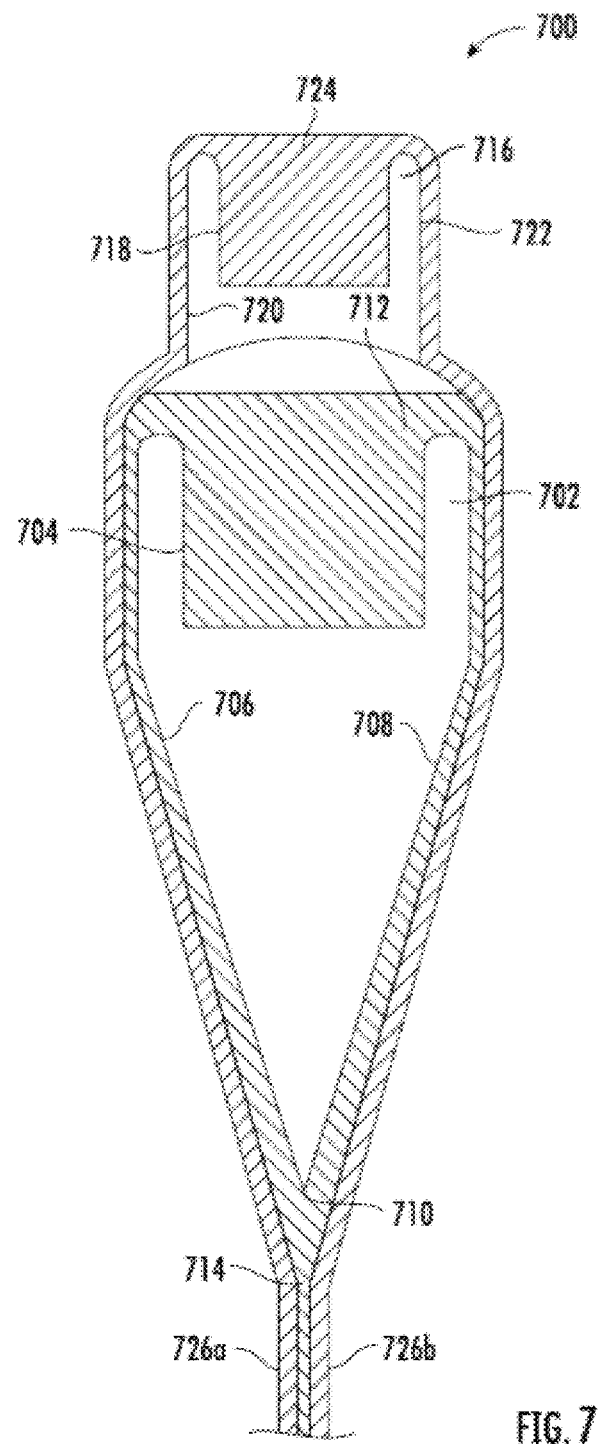
FIG. 7 depicts a fusion-forming apparatus for fusion forming a glass ply of borosilicate glass composition, according to an exemplary embodiment.

As mentioned, borosilicate glass composition according to the present disclosure is able to be fusion formed. The resulting glass ply can be described as being fusion-formed. FIG. 7 depicts an exemplary embodiment of an apparatus 700 for fusion forming a glass ply from a borosilicate glass composition. The fusion-forming apparatus 700 includes an isopipe 702 defined by a trough 704, a first forming surface 706, and a second forming surface 708. The first forming surface 706 and the second forming surface 708 angle inwardly beneath the trough 704 and meet at a root 710 of the isopipe 702. The presently disclosed borosilicate glass composition 712 is provided to the trough 704 in a molten state, and the borosilicate glass composition 712 overflows the trough 704, forming two streams and running down the forming surfaces 706, 708. The streams of molten glass meet at the root 710 to form the glass ply 714, which cools and is cut from the flowing stream.

In embodiments, the fusion-forming apparatus 700 includes a second isopipe 716 having a second trough 718, a third forming surface 720, and a fourth forming surface 722. A glass composition 724, having the same or different composition as the borosilicate glass composition 712, is provided to the second trough 718 in a molten state and overflows the second trough 718. The molten glass composition 724 flows down the third and fourth forming surfaces 720, 722 where it is directed outwardly around the borosilicate glass composition 712. In this way, the glass composition 724 flows down the first and second forming surfaces 706, 708 outside of the streams of the borosilicate glass composition 712. At the root 710 of the isopipe 702, the combination of the streams of the borosilicate glass composition 712 and the streams of the glass composition 724 create a glass ply 714 having cladding layers 726a, 726b. Such cladding layers may mechanically strengthen the glass based on residual stresses developed based on different coefficients of thermal expansions between the compositions 712, 724, or the cladding layers may be chemically strengthenable, such as through ion-exchange treatment. The cladding layers 726a, 726b may also provide other features, such as specific optical properties to the glass ply 714 formed in this manner.

The fusion forming method offers the advantage that, because the two glass steams flowing over the channel fuse together, neither of the outside surfaces of the resulting glass article comes in contact with any part of the apparatus. Thus, the surface properties of the fusion drawn glass article are not affected by such contact. In embodiments, the fusion-formed borosilicate glass composition of the present disclosure exhibits optical distortions of no greater than 75 millidiopters as measured by an optical distortion detector using transmission optics according to ASTM 1561. Conventional borosilicate glass compositions, which have a liquidus viscosity less than 500 kP and a $T_{200P}$ temperature of greater than 1725° C., were not able to be fusion formed at thicknesses of 2 mm or greater using a fusion draw process, and instead, such conventional borosilicate glass compositions of that thickness were typically formed using a float process.

Examples

Various embodiments of the fusion formable borosilicate glass composition are provided in the tables below.

TABLE 1

COMPOSITIONS AND PROPERTIES OF EXAMPLES 1-6

|  | 1 | 2 | 3 | 4 | 5 | 6 |
|---|---|---|---|---|---|---|
| $SiO_2$ | 75.35 | 76.72 | 76.14 | 75.18 | 77.19 | 76.36 |
| $Al_2O_3$ | 3.54 | 3.54 | 3.54 | 4.07 | 4.04 | 4.07 |
| $B_2O_3$ | 12.21 | 10.75 | 11.31 | 12.01 | 9.84 | 10.86 |
| $Na_2O$ | 4.60 | 4.67 | 4.68 | 4.61 | 4.70 | 4.57 |
| $K_2O$ | 2.13 | 2.18 | 2.18 | 2.93 | 3.05 | 2.94 |
| MgO | 0.99 | 0.99 | 0.99 | 0.02 | 0.02 | 0.02 |
| CaO | 1.03 | 1.02 | 1.02 | 1.05 | 1.03 | 1.03 |
| $SnO_2$ | 0.14 | 0.13 | 0.13 | 0.13 | 0.13 | 0.14 |
| Density (g/cm$^3$) | 2.307 | 2.308 | 2.308 | 2.316 | 2.335 | 2.324 |
| Strain Point (° C.) | 512.6 | 518.6 | 516.7 | 515.2 | 528.0 | 520.7 |
| LTCTE (ppm/° C.) | 5.1 | 5.24 | 5.1 | 5.58 | 5.55 | 5.56 |
| HTCTE (ppm/° C.) | 25.44 | 25.26 | 24.79 | 24.52 | 24.6 | 24.58 |
| Young's Modulus (GPa) | 66.6 | 67.7 | 67.1 | 66.7 | 69.2 | 67.7 |
| Poisson's Ratio | 0.198 | 0.194 | 0.196 | 0.200 | 0.194 | 0.197 |
| Fulcher A | −1.531 | −1.342 | −1.536 | −1.163 | −1.159 | −1.152 |
| Fulcher B | 5661.3 | 5468.2 | 5817.5 | 4739.4 | 4858.6 | 4848.7 |
| Fulcher $T_0$ | 140.9 | 182.3 | 142.8 | 227.7 | 232.4 | 224.8 |
| 200 P Temp (° C.) | 1618 | 1683 | 1659 | 1596 | 1637 | 1629 |
| 35 kP Temp (° C.) | 1073 | 1111 | 1100 | 1058 | 1084 | 1076 |
| 200 kP Temp (° C.) | 970 | 1005 | 994 | 961 | 985 | 976 |
| Liquidus Viscosity (kP) | 947 | 672 | 1578 | 3779 | 2892 | 4013 |
| Phase | Cristobalite | Cristobalite | Cristobalite | Cristobalite | Cristobalite | Cristobalite |

Examples 1-6 are exemplary glass compositions according to one or more embodiments of this disclosure. As can be seen from Table 1, the liquidus viscosity of these glass compositions is well above the 500 kP necessary for fusion forming the glass composition. Further, $T_{200P}$ for these glasses is well below 1725° C. Also, advantageously, these glasses have a density below 2.4 g/cm$^3$. Conventional laminates utilize a thick outer glass ply of soda-lime glass, which has a density above 2.4 g/cm$^3$. Thus, not only are the mechanical properties enhanced as will be discussed below, but the disclosed fusion formable borosilicate glass composition offers weight savings (and thus enhanced fuel efficiency) based on its density of less than 2.4 g/cm$^3$, in particular 2.35 g/cm$^3$ or less. The thermal properties of a resulting glass ply are also enhanced by the low temperature coefficient of thermal expansion (LTCTE), which is obtained by measuring expansion of the glass between the temperatures of 0° C. and 300° C. In embodiments, the LTCTE is 5.6 ppm/° C. or less, in particular, 5.3 ppm/° C. or less, and particularly 5.1 ppm/° C. or less. Besides the properties just discussed, Table 1 also includes information related to strain point temperature, annealing point temperature, high temperature CTE (HTCTE), Young's modulus, and Poisson's ratio.

Table 2, below provides additional exemplary compositions according to the present disclosure.

TABLE 2

Compositions and Properties of Examples 7-9 and Comparative Examples 10 and 11

|  | 7 | 8 | 9 | CE10 | CE11 |
|---|---|---|---|---|---|
| $SiO_2$ | 76.75 | 75.93 | 76.38 | 76.10 | 76.25 |
| $Al_2O_3$ | 3.57 | 3.53 | 3.56 | 3.53 | 3.52 |
| $B_2O_3$ | 11.18 | 11.61 | 12.26 | 8.47 | 11.49 |
| $Na_2O$ | 6.35 | 4.59 | 4.87 | 6.50 | 8.73 |
| $K_2O$ | 2.04 | 2.13 | 1.01 | 2.15 | 0.00 |
| MgO | 0.00 | 0.03 | 1.81 | 0.06 | 0.00 |
| CaO | 0.01 | 2.05 | 0 | 3.08 | 0.01 |
| $SnO_2$ | 0.11 | 0.11 | 0.11 | 0.11 | 0.00 |
| Density (g/cm$^3$) | 2.328 | 2.32 | 2.273 | 2.385 | 2.332 |
| Strain Point (° C.) | 518.6 | 525.8 | 506.2 | 543 | 526.6 |
| Anneal Point (° C.) | 564 | 571.4 | 552.9 | 585.4 | 569.7 |

TABLE 2-continued

Compositions and Properties of Examples 7-9 and
Comparative Examples 10 and 11

| | 7 | 8 | 9 | CE10 | CE11 |
|---|---|---|---|---|---|
| LTCTE (ppm/° C.) | 5.6 | 5.15 | 4.58 | 6.09 | — |
| Young's Modulus (GPa) | 68.7 | 68.3 | 63.1 | 74.1 | — |
| Poisson's Ratio | 0.192 | 0.192 | 0.196 | 0.194 | — |
| Fulcher A | −1.121 | −0.974 | −1.682 | −1.272 | −1.023 |
| Fulcher B | 4505.1 | 4545.6 | 6535.2 | 4696.1 | 4178.6 |
| Fulcher $T_0$ | 255.8 | 251.8 | 69 | 240.1 | 279.4 |
| 200 P Temp (° C.) | 1572 | 1640 | 1710 | 1555 | 1536 |
| 35 kP Temp (° C.) | 1051 | 1076 | 1119 | 1048 | 1030 |
| 200 kP Temp (° C.) | 957 | 976 | 1005 | 955 | 940 |
| Liquidus Viscosity (kP) | 582 | 855 | 1365 | 308 | 180 |
| Phase | Cristobalite | Cristobalite | Cristobalite | Cristobalite | Cristobalite |

Again, from Table 2, it can be seen that Examples 7-9 of the disclosed fusion formable borosilicate glass compositions exhibit the properties necessary for fusion forming at thicknesses greater than 2 mm. Further, the properties of the borosilicate glass composition are advantaged over the same properties of soda-lime glass, such as density and LTCTE. However, as can be seen from Comparative Examples 10 and 11, compositions outside of those disclosed herein with respect to fusion formability do not have the properties necessary for fusion forming at relatively large thicknesses. Comparative Example 10 has a low $B_2O_3$ content of 8.47 mol % such that the total amount of $SiO_2$, $B_2O_3$, and $Al_2O_3$ is below 90 mol %, and Comparative Example 11 contains none of $K_2O$ or MgO and almost none of CaO, which tend to increase the liquidus viscosity as discussed above. However, as discussed later, some embodiments may be useful as windshields or other articles, such as due to fracture behavior, regardless of whether the respective composition is fusion formable.

Table 3, below, provides further exemplary compositions for the borosilicate glass composition according to the present disclosure.

TABLE 3

COMPOSITIONS OF EXAMPLES 12-14 AND 18 AND COMPARATIVE EXAMPLES 15-17

| | 12 | 13 | 14 | CE15 | CE16 | CE17 | 18 |
|---|---|---|---|---|---|---|---|
| $SiO_2$ | 76.34 | 76.06 | 76.15 | 76.19 | 76.23 | 76.09 | 74.89 |
| $Al_2O_3$ | 3.56 | 3.54 | 3.54 | 3.55 | 3.55 | 3.54 | 3.50 |
| $B_2O_3$ | 11.80 | 12.43 | 12.89 | 13.35 | 13.73 | 14.28 | 13.60 |
| $Na_2O$ | 4.29 | 4.15 | 3.85 | 3.55 | 3.33 | 3.12 | 5.22 |
| $K_2O$ | 1.96 | 1.95 | 1.80 | 1.65 | 1.58 | 1.51 | 0.92 |
| MgO | 0.95 | 0.86 | 0.82 | 0.77 | 0.71 | 0.66 | 1.76 |
| CaO | 0.99 | 0.90 | 0.86 | 0.82 | 0.76 | 0.70 | — |
| $SnO_2$ | 0.10 | 0.10 | 0.10 | 0.10 | 0.10 | 0.10 | 0.11 |
| Density (g/cm³) | 2.298 | 2.285 | 2.271 | 2.259 | 2.246 | 2.234 | 2.273 |
| Strain Point (° C.) | 512.7 | 511.1 | 506.6 | 499.8 | 499 | 492 | 504 |
| Anneal Point (° C.) | 558.7 | 558.2 | 554.9 | 549.7 | 549.2 | 543.5 | 546 |
| LTCTE (ppm/° C.) | 4.8 | 4.6 | 4.5 | 4.4 | 4.3 | 4.1 | 4.6 |
| Young's Modulus (GPa) | 65.9 | 64.6 | 63.0 | 61.4 | 60.2 | 58.8 | — |
| Poisson's Ratio | 0.196 | 0.2 | 0.2 | 0.201 | 0.202 | 0.203 | — |
| Fulcher A | −1.504 | −1.647 | −1.835 | −1.719 | −2.093 | −1.727 | −1.697 |
| Fulcher B | 5948 | 6341.6 | 7018.7 | 6898.6 | 7963.1 | 7172.3 | 6442.7 |
| Fulcher $T_0$ | 111.3 | 89.1 | 21.2 | 33 | −55.1 | 13.3 | 73.7 |
| $T_{200\,P}$ (° C.) | 1676 | 1695 | 1718 | 1749 | 1757 | 1794 | 1685 |
| $T_{35\,kP}$ (° C.) | 1097 | 1113 | 1121 | 1134 | 1145 | 1157 | 1106 |
| $T_{200\,kP}$ (° C.) | 987 | 1002 | 1005 | 1016 | 1022 | 1034 | 994 |
| Liquidus Viscosity (kP) | 1021 | 1197 | 1752 | | | | 4569 |
| Phase | Cristobalite | Cristobalite | Cristobalite | | | | Cristobalite |

The borosilicate glass compositions Examples 12-14 and 18 in Table 3 possess the requisite liquid viscosity and $T_{200P}$ temperature for fusion forming and also the advantaged properties of density and LTCTE for using the disclosed borosilicate glass composition as an outer ply in automotive glazing laminates. Moreover, as can be seen, these examples demonstrate that the increasing amount of $B_2O_3$ has the effect of decreasing density. Each of Examples 12-17 has a density of less than 2.3 g/cm³, and certain examples, have a density of 2.250 g/cm³ or less. Comparative Examples 15-17 exhibit a $T_{200P}$ temperature that is above 1725° C. In comparison to Examples 12-14 and 18, Comparative Examples 15-17 have too little alkali oxides and too little alkali and alkali earth oxides (also called alkaline earth metal oxides), such as for some of the fusion formability attributes disclosed herein, but may have sufficient alkali and alkaline earth metal oxides for other embodiments, such as windshields and other articles with loop cracks that contain lateral and radial cracks from a Vickers indenter, as discussed below. In particular, each of Examples 12-14 and 15 include at least 5.5 mol % of $Na_2O+K_2O$ and a total of at least 7.0 mol % of $Na_2O+K_2O+MgO+CaO$. From the examples in Tables 1-3, it is believed that embodiments of the present disclosure will exhibit the requisite $T_{200P}$ and liquidus viscosity for fusion forming where a total amount of $Na_2O+K_2O+MgO+CaO$ is at least 7.0 mol %, especially where there is at least 5.5 mol % of $Na_2O+K_2O$ and at least 1.5 mol % of $MgO+CaO$. It is further believed that embodiments of the present disclosure will exhibit the requisite $T_{200P}$ and liquidus viscosity for fusion forming where $Na_2O+K_2O$ is at least 8 mol % without regard to the amount of MgO and CaO.

Table 4 provides additional exemplary compositions of the disclosed borosilicate glass composition with the further addition of an iron compound (e.g., as iron (II) oxide or iron (III) oxide) to absorb sunlight, in particular infrared (IR) radiation, which causes the temperature of the vehicle interior to rise. Thus, by providing IR absorption, an automotive glazing comprising a laminate with an outer ply of the disclosed borosilicate glass composition is able to provide additional fuel efficiency and comfort by reducing the heat that builds up in the vehicle and the burden on the air cooling system. Table 4 provides example borosilicate glass compositions of Table 4 having amounts of iron ($Fe_2O_3$) increasing from 0 mol % to 0.44 mol % and one composition (Example 25) containing primarily iron (II) oxide (FeO) as the primary iron compound. In Example 25, the iron (II) oxide is provided by using iron oxalate ($C_2FeO_4$) as a batch material source. The carbon of the iron oxalate leaves as carbon dioxide ($CO_2$), leaving primarily iron (II) oxide and some iron (III) oxide in the glass.

Figure 8:
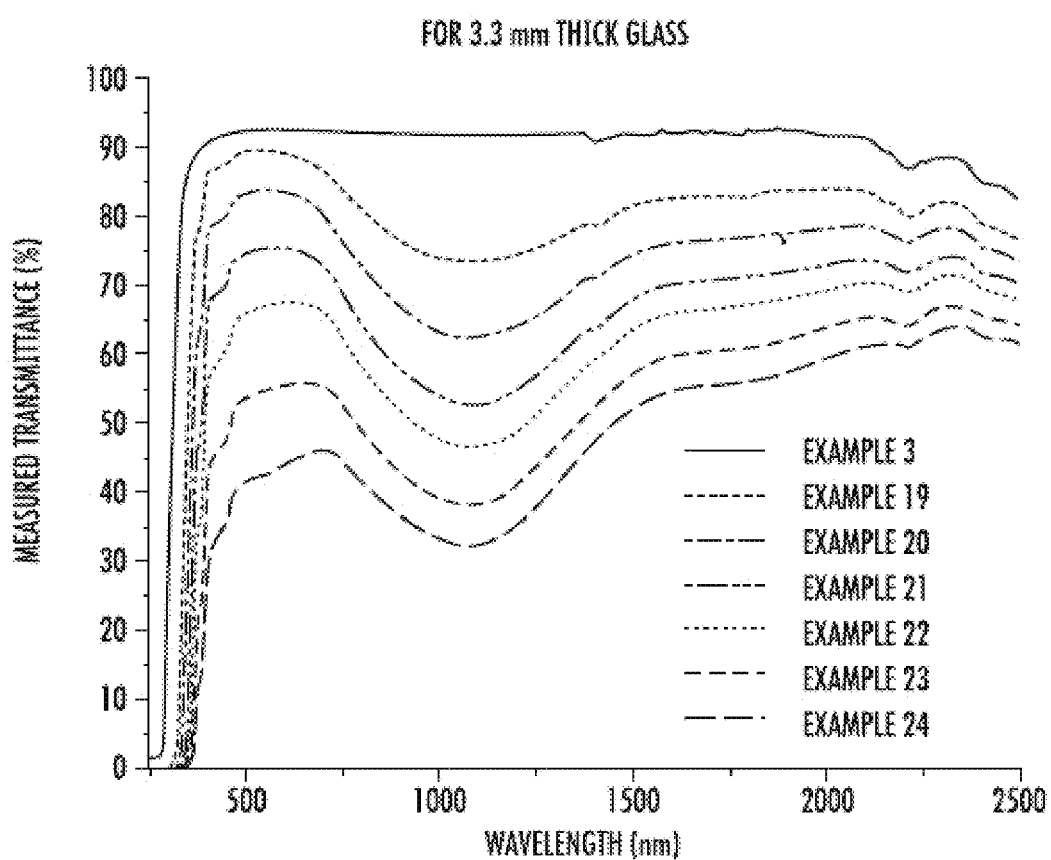
FIG. 8 depicts a graph of solar transmittance for various borosilicate glass compositions, according to exemplary embodiments.

Tables 5 and 6, below, provide transmission data for the borosilicate glass compositions of Table 4 for glass plies having a thickness of 3.3 mm and 2.1 mm, respectively. In embodiments, for a given composition of borosilicate glass composition, the addition of an iron compound serves to lower the visible light (i.e., about 400 nm to about 750 nm), total solar transmission, and UV transmission. All transmission values were measured at normal incidence. Example 3 has a visible light transmission ($T_{VIS}$) of 92.4% and a total solar transmission (TTS) of 92.0% as measured according to ISO 13837A)(A/2°). By adding increments of $Fe_2O_3$, $T_{VIS}$ and TTS are reduced incrementally. As shown in Table 4, the addition of 0.07 mol % (or 0.19 wt %) $Fe_2O_3$ drops $T_{VIS}$ by about 3% and TTS by about 6%. The addition of 0.37 mol % (or 0.92 wt %) of $Fe_2O_3$ drops $T_{VIS}$ by about 44% and TTS by about 33%. According to ISO 13837, the minimum requirement for $T_{VIS}$ is 73% for glazing of road vehicles. FIG. 8 provides a graph of transmittance for Examples 3, 19-24. As can be seen, the addition of $Fe_2O_3$ lowers overall measured transmittance and creates a significant dip in measured transmittance between about 750 nm and 1500 nm, corresponding to the near infrared spectrum. In embodiments, an automotive glazing comprising a laminate 300, 400 including at least one glass ply of the presently disclosed fusion formable borosilicate glass composition has a TTS of 61% or less and/or a $T_{VIS}$ of at least 73% as measured according to ISO 13837A)(A/2°). In such embodiments, the inventors believe from prior experience preparing such glazings and laminates that the interlayer and other glass ply will have minimal effect on $T_{VIS}$ (e.g., up to about 0.5% diminishment) and would further reduce TTS by, e.g., 3-5%. This is especially so where the presently disclosed fusion formable borosilicate glass ply is used as a thicker out ply of the laminate glazing.

TABLE 5

TRANSMISSION PROPERTIES BASED ON IRON CONTENT FOR 3.3. MM GLASS

| Glass Composition | Fe Source | Fe level (wt %) | UV cutoff wavelength (nm) | $T_{UV}$ (300-380 nm) (%) | $T_{VIS}$ (%) | TTS (%) |
|---|---|---|---|---|---|---|
| 3 | Oxide | 0 | <300 | 85.7 | 92.4 | 92.0 |
| 19 | Oxide | 0.19 | 320 | 59.2 | 89.3 | 85.7 |

TABLE 4

COMPOSITIONS AND OPTICAL PROPERTIES OF EXAMPLES 19-25

| | 3 | 19 | 20 | 21 | 22 | 23 | 24 | 25 |
|---|---|---|---|---|---|---|---|---|
| $SiO_2$ | 76.14 | 76.00 | 76.16 | 76.06 | 76.04 | 76.22 | 75.93 | 75.68 |
| $Al_2O_3$ | 3.54 | 3.53 | 3.54 | 3.53 | 3.54 | 3.55 | 3.52 | 3.51 |
| $B_2O_3$ | 11.31 | 11.58 | 11.41 | 11.26 | 11.34 | 11.25 | 11.29 | 12.55 |
| $Na_2O$ | 4.68 | 4.58 | 4.52 | 4.65 | 4.57 | 4.45 | 4.57 | 4.2 |
| $K_2O$ | 2.18 | 2.11 | 2.12 | 2.18 | 2.11 | 2.07 | 2.14 | 2.05 |
| MgO | 0.99 | 0.98 | 0.97 | 0.97 | 0.98 | 0.98 | 0.98 | 0.85 |
| CaO | 1.02 | 1.01 | 1.03 | 1.03 | 1.03 | 1.02 | 1.03 | 0.9 |
| $Fe_2O_3$/FeO | — | 0.07 | 0.15 | 0.22 | 0.28 | 0.37 | 0.44 | 0.16 |
| $SnO_2$ | 0.13 | 0.11 | 0.11 | 0.11 | 0.11 | 0.10 | 0.10 | 0.1 |
| Refractive Index at 633 nm | 1.4855 | 1.4855 | 1.4855 | 1.4855 | 1.4855 | 1.4855 | — | 1.484 |

TABLE 5-continued

TRANSMISSION PROPERTIES BASED ON
IRON CONTENT FOR 3.3. MM GLASS

| Glass Composition | Fe Source | Fe level (wt %) | UV cutoff wavelength (nm) | $T_{UV}$ (300-380 nm) (%) | $T_{VIS}$ (%) | TTS (%) |
|---|---|---|---|---|---|---|
| 20 | Oxide | 0.37 | 335 | 39.1 | 83.6 | 80.1 |
| 21 | Oxide | 0.55 | 345 | 26.7 | 75.7 | 74.2 |
| 22 | Oxide | 0.70 | 350 | 17.6 | 67.6 | 69.4 |
| 23 | Oxide | 0.92 | 365 | 6.1 | 48.8 | 59.2 |
| 24 | Oxide | 1.1 | — | — | 44.2 | 56.3 |
| 25 | Oxalate | 0.40 | 330 | 42.2 | 79.6 | 73.8 |

Figure 10:
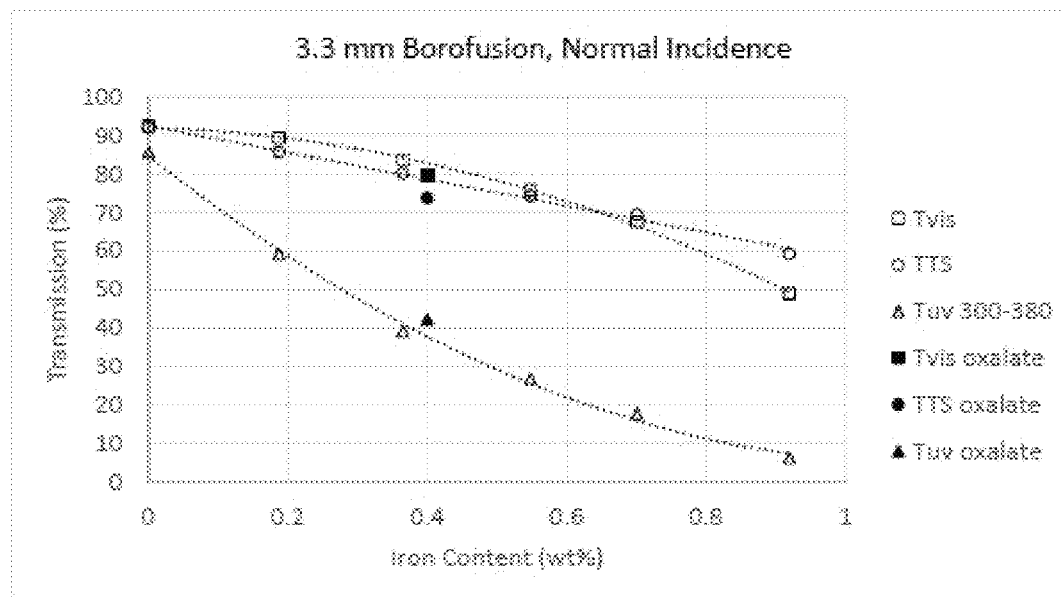
FIGS. 10 and 11 depict plots of visible, total solar, and ultraviolet light transmission as a function of iron content in glass, according to exemplary embodiments.

As can also be seen in Table 5, increasing the iron content increases the UV cutoff wavelength (i.e., the wavelength where UV transmission goes below 10%) and decreases total UV transmission in the range of 300-380 nm in addition to decreasing $T_{VIS}$ and TTS. In Example 3, the glass composition contains no iron content. The UV cutoff wavelength is below 300 nm, and the UV transmission is 85.7%. As the iron content increases from 0 wt % (or 0 mol %) to 0.92 wt % (or 0.37 mol %), the UV cutoff wavelength increases to 365 nm and the $T_{UV}$ decreases to 6.1%. In addition to the $T_{VIS}$ and TTS requirements referenced above, embodiments of a laminate 300, 400 including at least one glass ply the presently disclosed fusion formable borosilicate glass composition have a $T_{UV}$ that is less than 75%. Advantageously, decreasing UV transmission in a laminate can help to reduce yellowing of the polymer interlayer. FIG. 10 depicts plots of the $T_{VIS}$, $T_{UV}$, and TTS for Examples 3, 19-23, and 25 as a function of iron content for a single glass ply based on the data contained in Table 5.

Figure 11:
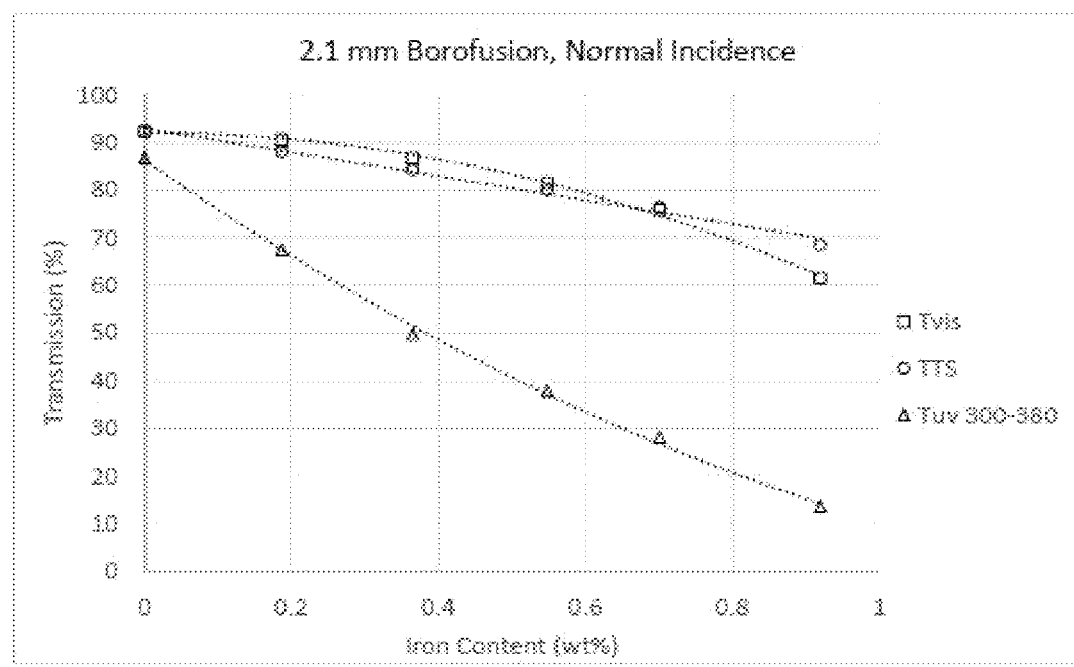

Table 6 provides transmission data for glass plies of the same compositions contained in Table 5 (with the exception of Example 24, which was not included). However, the thickness of the glass plies was decreased from 3.3 mm to 2.1 mm. As can be seen in Table 6, the decrease in ply thickness causes a slight decrease in the UV cutoff wavelength, and the $T_{UV}$, $T_{VIS}$, and TTS are each increased from the thicker 3.3 mm plies of Table 5. However, Table 6 still demonstrates that the $T_{UV}$, $T_{VIS}$, and TTS still decrease progressively with increasing iron content. FIG. 11 depicts plots of the $T_{VIS}$, $T_{UV}$, and TTS as a function of iron content for a single gas ply based on the data contained in Table 6. From Tables 5 and 6, it can also be seen that the iron (II) oxide from the iron oxalate provided to the batch provides a similar or better level of UV and solar radiance absorption than the iron (III) oxide when considered on a weight percentage basis.

TABLE 6

TRANSMISSION PROPERTIES BASED ON
IRON CONTENT FOR 2.1 MM GLASS

| Glass Composition | Fe source | Fe level (wt %) | UV cutoff wavelength (nm) | $T_{UV}$ (300-380 nm) (%) | $T_{VIS}$ (%) | TTS (%) |
|---|---|---|---|---|---|---|
| 3 | Oxide | 0 | <300 | 86.7 | 92.4 | 92.2 |
| 19 | Oxide | 0.19 | 315 | 67.5 | 90.5 | 88.0 |
| 20 | Oxide | 0.37 | 330 | 49.7 | 86.7 | 84.2 |
| 21 | Oxide | 0.55 | 335 | 37.8 | 81.5 | 80.0 |
| 22 | Oxide | 0.70 | 340 | 28.1 | 75.8 | 76.4 |
| 23 | Oxide | 0.92 | 355 | 13.5 | 61.5 | 68.4 |
| 25 | Oxalate | 0.40 | 320 | 53.5 | 84.1 | 79.6 |

Figure 12:
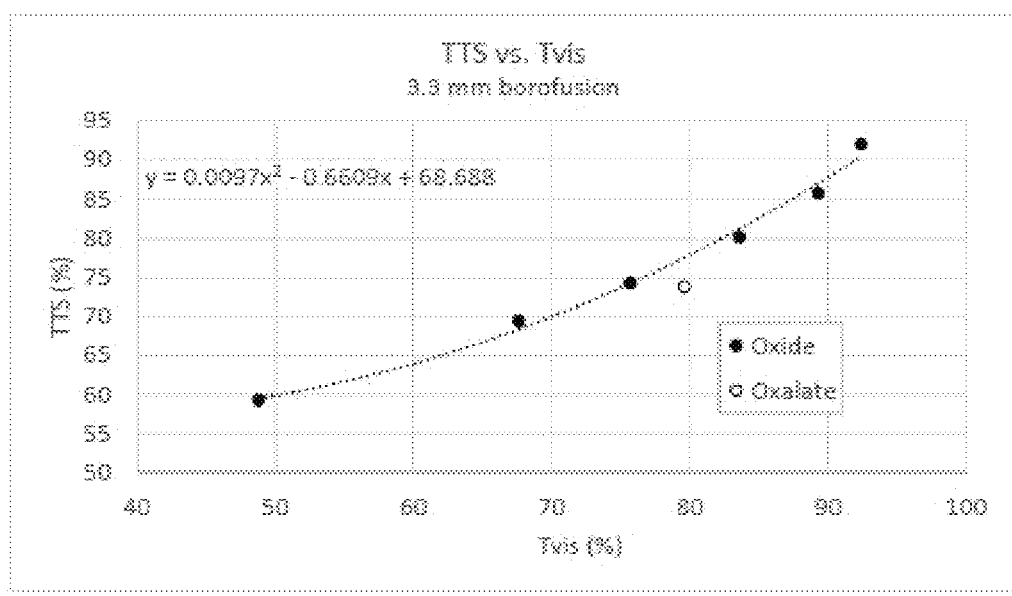
FIGS. 12 and 13 depict plots of visible light transmission against total solar transmission for glass compositions, according to exemplary embodiments.
Figure 13:
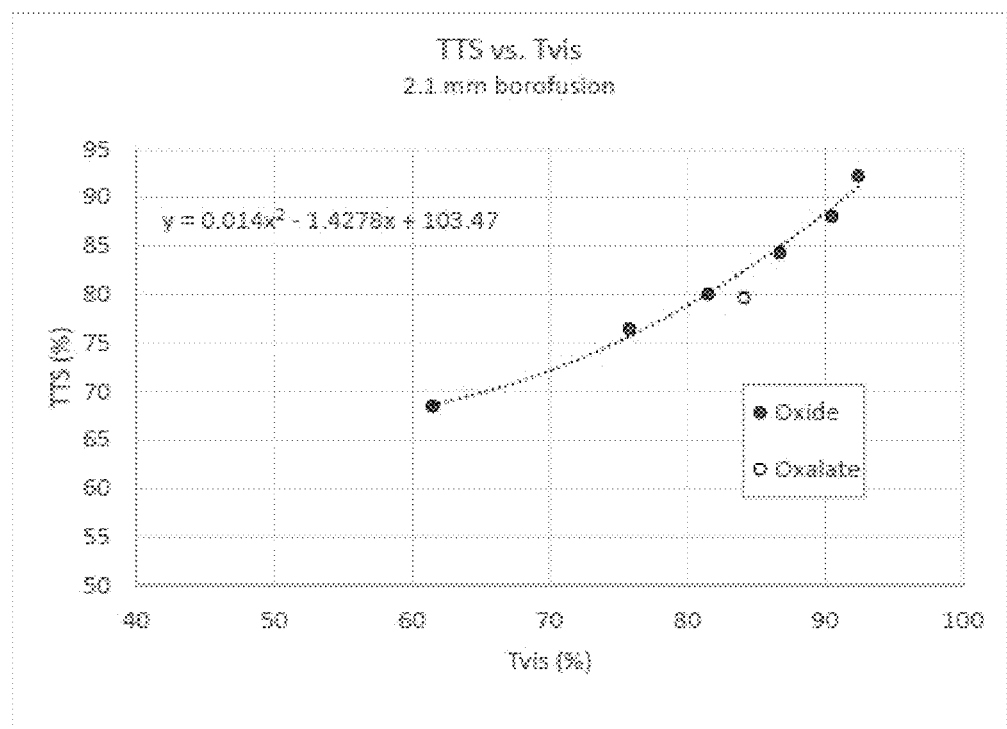

FIGS. 12 and 13 depict graphs plotting TTS against $T_{VIS}$ for the glass compositions contained in Tables 5 and 6. As can be seen in FIGS. 12 and 13, the iron content increases as the plot points go from the upper right to the lower left, defining a quadratic relationship. In FIG. 12, the relationship between $T_{VIS}$ and TTS is given by the equation TTS=0.0097 $(T_{VIS})^2$−0.6609($T_{VIS}$)+68.688. In FIG. 13, the relationship between $T_{VIS}$ and TTS is given by the equation TTS=0.014 $(T_{VIS})^2$−1.4278($T_{VIS}$)+103.47. It is believed that using iron oxalate as a source material for the iron compound of the borosilicate glass may shift the curves to the right, increasing the $T_{VIS}$ for the same level of TTS.

Figure 9:
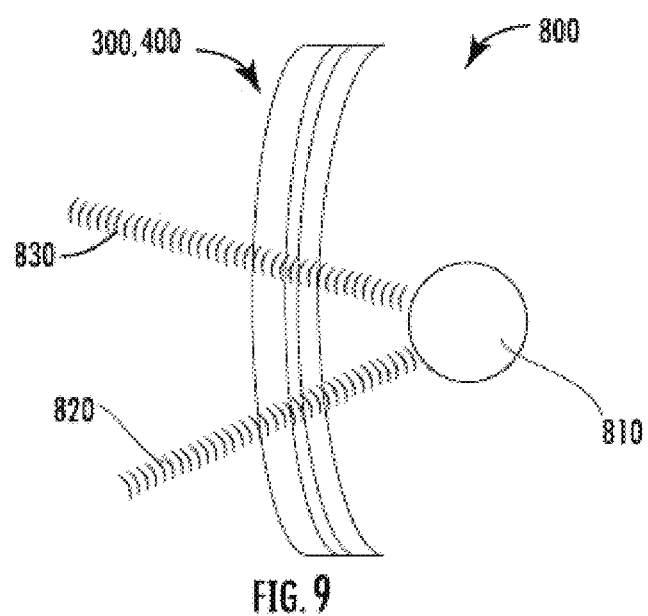
FIG. 9 depicts a system including a sensor configured to send and receive signals through a glass laminate having at least one glass ply made of the borosilicate glass composition, according to an exemplary embodiment.

In embodiments, the laminates 300, 400 described herein may be used in a system 800 that also includes a sensor 810 as shown in FIG. 9. In particular, the previous discussion demonstrates that the laminates 300, 400 transmit electromagnetic radiation in the visible spectrum, and as shown in FIG. 8, the laminates also substantially transmit electromagnetic radiation at wavelengths greater than 1500 nm (e.g., short-wave infrared). Signals carried on electromagnetic radiation in these ranges can be transmitted through the laminates 300, 400. FIG. 9 depicts the sensor 810 receiving incoming signals 820 and sending outgoing signals 830 through the laminates 300, 400. For example, in one or more embodiments, the laminate 300, 400 is included as glazing 130 in a vehicle 100 as depicted in FIG. 1. In such an embodiment, the sensor 810 is arranged on the interior of the vehicle 100. In this way, signals 820, 830 are able to be sent from and received by the vehicle 100. In one or more embodiments, the signals 820, 830 have a peak wavelength in the visible light (about 400 nm to about 750 nm) or short-wave infrared spectrums (1500 nm or greater). In embodiments, such signals facilitate autonomous or semi-autonomous driving of the vehicle, open road tolling, telecommunication, traffic monitoring and control, and vehicle-to-vehicle communication, amongst other possibilities. An example of a sensor 810 that can be utilized in the system 800 is LIDAR utilizing one or both of visible light or short-wave infrared radiation. In embodiments of the laminate 300, 400 that include an IRR coating, the IRR coating may be ablated from the ply on which it is applied in the region where the sensor 810 is configured to receive and send signals through the laminate 300, 400.

As mentioned above, the presently disclosed borosilicate glass composition has surprisingly improved deformation properties as compared to conventional soda-lime glass compositions and even to conventional borosilicate glass compositions. In particular, the inventors found that glass plies formed from borosilicate glass compositions disclosed herein surprisingly and unexpectedly densify upon deformation, which can limit the spread of radial cracks produced by, e.g., rocks and other flying debris from the roadway.

Figure 5A:
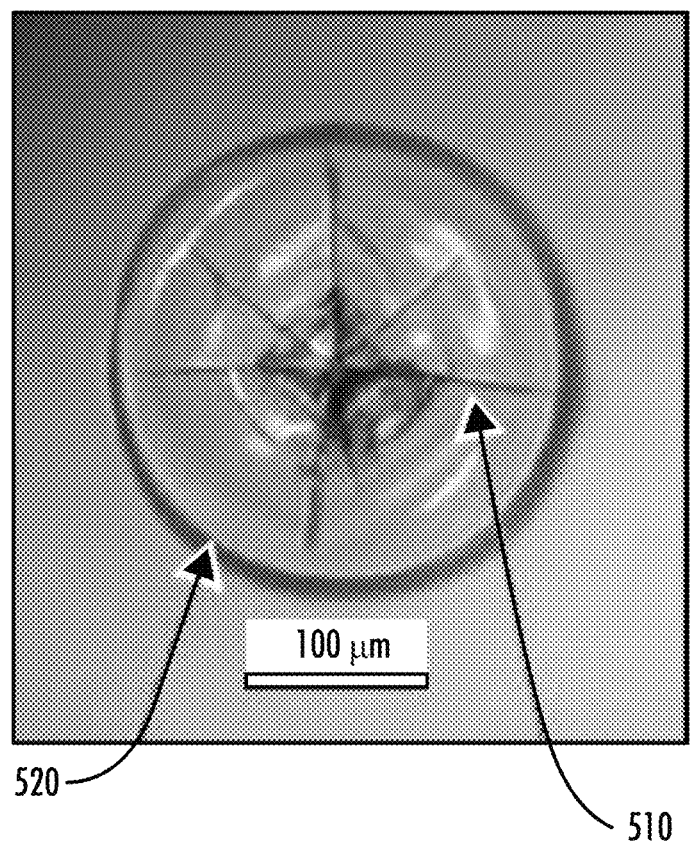
FIGS. 5A-5C depict micrographs of cracks resulting from of an indentation test, as well as graphs related thereto, for the disclosed fusion formed borosilicate glass composition (FIG. 5A), a comparative soda-lime glass composition (FIG. 5B), and a comparative float formed borosilicate glass composition (FIG. 5C)
Figure 5A:
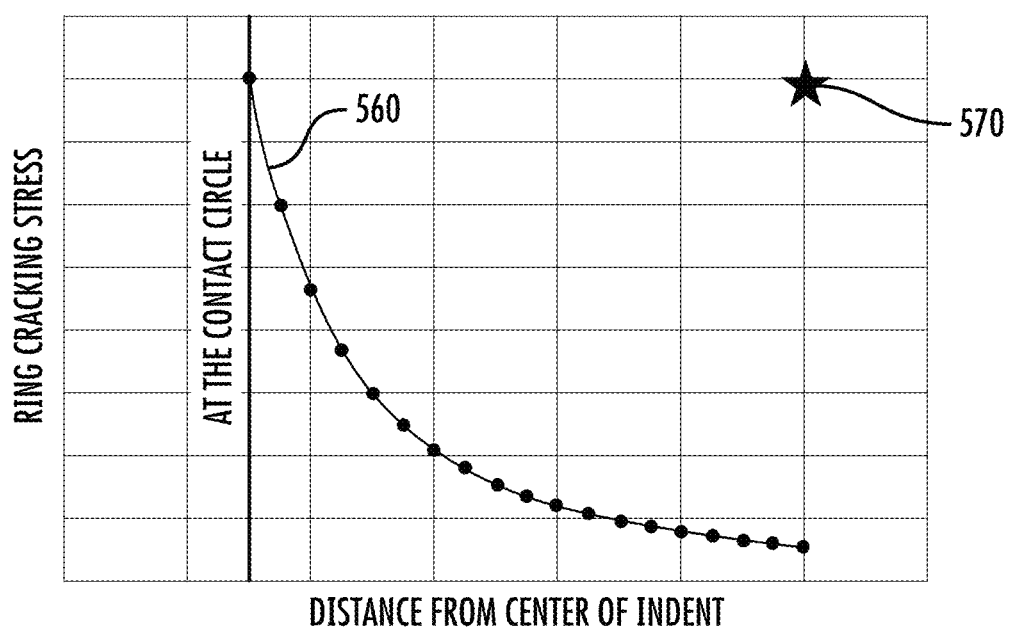
Figure 5B:
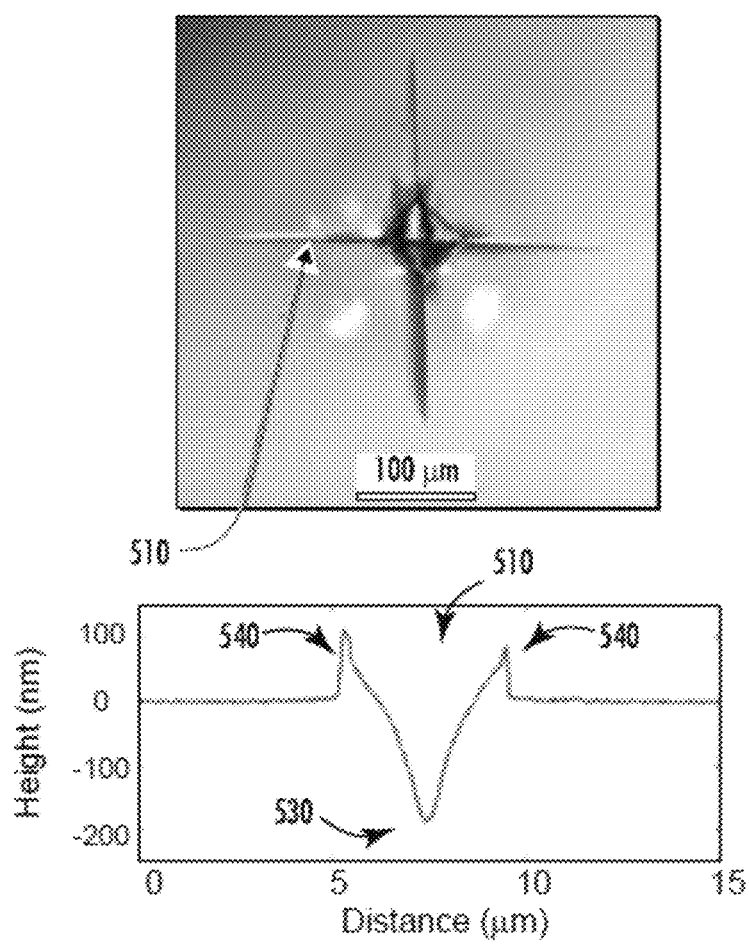
Figure 5C:
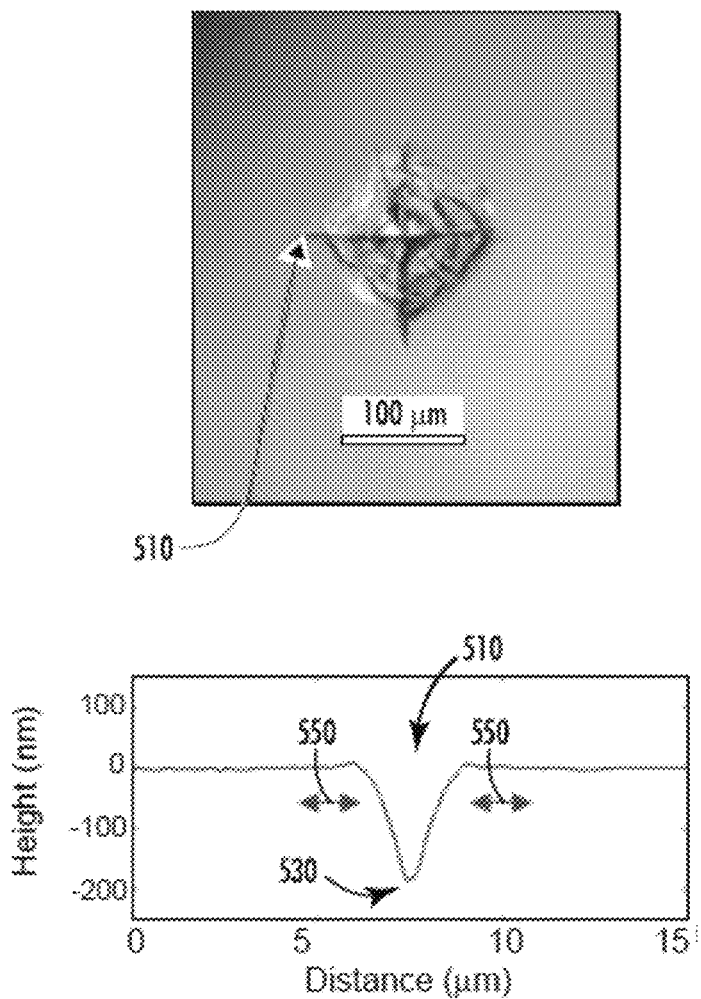

FIGS. 5A-5C depict crack formation produced by quasi static indents made using a 2 kilogram force (kgf) with a Vickers indentation tip for glass plies made from the presently disclosed borosilicate glass composition (FIG. 5A), a conventional soda lime silicate glass composition (FIG. 5B), and a conventional borosilicate glass composition (FIG. 5C). It is believed that the quasi-static indentation test using a Vickers tip provides a good indication of windshield performance when an outer surface of the windshield is struck by flying debris, such as a rock.

In the test, a more conventional borosilicate glass composition with respect to formability included 83.60 mol % $SiO_2$, 1.20 mol % $Al_2O_3$, 11.60 mol % $B_2O_3$, 3.00 mol % $Na_2O$, and 0.70 mol % $K_2O$. This conventional borosilicate glass composition had a density of 2.23 g/cm³, a strain point of 518° C., an anneal point of 560° C., an LTCTE of 3.25 pm/° C., a Young's modulus of 64 GPa, and a Poisson's ratio of 0.2. Thus, as compared to embodiments of the presently disclosed borosilicate glass composition, the conventional borosilicate glass composition includes less $Al_2O_3$, less total alkali content, especially $K_2O$, and less total alkaline earth content. Such conventional borosilicate glass compositions may be ployed in contexts where low coefficient of thermal expansion (e.g., 3.3 ppm/° C. or less) is desired. Alkali and Alkaline earth oxides tend to increase the coefficient of thermal expansion. Here, the slight increase in coefficient of thermal expansion to about 5-6 ppm/° C. is balanced against the ability to fusion form the presently disclosed borosilicate glass composition by increasing the liquidus viscosity and decreasing the $T_{200P}$ temperature. Further, as will be discussed below, the disclosed borosilicate glass composition had surprising and unexpected effects on the facture properties of glass plies made from the borosilicate glass composition.

As can be seen in FIGS. 5A-5C, each glass composition exhibits radial cracks 510 extending outwardly from the point where the Vickers indentation tip was pressed into the respective plies. However, as shown in FIG. 5A, the glass ply of the presently disclosed borosilicate glass composition exhibits a ring crack 520 formation that bounds the radial cracks 510 and preventing their further growth. In particular, the radial cracks 510 will not continue to extend radially because the radial cracks 510 are likely (e.g., more likely than not, statistically more likely, at least 51% likely, such as at least 60% likely, at least 80% likely out of sample size of 100) to be stopped and not traverse (e.g., are interrupted by) the ring crack 520. Advantageously, by limiting the spread of the radial cracks 510, the effect on the overall strength of the glass ply (which would be to decrease the strength) is reduced.

The graphs in FIGS. 5B and 5C demonstrate the topography of a line section of the cracks shown in the micrographs of FIGS. 5B and 5C. As can be seen in FIG. 5B, the radial crack 510 has a valley 530 at the center of the graph where the depth below the surface is the deepest. For the soda lime silicate glass of FIG. 5B, the structure of the glass provides relatively reduced free volume, and the broken glass networks shear under sharp contact, which causes the surface to pile-up to peaks 540. Hence, as shown in the micrograph of FIG. 5B, the surface around the radial cracks 510 is mounded.

For the conventional borosilicate glass composition of FIG. 5C, there is relatively higher free volume than the soda lime silicate glass and highly connected networks in the glass structure, which preferentially densifies under sharp contacts. The radial crack 510 still includes a central valley 530 at the center of the graph, but there are no substantial peaks at the edges of the radial crack 510 as the densification of the structure (as denoted by arrows 550) conserves volume, resulting in high ring stress that produces the cluster of ring cracks shown in the micrograph of FIG. 5C.

Returning to FIG. 5A, a contrast can be seen between the conventional borosilicate glass composition of FIG. 5C and the presently disclosed borosilicate glass composition. In the graph of FIG. 5A, the ring cracking stress is shown as a function of distance from the contact circle of the indenter. For the conventional borosilicate glass composition (denoted by curve 560), the ring stress decreases as the distance from the contact circle increases, which places the maximum ring cracking stress at the periphery of the contact circle. However, for the presently disclosed borosilicate glass composition, stress field analysis of the cracks of FIGS. 5A and 5C demonstrates that the maximum ring cracking stress (denoted by star 570) is surprising and unexpectedly spaced a distance away from the periphery of the contact circle. By forming a ring at a distance removed from the crack boundary, strength limiting median and radial cracks 510 are contained within the ring crack 520 for the presently disclosed borosilicate glass composition.

While the Vickers indentation test considers a quasi-static load (i.e., where the load is applied slowly such that the inertial effects of loading are negligible), it was also found using a Vickers dart drop test that the fusion-formed borosilicate glass composition performed as well as conventional float-formed borosilicate glass and better than soda-lime silicate glass when exposed to a dynamic load. In the Vickers dart drop test, a dart having a Vickers indentation tip (136°) and a weight of 8.6 g was dropped from increasing heights (50 mm increments) until a visible crack (i.e., crack having a length of at least 10 mm) was formed in the glass ply. The soda-lime silicate glass had an average height of visible crack formation of less than 600 mm. The presently disclosed borosilicate glass had an average height before visible crack formation of over 600 mm, in particular over 650 mm, which is about the same as would be expected from conventional borosilicate glass compositions. It is believed that the dart-drop test provides an indication of the contact rate and force needed for radial crack formation to exceed the ability of the glass to densify for the formation of ring cracks in the presently disclosed borosilicate glass composition.

Figure 6A:
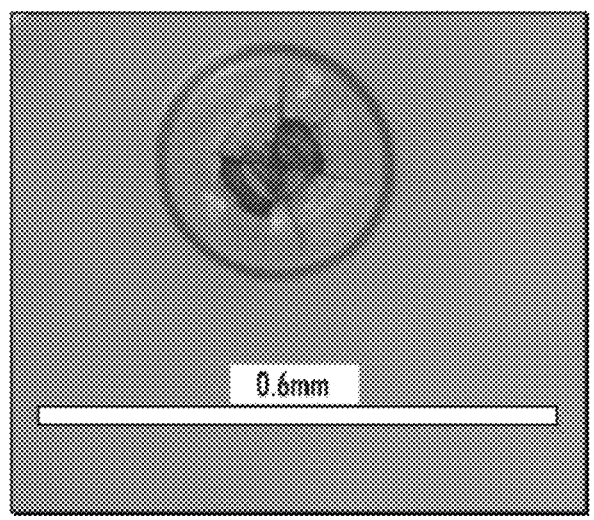
FIGS. 6A and 6B depicts results of a thermal shock test for the disclosed fusion formed borosilicate glass composition (FIG. 6A) and for a comparative soda-lime glass composition (FIG. 6B)
Figure 6B:
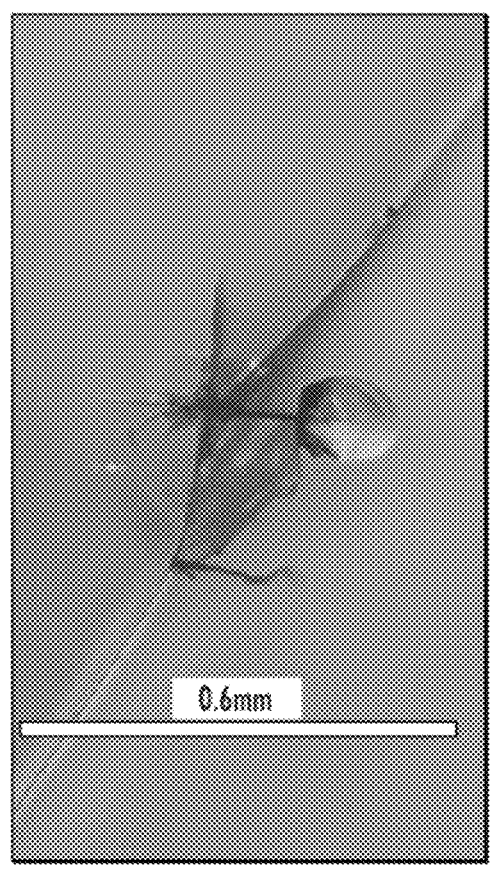

As was also mentioned above, glass plies formed from the presently disclosed borosilicate glass composition are more resistant to thermal shock than soda lime silicate glasses. The effect of a thermal shock load is shown in FIGS. 6A and 6B. In particular, specimens of the presently disclosed fusion formed glass composition (FIG. 6A) and soda lime glass (FIG. 6B) were indented with a Vickers indenter at 2 kgf as discussed above in relation to FIGS. 5A and 5B. The specimens were then heated up to 150° C., and a droplet of water (at 25° C.±5° C.) was dropped onto the indent site while the specimens were still hot. As can be seen in FIG. 6B, the soda-lime silicate glass cracks readily propagate during this thermal shock event. By comparison, the cracks in the fusion formed borosilicate glass composition remain confined within the ring crack boundary as shown in FIG. 6A. One reason for the resistance to thermal shock is the ring crack boundary that prevents radial crack extension. Another reason for the resistance to thermal shock is that the LTCTE for the fusion formed borosilicate glass composition is considerably lower than soda-lime silicate (5.6 ppm/° C. or less for the fusion formable borosilicate glass composition vs. 8.0 ppm/° C. for the soda-lime silicate).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

According to an exemplary embodiment and in furtherance the above disclosed information, a vehicle windshield or other article may include a first ply (e.g., outer ply, glass sheet; see, e.g., ply first glass 310 of FIG. 3) comprising a first major surface (e.g., outside surface, front-facing surface) and a second major surface opposite to the first major surface, a second ply (e.g., outer ply, glass sheet; see, e.g., second glass ply 320) comprising a third major surface and a fourth major surface opposite to the third major surface, and an interlayer (see, e.g., interlayer 330) coupling the second major surface of the first ply to the third major surface of the second ply. In contemplated embodiments, any of the first, second, third, and/or fourth surfaces may be coated, such as with a functional layer, such as ultra-violet light reflective layer, hydrophobic layer, adhesive promoting layer, etc., as disclosed above.

In some embodiments, the second ply is a tempered soda lime glass. In other embodiments, the second ply is an ion-exchanged aluminoborosilicate glass. In still other embodiments, the second ply is a glass-ceramic. In some embodiments, the interlayer includes a polymer, such as polyvinyl butyral.

Referring to Tables 1-3, the low-temperature coefficient of thermal expansion of compositions disclosed herein may range from more than 4.4 ppm/° C. to less than 6.09 ppm/° C., such as from 4.5 ppm/° C. to 6 ppm/° C., to 5.8 ppm/° C., and/or 5.6 ppm/° C. As indicated, LTCTE is obtained by measuring expansion of the glass between the temperatures of 0° C. and 300° C., such as by thermomechanical analysis described in ASTM Test Method E831 (Ref 4). In other contemplated embodiments, glasses with unique fracture behavior disclosed herein may not have viscosity for fusion forming, the glasses may have lower, or higher LTCTEs. In some embodiments, LTCTE of compositions disclosed herein is less than 8.7 ppm/° C., which may be associated with soda lime glass, and/or greater than 3.25 ppm/° C., which may be associated with lower-CTE borosilicates. Accordingly, glasses disclosed herein may be less thermal shock resistant than some lower-CTE borosilicates, which may be counter-intuitive. However, Applicants have found a higher CTE (e.g., greater than 3.25 ppm/° C.) will result in higher surface compression after thermal reforming. Disadvantages associated with lower thermal shock resistance may be offset by the unique fracture mechanics of glasses disclosed herein, further discussed below. A result is that glasses disclosed herein are more thermal resistant than soda lime by having a lower LTCTE than 8.7 ppm/° C., and may also have improved for blunt impact performance over other borosilicates.

In some embodiments, the first ply has a thickness of at least 200 μm and no more than 1 cm, and/or thicknesses disclosed above, such as 0.1 mm to about 6 mm. In other contemplated embodiments, a first ply, single-ply, monolithic sheet, substrate, or other article of borosilicate glass as disclosed herein may have such thicknesses as disclosed above or other thicknesses, such as less than 200 μm and/or at least 20 μm, or at least 1 cm and/or less than 1 m, where thickness may be constant or generally constant over the article (e.g., glass sheet, ply), such as within 100 μm of an average thickness of the respective article, such as within 10 μm of an average thickness, or the thickness may vary over the article, such as with a glass container having a thicker lip or base.

According to an exemplary embodiment, the interlayer cushions the first ply with respect to the second ply, thereby mitigating communicating of cracks therebetween. In contemplated embodiments, the interlayer has a modulus of rigidity that is less than that of glass of the first and/or second ply, such as less than 0.7 thereof, such as less than 0.5 thereof.

According to an exemplary embodiment, the interlayer adheres to the first ply, thereby controlling loss of fragments from fracture of the first ply. In some embodiments, the interlayer is directly contacting the first ply. As discussed above, in some embodiments the interlayer adheres to the first ply, the second ply, and/or both, and couples the first and second plies. According to an exemplary embodiment, the second ply reinforces the first ply, stiffening the first ply to bending forces applied thereto. However, in other contemplated embodiments, the first ply may be independent of a second ply or interlayer, and may instead be a monolith, for example.

According to an exemplary embodiment, the first ply has curvature such that the second major surface is concavely curved, and the second ply has curvature such that the third major surface is convexly curved and fits together with the second major surface, as disclosed above such that the first major surface of first ply is configured as an outward-facing surface of glazing, such as laminate glazing, such as a windshield and configured to be outboard when installed on a vehicle.

According to an exemplary embodiment, the first ply includes a borosilicate glass composition, such as those disclosed herein. In terms of constituent oxides, the borosilicate glass composition of the first glass ply includes (i) $SiO_2$, $B_2O_3$, and/or $Al_2O_3$; and (ii) one or more alkali metal oxides (also called alkaline oxides; e.g., $Li_2O$, $Na_2O$, $K_2O$, $Rb_2O$, $Cs_2O$) and/or one or more divalent cation oxides (zinc oxide and/or alkaline earth metal oxides, also called alkaline earth oxides, such as MgO, CaO, SrO, BaO).

According to some embodiments, such as those exhibiting self-terminating crack loop behavior as disclosed herein, concentrations in mole percent on an oxide basis of $SiO_2$, $B_2O_3$, the one or more alkali metal oxides, and, when included in the composition, $Al_2O_3$ and the one or more divalent cation oxides, satisfy some (e.g., one or a combination of more than one) or all the relationships: (relationship 1) $SiO_2 \geq 72$ mol %, such as $SiO_2 \geq 72.0$, such as $SiO_2 \geq 73.0$, such as $SiO_2 \geq 74.0$, and/or $SiO_2 \geq 92$, such as $SiO_2 \leq 90$; (relationship 2) $B_2O_3 \geq 10$ mol %, such as $B_2O_3 \geq 10.0$, such as $B_2O_3 \geq 10.5$, and/or $B_2O_3 \leq 20$, such as $B_2O_3 \leq 18$; (relationship 3) $(R_2O+R'O) \geq Al_2O_3$, such as $(R_2O+R'O) \geq (Al_2O_3+1)$, such as $(R_2O+R'O) \geq (Al_2O_3+2)$, and/or (relationship 4) $0.80 \leq (1-[(2R_2O+2R'O)/(SiO_2+2Al_2O_3+2B_2O_3)]) \leq 0.93$, where $R_2O$ is the sum of the concentrations of the one or more alkali metal oxides and, when included in the borosilicate glass composition, R'O is the sum of the concentrations of the one or more divalent cation oxides. $R_2O$ may be the sum of $Li_2O$, $Na_2O$, $K_2O$, $Rb_2O$, $Cs_2O$ for example, and R'O may be the sum of MgO, CaO, SrO, BaO, ZnO for example.

Inventive glasses disclosed herein may include additional constituents. In some embodiments, the borosilicate glass composition may further include $P_2O_5$. Notably, if $P_2O_5$ is added to the glass, it should be treated as non-rotatable network former (u or v) when considering the relationship (4) such as $R_2O$ or R'O, where the relationships (3) and (4) may be modified as $(R_2O+R'O+P_2O_5) \geq Al_2O_3$, and $0.80 \leq (1-[(2R_2O+2R'O+2P_2O_5)/(SiO_2+2Al_2O_3+2B_2O_3)]) \leq 0.93$.

Other minor chemical components, such as fining agent $SnO_2$, $Sb_2O_3$, NaCl, are generally negligible with respect to rotatability and fracture behavior. Other minor chemical components, such as color agent such as with which concentration smaller than 0.5 mol %, are negligible.

Applicants believe relationships (3) and (4) may relate to fracture behavior of borosilicate glass compositions disclosed herein and characterize aspects of "rotatability" of the respective compositions. For compositions of the form $xSiO_2 \cdot yAl_2O_3 \cdot zB_2O_3 \cdot uR_2O \cdot vRO$, where x, y, z, u, v can represent mol % or molar fraction of each type of oxide. If $(u+v) \geq y$, Applicants believe the fracture behavior is related to a rotatability parameter of $(1-[(2R_2O+2R'O)/(SiO_2+2Al_2O_3+2B_2O_3)])$. In instances when the value of the rotatability parameter is between 0.80 and 0.93, Applicant have found that Vickers indenter tests produce radial and lateral cracks that are contained within a small (<1 mm in diameter) crack loop. A result is that sheets of glasses within this range may not crack to failure during Vickers indenter tests, but instead only form small round cracks that contain other cracks and prevent them from spreading.

Similarly, Applicants believe density may relate to fracture behavior of the borosilicate glass compositions disclosed herein. According to an exemplary embodiment, density of the glass is greater than 2.230 g/cm$^3$ and/or is less than 2.397 g/cm$^3$, and this cracking behavior has been observed in this range.

Vickers indenter tests may be used to characterize fracture behavior of glass, as discussed in Gross et al., *Crack-resistant glass with high shear band density*, Journal of Non-Crystalline Solids, 494 (2018) 13-20; and Gross, *Deformation and cracking behavior of glasses indented with diamond tips of various sharpness*, Journal of Non-Crystalline Solids, 358 (2012) 3445-3452, both of which are incorporated by reference herein. In some embodiments, when glass having the borosilicate glass composition of the first glass ply is formed as at least ten polished, flat samples (e.g., 100 samples) of 1 mm thickness with a major surface of at least 2×2 cm$^2$ area (e.g., 2 cm by 2 cm square), and tested using square-based, 136° four-sided, pyramidal Vickers indenter directed orthogonally into a center of the major surface at 25° C. in 50% relative humidity and the indenter is quasi-statically displaced at rate of 60 μm per second up to maximum 3 kg-force with indentation load held for 10 seconds (unless failure by fracture of the sample occurs first), more often than not (at least 51 times out of 100; at least 6 times out of 10) all cracks extending through the sample radially and/or laterally from beneath the indenter tip (i.e. the location where the indenter tip contacted the glass) are interrupted by a self-terminating crack loop (e.g., ring crack), whereby fracture of the samples from the Vickers indenter is limited to cracking within the loop. Essentially the indenter crushes and cracks the glass beneath the indenter. However, the crack loop forms and stops spread of cracking originating from the indenter contact beyond the crack loop. By contrast, lateral or radial cracks may otherwise form prior to and/or pass through such crack loops in other glasses (e.g., anomalous cracking) or crack loops may not form (e.g., normal cracking), and in either case the lateral or radial cracks would not be contained by the crack loop, and may propagate through the full glass article causing overall fracture through the article and failure thereof.

The following Table 100 summarizes the value of rotatability parameter of $(1-[(2R_2O+2R'O)/(SiO_2+2Al_2O_3+2B_2O_3)])$, density, and Vickers indention fracture behavior for various borosilicate glass compositions tested.

TABLE 100

| | | CE-101 | CE-102 | DSG | DSX | DQQ | DQR | DQS | DQT |
|---|---|---|---|---|---|---|---|---|---|
| $SiO_2$ | mol % | 77.18 | 78.97 | 76.42 | 76.38 | 75.35 | 76.72 | 76.14 | 75.18 |
| $Al_2O_3$ | mol % | 1.98 | 2.04 | 2.04 | 3.56 | 3.54 | 3.54 | 3.54 | 4.07 |
| $B_2O_3$ | mol % | 4.66 | 8.67 | 14.71 | 12.26 | 12.21 | 10.75 | 11.31 | 12.01 |
| $Na_2O$ | mol % | 16.14 | 10.28 | 6.8 | 4.87 | 4.6 | 4.67 | 4.68 | 4.61 |
| $K_2O$ | mol % | | | | 1.01 | 2.13 | 2.18 | 2.18 | 2.93 |
| MgO | mol % | | | | 1.81 | 0.99 | 0.99 | 0.99 | 0.02 |
| CaO | mol % | | | | 0 | 1.03 | 1.02 | 1.02 | 1.05 |
| $SnO_2$ | mol % | | | | 0.11 | 0.14 | 0.13 | 0.13 | 0.13 |
| density | g/cm$^3$ | 2.428 | 2.397 | 2.275 | 2.273 | 2.307 | 2.308 | 2.308 | 2.316 |
| Rotatability value | | 0.64 | 0.8 | 0.88 | 0.86 | 0.84 | 0.83 | 0.83 | 0.84 |
| Fracture behavior | | normal | normal | contained | contained | contained | contained | contained | contained |

| | | DQU | DQV | DSP | DSQ | DSR | DSS | DST | DSU |
|---|---|---|---|---|---|---|---|---|---|
| $SiO_2$ | mol % | 77.19 | 76.36 | 76.34 | 76.06 | 76.15 | 76.19 | 76.23 | 76.09 |
| $Al_2O_3$ | mol % | 4.04 | 4.07 | 3.56 | 3.54 | 3.54 | 3.55 | 3.55 | 3.54 |
| $B_2O_3$ | mol % | 9.84 | 10.86 | 11.8 | 12.43 | 12.89 | 13.35 | 13.73 | 14.28 |
| $Na_2O$ | mol % | 4.7 | 4.57 | 4.29 | 4.15 | 3.85 | 3.55 | 3.33 | 3.12 |
| $K_2O$ | mol % | 3.05 | 2.94 | 1.96 | 1.95 | 1.8 | 1.65 | 1.58 | 1.51 |
| MgO | mol % | 0.02 | 0.02 | 0.95 | 0.86 | 0.82 | 0.77 | 0.71 | 0.66 |
| CaO | mol % | 1.03 | 1.03 | 0.99 | 0.9 | 0.86 | 0.82 | 0.76 | 0.7 |
| $SnO_2$ | mol % | 0.13 | 0.14 | 0.1 | 0.1 | 0.1 | 0.1 | 0.1 | 0.1 |
| density | g/cm$^3$ | 2.335 | 2.324 | 2.298 | 2.285 | 2.271 | 2.259 | 2.246 | 2.234 |
| Rotatability value | | 0.83 | 0.84 | 0.85 | 0.85 | 0.87 | 0.88 | 0.88 | 0.89 |
| Fracture behavior | | contained | contained | contained | contained | contained | contained | contained | contained |

| | | DSV | DSW | DSX | DSY | DSZ | DUE | CE-103 | CE-104 |
|---|---|---|---|---|---|---|---|---|---|
| $SiO_2$ | mol % | 75.91 | 76.14 | 76.35 | 76.04 | 76.03 | 74.89 | 75.54 | 83.6 |
| $Al_2O_3$ | mol % | 3.53 | 3.54 | 3.56 | 3.54 | 3.54 | 3.5 | 2.01 | 1.2 |
| $B_2O_3$ | mol % | 12.63 | 12.31 | 12.26 | 12.4 | 12.37 | 13.6 | 19.76 | 11.6 |
| $Na_2O$ | mol % | 4.98 | 6.09 | 4.87 | 4.97 | 6.13 | 5.22 | 2.66 | 3 |
| $K_2O$ | mol % | 1.05 | 0 | 1.01 | 1.05 | 0 | 0.92 | | 0.7 |
| MgO | mol % | 0.86 | 0.87 | 1.81 | 0.03 | 1.78 | 1.76 | | |
| CaO | mol % | 0.9 | 0.91 | 0.02 | 1.83 | 0.02 | | | |

TABLE 100-continued

| | | | | | | | | |
|---|---|---|---|---|---|---|---|---|
| SnO$_2$ mol % | 0.11 | 0.11 | 0.11 | 0.11 | 0.1 | 0.11 | | |
| density g/cm$^3$ | 2.286 | 2.284 | 2.273 | 2.295 | 2.273 | 2.273 | 2.147 | 2.23 |
| Rotatability value | 0.86 | 0.85 | 0.86 | 0.85 | 0.85 | 0.86 | 0.96 | 0.93 |
| Fracture behavior | contained | contained | contained | contained | contained | contained | anomalous | anomalous |

In Table 100, for some compositions the fracture behavior is identified as "contained" as opposed to "anomalous" or "normal" facture behavior. Radial and lateral cracks that were contained in a crack loop (e.g., circular ring crack) did not extend beyond the crack loop, even hours after indention testing (e.g., 12 hours, 24 hours, 72 hours after). As such samples with the contained cracks only cracked locally, within the crack loop, and did not fail beyond the crack loop. As summarized in Table 100, Applicant observed polished, flat samples of 1 mm to 3.3 mm thickness tested using square-based, 136° four-sided, pyramidal Vickers indenter quasi-statically displaced at rate of 60 μm per second until fracture or up to maximum 3 kg-force with indentation load held for 10 seconds. Furthermore, as evidence that the radial and lateral cracks were contained, when rapidly cooled by placement of corresponding samples into cold water, cracks did not propagate beyond the crack loop and the observed samples did not fail outside the crack loop. Radial and lateral cracks that were contained in a crack loop, with the samples rapidly cooled, did not extend beyond the crack loop, even hours after indention testing (e.g., 2 hours, 12 hours, 24 hours, 72 hours after).

For the composition labelled DUE in Table 100, crack loops were observed to be shaped as circular rings or ring cracks (see generally FIGS. 5A & 6A). When loaded to 2 kg-force, the radii of the rings ranged from 101 to 136 micrometers. When loaded to 3 kg-force, the radii of the rings ranged from 119 to 229 micrometers.

Also, for the composition labelled DUE in Table 100, 19 different indent tests were performed for samples with a thickness of 1 mm, and the result was 19 of the 19 tests had circular ring cracks that contained the radial and lateral cracks from the indenter. Applicants expect similar results with more testing, such as at least 90 out of 100 samples, such as at least 95, such as at least 98.

Applicants observed that for some samples, cracks may be delayed but show up within approximately 2 hours of indentation testing. But, radial and lateral cracks of the DUE samples were contained in a crack loop and did not extend beyond the crack loop, even hours after indention testing (e.g., 2 hours, 12 hours, 24 hours, 72 hours after).

For the composition labelled DQS in Table 100, ten different indent tests were performed for samples with a thickness of 1 mm, and the results were 10 out of 10 samples produced crack loops in the form of circular ring cracks that contained the radial and lateral cracks from the indenter. The radial and lateral cracks did not extend beyond the crack loop, even hours after indention testing (e.g., 2 hours, 12 hours, 24 hours, 72 hours after). Applicants expect similar results with more testing, such as at least 90 out of 100 samples, such as at least 95, such as at least 98.

The same DQS composition was tested in samples with a thickness of 3.3 mm, and 16 of 20 different tests resulted in circular ring cracks that contained the radial and lateral cracks from the indenter. Applicants expect similar results with more testing, such as at least 50 out of 100 samples, such as at least 60, such as at least 75. Without being bound to any theory, Applicants believe that the decreased percentage of occurrence with 3.3 mm samples may have been due to inhomogeneity of the samples, rather than thickness.

For samples of DSX composition in Table 100, 21 different indent tests were performed for samples with a thickness of 1 mm, and the results were 19 with circular ring cracks that contained the radial and lateral cracks from the indenter. Applicants expect similar results with more testing, such as at least 70 out of 100 samples, such as at least 80, such as at least 90. Those radial and lateral cracks did not extend beyond the crack loop, even hours after indention testing (e.g., 2 hours, 12 hours, 24 hours, 72 hours after).

Figure 14:
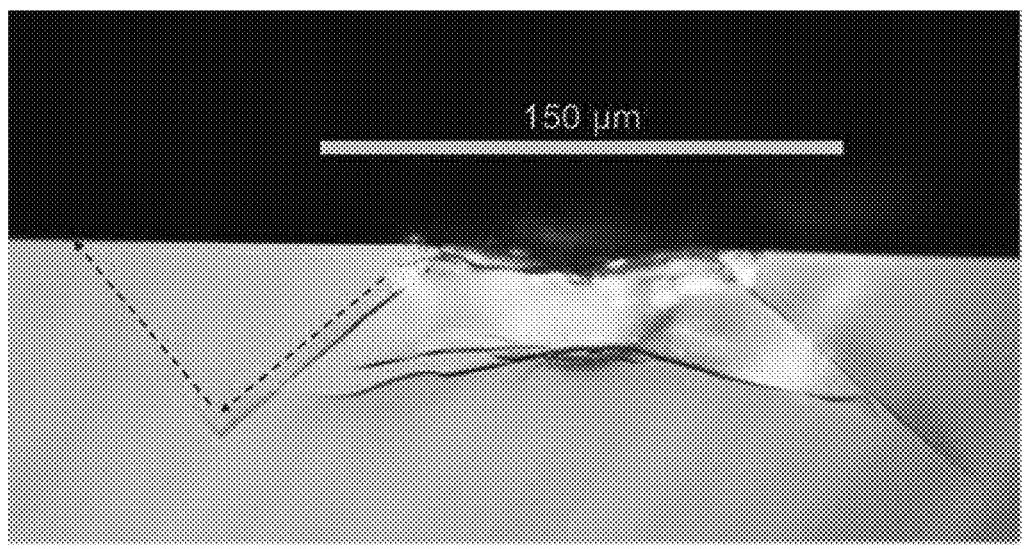
FIG. 14 is a digital image of a glass article in cross-section, according to exemplary embodiments.

As shown in FIG. 14, Applicants were able to observe a cross-section of a sample of borosilicate glass, as disclosed herein, and view cracking of the sample via fractography. The image shows cracking of a normal cone beneath the indent location that appears to then change direction and head back to the same surface, presumably to form the crack loop. Further, the crack cone keeps extending through the sample to the opposing surface. Applicants believe this to be newly discovered fracture behavior for the presently disclosed glasses and structures.

In contemplated embodiments, a glass article (e.g. sheet, ply, film, cover, tube, container) of borosilicate glass, as disclosed herein, includes one or more crack loops, as disclosed above, such as having a generally round perimeter, such as a circular perimeter. The crack loops may be particularly small, such as having a cross-sectional dimension in a direction along a surface of the glass article that is less than 10 mm, such as less than 2 mm, such as less than 1 mm, such as less than 0.7 mm (as shown in FIG. 6A for example), and/or at least 10 μm, such as at least 50 μm, such as at least 100 μm, such as at least 200 μm.

Thickness of the article, uniformity of the dimensions of the article, rate of loading, composition and microstructure of the borosilicate glass, support underlying the article, geometry of the indenter, or other parameters may influence fracture behavior. For example, Applicants demonstrated different size crack loops with the DUE composition resulting from different loading, as discussed above.

If the cone extends to the opposing surface and the crack loop intersects the cone, as shown in FIG. 14, then the ring crack in combination with the cone may form a crack-enclosed section of the article that passes fully through the article. At least portions of the crack-enclosed section may have a round periphery, such as at surfaces of the article. The crack enclosed section may generally have a cone shape, an hourglass shape, or another shape. Due to unique fracture behavior of borosilicate glasses disclosed herein, purposeful mechanical fracturing of the glass articles may be used to form holes or other precise geometries, such as surface dimples where a cone does not extend fully through the article. Etchants, lasers, plasma, heat, etc., may be used to further process the articles, such as to arrest cracks, dull sharp edges associated with the cracking.

In contemplated embodiments, an article may have at least one crack loop and/or associated structure (e.g., hole) as disclosed above, or the article may have more than one of the crack loops, such as at least 10, at least 100, at least 1000 crack loops, which may connect with cones to pass fully through such articles to form holes, when (fractured) glass interior to the crack loop is removed, such as mechanically or by chemical etchants. Such articles may be useful as a sieve, a mesh, a panel, a substrate or component in a battery or electronic device for example. Lines of small crack loops in series (e.g., perforation line) may aid in controlled separation of sheets or shapes through guided fracture between the loops. Holes formed in the article may allow for breathability of the article, and/or for liquids, adhesives, polymers in fluid-state, conductive metals, etc. to pass through the article. The loops cracks may be arranged in a pattern or in patterns on the article. In some contemplated embodiments, such as with articles (e.g., sheets) having more than one crack loop, the crack loops may vary in size, such as where one crack loop has a diameter that is at least 20% greater than another crack loop in the same article.

Controlled cracking of an article, such as a sheet of borosilicate glass as disclosed herein, may differ from use of lasers to crack a glass sheet to form a via or other hole or feature because the crack loops disclosed herein may be a single continuous crack ring, as opposed to numerous smaller cracks extending in various directions. The crack loop may be unlikely to propagate beyond the loop, as demonstrated by the testing disclosed herein. In some embodiments, articles that include one or more crack loops or associated structures may not require or may require fewer etchants or other means to dull edges or microcracking.

With that said, some inventive glasses disclosed herein may have conventional fracture behavior, such as glasses that are borosilicate glasses that are able to be fusion formed but have normal or anomalous cracking in Vickers indention testing as disclosed herein. And vice versa, some inventive glasses disclosed herein may have unique crack loop fracture behavior, such as glasses that are borosilicate glasses but may be more difficult to fusion form. Still other embodiments may have the unique fracture behavior and fusion formability, thereby providing glasses that are particularly advantageous for outer plies in laminate windshields or in other articles disclosed herein.

Each of U.S. Application No. 63/023,518 filed May 12, 2020, Ser. No. 17/327,870 filed May 24, 2021, 63/088,525 filed Oct. 7, 2020, Ser. No. 17/068,272 filed Oct. 12, 2020, 63/136381 filed Jan. 12, 2021, 63/151,210 filed Feb. 19, 2021, 63/177,536 filed Apr. 21, 2021, 63/209,489 filed May 11, 2021, is incorporated by reference herein in its entirety. U.S. Application No. 63/059,105 filed Jul. 30, 2020, is incorporated by reference herein in its entirety. U.S. Application No. 63/050,181 filed Jul. 10, 2020, is incorporated by reference herein in its entirety.

According to exemplary embodiments and in furtherance of the above disclosed information, further examples are herein described. The further examples are summarized in the Table 200 below.

TABLE 200

|  | Example | | | |
| --- | --- | --- | --- | --- |
|  | 26 | 27 | 28 | 29 |
| $SiO_2$ | 75.93 | 75.71 | 76.06 | 75.70 |
| $Al_2O_3$ | 3.46 | 3.56 | 3.54 | 3.49 |
| $B_2O_3$ | 12.65 | 12.64 | 12.34 | 12.68 |
| $Na_2O$ | 5.20 | 5.24 | 6.07 | 5.23 |
| $K_2O$ | 0.92 | 0.94 | 0 | 0.93 |
| MgO | 1.74 | 1.77 | .03 | 1.77 |
| CaO | 0 | 0 | 1.82 | 0.02 |

TABLE 200-continued

|  | Example | | | |
| --- | --- | --- | --- | --- |
|  | 26 | 27 | 28 | 29 |
| $SnO_2$ | 0.06 | .06 | 0.11 | 0.06 |
| $Fe_2O_3$ | 0.04 | 0 | 0 | 0.12 |
| Density (g/cm³) | 2.266 | 2.26 | 2.296 | — |
| Strain Point (° C.) | 494 | — | — | — |
| Anneal Point (° C.) | 540 | — | — | — |
| LTCTE (ppm/° C.) | 4.5 | — | — | — |
| Young's Modulus (GPa) | 62.7 | — | — | — |
| Poisson's Ratio | 0.196 | — | — | — |
| Fulchers A | −1.891 | — | — | — |
| Fulchers B | 7026.7 | — | — | — |
| Fulchers To | 25.3 | — | — | — |
| 200 P Temp (° C.) | 1702 | — | — | — |
| 35 kP Temp (° C.) | 1117 | — | — | — |
| 200 kP Temp (° C.) | 1002 | — | — | — |
| Liquidus Viscosity (kP) | 1388 | — | — | — |
| Phase | Cristobalite | — | — | — |

As shown in the Table 200, the composition of Example 26 includes greater than or equal to 12 mol % $B_2O_3$, $Al_2O_3$ in an amount that is greater than or equal to 3 mol % and less than or equal to 5 mol %, $Na_2O$ in an amount that is greater than or equal to 4 mol % and less than or equal to 6 mol %, and meets the relationships (1), (2), (3), and (4) described herein. Accordingly, glasses constructed in accordance with Example 26 exhibit the favorable fracture behavior described herein and may also be fusion formed to produce glass articles suitable for the uses described herein.

In embodiments, the glass compositions described herein include amounts of $Al_2O_3$ and $Na_2O$ that satisfy the relationship $Na_2O > Al_2O_3 + 1$, (e.g., $Na_2O > Al_2O_3 + 1.25$, $Na_2O > Al_2O_3 + 1.5$, $Na_2O > Al_2O_3 + 1.75$, $Na_2O > Al_2O_3 + 2.0$). In embodiments, the $Al_2O_3$ content of the glass compositions described herein is greater than or equal to 2.0 mol % and less than or equal to 5.0 mol % (e.g., greater than or equal to 2.5 mol % and less than or equal to 5.0 mol %, greater than or equal to 3.0 mol % or less than or equal to 5 mol %). When combined with compositions having greater than or equal to 12.0 mol % $B_2O_3$ (e.g., greater than or equal to 13.0 mol % $B_2O_3$, greater than or equal to 14.0 mol % $B_2O_3$, greater than or equal to 15.0 mol % $B_2O_3$ and less than or equal to 16 mol % $B_2O_3$), such $Al_2O_3$ content is sufficient to prevent phase separation of the borosilicate glass, yet low enough such that $SiO_2$ and $B_2O_3$ are the primary network formers in the glass. With the $Al_2O_3$ content at such levels, $Na_2O$ content in excess of $Al_2O_3$ assists in dissolution of the silica during melting of the glass. In embodiments, the $Na_2O$ content in the glass composition described herein is less than or equal to 6.25 mol % (e.g., less than or equal to 6.20 mol %, less than or equal to 6.15 mol %, less than or equal to 6.10 mol %, less than or equal to 6.05 mol %, less than or equal to 6.0 mol %,), as $Na_2O$ in excess of this amount may lead to an undesirably high CTE of the glass. In such embodiments, the $Na_2O$ content is at least 4.0 mol %. In embodiments, when the $Na_2O$ content satisfies these criteria, $K_2O$, if included, is included in an amount that is less than $Na_2O$, such as in an amount that is greater than or equal to 0.8 mol % and less than or equal to 5 mol %, but less than the amount of $Na_2O$, as $K_2O$ tends to increase CTE to a greater extent than $Na_2O$ per unit of composition. For example, in embodiments, the glass compositions described herein include a ratio of $K_2O$ to $Na_2O$ that is from about 0.1 to about 0.75. Glass compositions meeting the aforementioned constraints may be suitable for fusion-forming and exhibit the unique fracture behavior described herein, while still having favorably low CTEs.

In embodiments, the glass compositions of the present disclosure comprise greater than or equal to 12.0 mol % $B_2O_3$, greater than or equal to 2.0 mol % and less than or equal to 5.0 mol % $Al_2O_3$ or greater than or equal to 3.0 mol % and less than or equal to 5.0 mol % $Al_2O_3$, greater than or equal to 4.0 mol % and less than or equal to 6.25 mol % $Na_2O$, and greater than or equal to 0.8 mol % and less than or equal to 5.0 mol % $K_2O$, wherein $Na_2O$ is greater than or equal to $Al_2O_3+1.0$ and a ratio of the $K_2O$ content to the $Na_2O$ content is greater than or equal to 0.1 and less than or equal to 0.75. Such a set of compositional ranges facilitates generating glasses described herein having liquidus viscosities of greater than or equal to 500 kP and meeting the CTE requirements described herein (e.g., a LTCTE of 5.1 ppm/°C. or less).

Samples having the composition of Example 26 provided in the Table 300 were tested for various characteristics. In a first set of tests, the samples were subjected various chemical treatments to determine the chemical durability of the samples. Two glass samples (2" by 2") having different compositions were subjected to the same chemical treatments to serve as a basis of comparison. Comparative Example 26A was a borosilicate glass including 83.60 mol % $SiO_2$, 1.20 mol % $Al_2O_3$, 11.60 mol % $B_2O_3$, 3.00 mol % $Na_2O$, and 0.70 mol % $K_2O$. Comparative Example 26B was an untinted soda lime glass. Each of the samples were immersed in a 5% w/w HCl solution for a period of 24 hours at an elevated temperature of 95° C. Samples of the same composition were also immersed in a 5% w/w NaOH solution for a period of 6 hours at an elevated temperature of 95° C. After immersion, the samples were cleaned and subsequently dried. Optical transmission of each sample at 450 nm was measured. Haze was also measured. The results are shown in Table 300 below.

As used herein, the terms "transmission haze" and "haze" refer to the percentage of transmitted light scattered outside an angular cone of about ±2.5° in accordance with ASTM procedure D1003, entitled "Standard Test Method for Haze and Luminous Transmittance of Transparent Plastics," the contents of which is incorporated by reference herein in its entirety. Unless otherwise noted, all haze measurements reported in the disclosure were obtained on a Haze-Guard transmittance meter (Paul N. Gardner Company). For an optically smooth surface, transmission haze is generally close to zero.

As shown in the Table 300, the samples according to Example 26 described herein had relatively low weight loss (of about 0.010 mg/cm$^2$) as a result of the acidic chemical treatment in the HCl solution and showed favorable optical qualities, with superior transmission to both comparative examples. The basic chemical treatment in the NaOH solution resulted in relatively high weight loss in both the samples according to Example 26 and Comparative Example 26A. While the samples in accordance with Comparative Example 26B (the soda lime glass) experienced lower weight loss in the basic solution, such treatments resulted in increased haze, representing inferior optical appearance. These results indicate that the compositions described herein may possess the chemical durability for use in applications such as glass containers of various liquids (e.g., pharmaceutical containers such as vials, syringes, ampoules, and cartridges).

Figure 15:
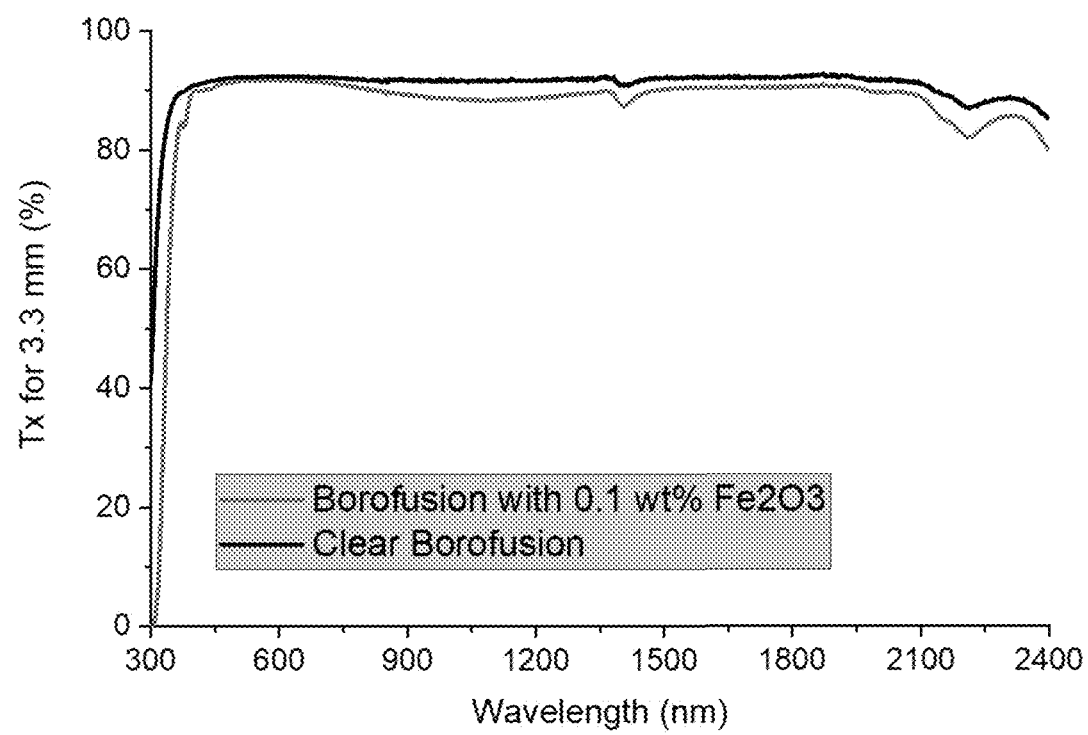
FIG. 15 is a plot of transmission measurements for two example compositions, according to exemplary embodiments.

As shown in the Table 200, Example 26 comprised 0.1 wt % $Fe_2O_3$. The transmission spectrum of a 3.3 mm thick sample was measured for comparison with the results contained in Table 5 herein. FIG. 15 provides a graph of the transmittance measured in accordance with ISO 13837 for the sample according to Example 26 as well as another example with 0 mol % $Fe_2O_3$ (Example 3 in Table 1 above). As can be seen, the addition of $Fe_2O_3$ lowers overall measured transmittance, especially in the infrared spectrum (at greater than or equal to 750 nm). The UV cutoff wavelength is also greater than 300 nm (approximately 320 nm), indicating greater UV absorption than the iron-free embodiment, and the transmittance is greater than or equal to 90% throughout the entire visible spectrum. Such results indicate the suitability of the glasses described herein for use in windshields, providing shielding from solar heating and UV rays, while still providing favorable transmittance in the visible spectrum. The composition in accordance with Example 26 has a relatively high transmittance throughout the visible spectrum, which provides beneficial clarity for use in a windshield, while still blocking UV and IR portions of sunlight.

A 3.3 mm thick sample having the composition according to Example 26 and a 2.1 mm thick sample having the composition according to Example 29 were prepared for optical testing. Visible light transmission ($T_{VIS}$) and total solar transmission (TTS) transmission measurements were taken for each sample. The results are provided in the Table 400 below.

TABLE 300

| Test Media | Sample Description | Weight Change Mean mg/cm$^2$ | Standard Deviation mg/cm$^2$ | % Transmission at 450 nm Average | % Haze Average |
|---|---|---|---|---|---|
| 5% w/w HCl 95° C. 24 hours | Example 26 | 0.010 | 0.00 | 93.85 | 0.00 |
| | Comparative Example 26A | 0.010 | 0.00 | 92.69 | 0.00 |
| | Comparative Example 26B | 0.011 | 0.00 | 91.90 | 0.00 |
| 5% w/w NaOH 95° C. 6 hours | Example 26 | 3.09 | 0.03 | 91.99 | 0.00 |
| | Comparative Example 26A | 2.82 | 0.00 | 92.57 | 0.00 |
| | Comparative Example 26B | 0.79 | 0.01 | 91.60 | 0.22 |

TABLE 400

| | Example 26 (3.3 mm) | Example 29 (2.1 mm) |
|---|---|---|
| Fe source | oxalate | oxalate |
| Fe level | 0.1 wt % | 0.3 wt % |
| UV cutoff | 320 nm | 378 nm |
| Tuv | 59.5 | 12.0 |
| Tvis | 91.6 | 88.5 |
| TTS | 90.8 | 87.0 |

As shown in the Table 400, the sample with 0.1 wt % $Fe_2O_3$, despite having a greater thickness, possessed a visible transmission value of over 90%, while the sample with greater $Fe_2O_3$ content did not. Depending on visible transmission requirements, the glass compositions described herein may be provided with a suitable amount of iron oxide.

Figure 16:
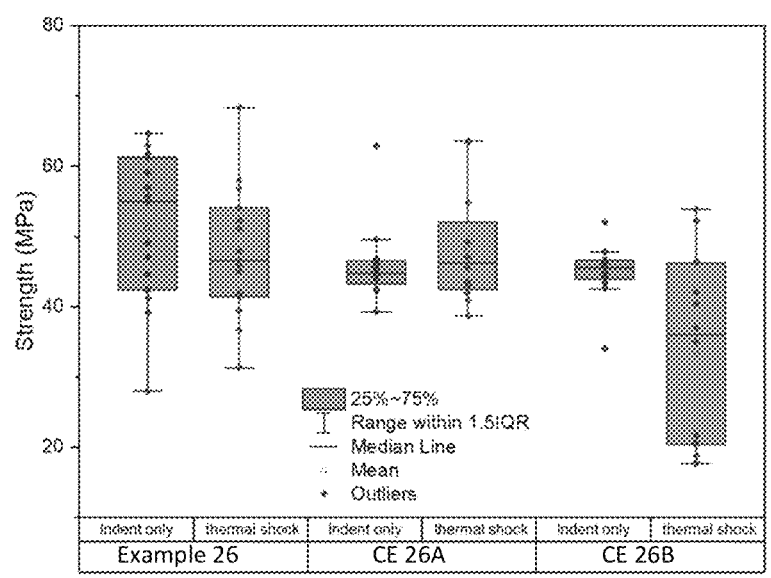
FIG. 16 is a plot of measured retained strength after indentation both prior to and after thermal shock of samples constructed used example compositions described herein, according to exemplary embodiments.

With reference to FIG. 16, samples having a 2 mm thickness and the compositions of Example 26 and Counter Examples 26A and 26B were subjected to flexural strength testing after indentation via a Vickers indenter both prior to and after inducing thermal shock. The flexural strength testing was conducted via ring-on-ring tests, which were generally performed according to the ASTM C-1499-03 standard test method for Monotonic Equibiaxial Flexural Strength of Advanced Ceramics at Ambient Temperatures. In particular, samples according to Example 26 and Counter Examples 26A and 26B described herein were indented with a Vickers indenter at 3 kgf as discussed above in relation to FIGS. 5A and 5B. Ring-on-ring testing was then conducted for some of the specimens immediately after indentation. After indentation, thermal shock was induced in some of the specimens by heating the specimens on a 125° C. hot plate for 10 minutes. After heating, a droplet of water (at 25° C.±5° C.) was dropped onto the indent site while the specimens were still hot. Ring-on-ring testing was then conducted on the samples after cooling to determine the effects of thermal shock on flexural strength.

As shown in FIG. 16, the samples in accordance with Example 26 show comparable levels of retained strength after being subjected to thermal shock as the samples in accordance with Counter Example 26A. It is anticipated that the comparable results are the result of the ring-on-ring testing procedure. During testing, the rings were centered on the indent and contacted the glass on the surface opposite the indentation. Due to the alignment between the rings and the indent, it is believed that contained fracture behavior (the ring crack containing radially-extending cracks) exhibited by the glass in accordance with Example 26 had minimal effects on the retained strength measurements. Given the higher CTE of certain glasses of the present disclosure than conventional borofloat glasses, it is not surprising that the thermal shock resulting in a diminished flexural strength as compared to samples not subjected to thermal shock. However, despite having a higher LTCTE, the samples according to Example 26 had comparable levels of retained strength as those constructed according to Counter Example 26A. The samples according to Example 26 had higher retained strength levels than those constructed according to Counter Example 26B, indicating that the glasses described herein provide favorable retained strength and thermal performance over certain existing glass compositions used in existing glass laminates.

Figure 17A:
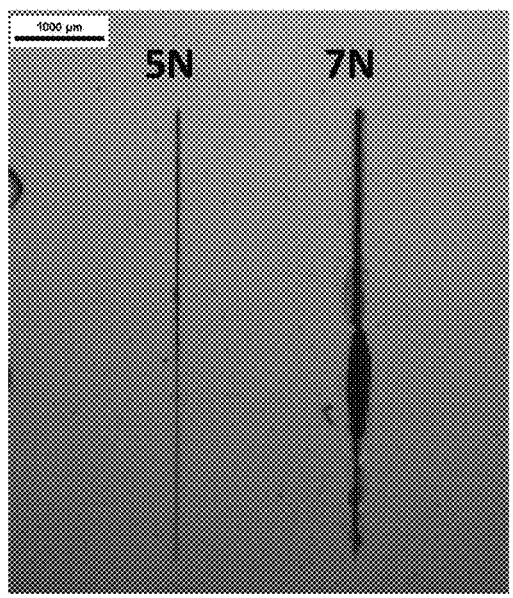
FIG. 17A is an image of a sample constructed in accordance with an example composition described herein having scratches from a Knoop scratching test, according to exemplary embodiments.
Figure 17B:
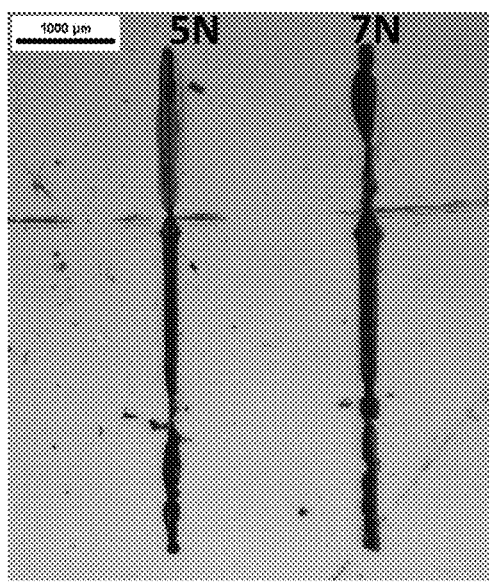
FIG. 17B is an image of a sample constructed in accordance with a counter example composition described herein having scratches from a Knoop scratching test, according to exemplary embodiments.
Figure 17C:
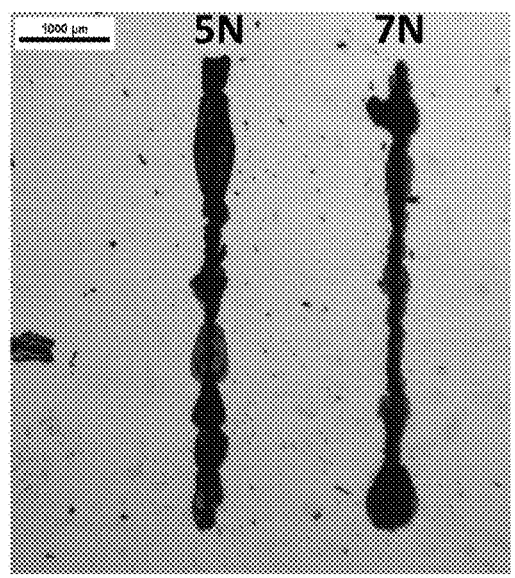
FIG. 17C is an image of a sample constructed in accordance with a counter example composition described herein having scratches from a Knoop scratching test, according to exemplary embodiments.

With reference to FIGS. 17A-17C, samples having compositions according to Example 26 and Counter Examples 26A and 26B were subjected to lateral Knoop scratch testing on surfaces thereof to determine the scratch resistance. A mechanical tester holding a Knoop diamond was used to scratch surfaces of the samples at about 23° C. at a relative humidity of about 50%. The scratch length on each of the samples was 5.0 mm, with the samples being scratched at a speed of 24 mm/min. FIG. 17A depicts an image of a sample having a composition according to Example 26 and scratched with loads of 5N and 7N. FIG. 17B depicts an image of a sample having a composition according to Counter Example 26B and scratched with loads of 5N and 7N. FIG. 17C depicts an image of a sample having a composition according to Counter Example 26B and scratched with loads of 5N and 7N. As shown, the samples constructed according to Example 26 demonstrated favorable scratch performance over the counter examples. When a load of 5N was used to scratch the samples, a lateral crack width of the scratch for those samples had a maximum value of 67.7 µm. Samples constructed according to Counter Examples 26A and 26B had maximum lateral crack widths of 337.44 µm and 485 µm, respectively. Such results indicate that glass compositions described herein may provide beneficial scratch resistance performance that is superior to certain glasses currently used in various applications (e.g., automotive glazings). In embodiments, glass articles comprising glass compositions according to the present disclosure may exhibit maximum lateral crack widths that are less than or equal to 80 µm (e.g., less than or equal to 75 µm, less than or equal to 70 µm) when scratched with a Knoop diamond at a scratch rate of 24 mm/min at a load of 5N.

As described herein with respect to FIG. 3-4, the glass compositions described herein may find use in curved glass articles, such as curved glass laminates. For example, glasses in accordance with the present disclosure may be used as the first glass ply 310 depicted in FIGS. 3-4, while a glass having a different composition (e.g., an annealed soda lime glass, an ion-exchanged aluminoborosilicate glass, etc.) may be used as the second glass ply 310. During fabrication of the curved glass laminate 400 (see FIG. 4), for example, the glass lies 310, 320 may be subjected to a co-sagging process, where the glass plies 310, 320, initially in a planar state, may be heated to a suitable sag temperature in order to be curved to a suitable depth of curvature. As used herein, "sag temperature" means the temperature at which the viscosity of the glass substrate is about $10^{11}$ poises. The sag temperature is determined by fitting the Vogel-Fulcher-Tammann (VFT) equation: Log h=A+B/(T−C), where T is the temperature, A, B and C are fitting constants and h is the dynamic viscosity, to annealing point data measured using the bending beam viscosity (BBV) measurement, to softening point data measured by fiber elongation. In embodiments, the glass compositions used for the glass plies 310, 320 comprise sag temperatures that differ from one another by 5° C. or greater, about 10° C. or greater, about 15° C. or greater, about 20° C. or greater, about 25° C. or greater, about 30° C. or greater, or about 35° C. or greater.

In embodiments, the glasses described herein (such as those according to the Examples described herein) comprise a viscosity of $10^{11}$ poises at a temperature that is greater than or equal to 590° C. and less than or equal to 630° C. Such viscosities are comparable to certain soda lime compositions used in glass laminates at the same temperatures. As a result, the glasses according to the present disclosure are suitable for co-sagging using existing methods and processes, and capable of forming laminates with the favorable optical distortion and shape matching performance described herein.

After being heated to a suitable sag temperature and sagged to a desired curved shape, the glass plies 310, 320 may be cooled at a suitable cooling rate. As a result of the cooling, the surfaces of the glass ply 310 (which may be formed of a glass composition according to the Examples described herein) may cool at a greater rate than a central region of the glass ply 310, resulting in a compressive stress extending from the surfaces of the glass ply 310 inward to a depth of compression and a tensile stress in a central region extending inward from the depth of compression. Such tensile and compressive stresses are "annealing stresses." In embodiments, the depth of compression to which the compressive stress from the post-sagging cooling extends into the glass ply 310 is equal to 0.21 times the thickness 210 of the glass ply 310 (see FIG. 2). The magnitude of the post sagging cooling-induced tensile stress in such embodiments may be approximated by $$\sigma_{CT} = \frac{E * \alpha * t^2 * R}{24K * (1-v)} \qquad \text{(Equation 1)}$$

where E is the Young's modulus of the glass ply 310, a is the coefficient of thermal expansion of the glass in the temperature range of the cooling, t is the thickness of the glass ply 310, R is the cooling rate, K is the thermal diffusivity of the glass, and v is the Poisson's ratio of the glass. The compressive stress integrated from the depth of compression to the surfaces of the glass ply 26 may be calculated as $-2*\sigma_{CT}$. Membrane stresses were calculated for glasses constructed according to Example 26 and Counter Examples 26A and 26B described herein. The results are contained in the Table 500 below.

TABLE 500

|  | CE 26B | CE 26A | Example 26 |
| --- | --- | --- | --- |
| E (GPa) | 72 | 62.8 | 62.7 |
| Poisson's ratio | 0.22 | 0.2 | 0.196 |
| CTE (ppm/C) | 8.8 | 3.25 | 4.5 |
| thermal diffusivity @ 600 C. (cm²/s) | 0.004813 | 0.006026 | 0.00565 |
| cooling rate (° C./s) | 1.67 | 1.67 | 1.67 |
| glass thickness (mm) | 2.1 | 2.1 | 2.1 |
| CT (MPa) | 0.52 | 0.13 | 0.19 |
| CS (MPa) | −1.03 | −0.26 | −0.38 |
| CS ratio to Example 26 | 2.72 | 0.68 | 1 |
| glass thickness (mm) | 3.8 | 3.8 | 3.8 |
| CT (MPa) | 1.69 | 0.42 | 0.62 |
| CS (MPa) | −3.38 | −0.85 | −1.25 |
| CS ratio to Example 26 | 2.72 | 0.68 | 1 |

As shown, annealed central tension (denoted "CT" in the Table 500) and the magnitude of compressive stress (denoted "CS" in the Table 500) for Example 26 is between the values for Counter Example 26B (soda lime glass) and Counter Example 26A (an existing borosilicate glass). The CS and CT values were computed at thicknesses of 2.1 mm and 3.8 mm. 2.1 mm is a commonly-used thickness for outer plies in automotive glazings. As shown, at 2.1 mm thickness, the sample constructed in accordance with Example 26 comprised an annealed tensile stress of 0.19 MPa, greater than the 0.13 MPa achieved for an existing borosilicate glass and less than the 0.52 MPa achieved for the soda lime glass. At 3.8 mm thickness, the sample constructed in accordance with Example 26 comprised an annealed tensile stress of 0.62 MPa, greater than the 0.42 MPa achieved for an existing borosilicate glass and less than the 1.69 MPa achieved for the soda lime glass. Annealing stresses may be measured using SCALP device.

According to exemplary embodiments and in furtherance of the above disclosed information, further aspects of the example glass compositions described herein are now described.

In the following paragraphs, the term "tramp", when used to describe a particular constituent component in a glass composition, refers to a constituent component that is not intentionally added to the glass composition and is present in an amount of less than 0.10 mol. %. Tramp components may be unintentionally added to the glass composition as an impurity in another constituent component and/or through migration of the tramp component into the composition during processing of the glass composition.

In the following paragraphs, the terms "free" and "substantially free" are used interchangeably herein to refer to an amount and/or an absence of a particular component in a glass composition that is not intentionally added to the glass composition. It is understood that the glass composition may contain traces of a particular constituent component as a contaminant or a tramp in an amount of less than 0.10 mol.%.

In the following paragraphs, the term "glass former" is used herein to refer to a component that, being solely present in a glass composition (i.e., without other components, except for tramps), is able to form a glass when cooling the melt at a rate of not greater than about 300° C./min.

In the following paragraphs, the term "modifier", refers to the oxides of monovalent or divalent metals, i.e., $R_2O$ or RO, where "R" stands for a cation. Modifiers can be added to a glass composition to change the atomic structure of the melt and the resulting glass. In some embodiments, the modifier may change the coordination numbers of cations present in the glass formers (e.g., boron in $B_2O_3$), which may result in forming a more polymerized atomic network and, as a result, may provide better glass formation.

In the following paragraphs, the term "rare earth metals" refers to the metals listed in the Lanthanide Series of the IUPAC Periodic Table, plus yttrium and scandium. As used herein, the term "rare earth metal oxides," is used to refer to the oxides of rare earth metals in different redox states, such as "+3" for lanthanum in $La_2O_3$, "+4" for cerium in $CeO_2$, "+2" for europium in EuO, etc. In general, the redox states of rare earth metals in oxide glasses may vary and, in particular, the redox state may change during melting, based on the batch composition and/or the redox conditions in the furnace where the glass is melted and/or heat-treated (e.g., annealed). Unless otherwise specified, a rare earth metal oxide is referred to herein by its normalized formula in which the rare earth metal has the redox state "+3." Accordingly, in the case in which a rare earth metal having a redox state other than "+3" is added to the glass composition batch, the glass compositions are recalculated by adding or removing some oxygen to maintain the stoichiometry. For example, when $CeO_2$ (with cerium in redox state "+4") is used as a batch component, the resulting as-batched composition is recalculated assuming that two moles of $CeO_2$ is equivalent to one mole of $Ce_2O_3$, and the resulting as-batched composition is expressed in terms of $Ce_2O_3$. As used herein, the term "$RE_mO_n$" is used to refer to the total content of rare earth metal oxides in all redox states present, and the term "$RE_2O_3$" is used to refer to the total content of rare earth metal oxides in the "+3" redox state, also specified as "trivalent equivalent".

In the mathematical formulas used in the following paragraphs, the term "min(A, B)" means the least of the values A and B, and the term "max(A, B)" means the greatest of the quantities A and B, where "A" and "B" may be any quantities (concentrations of components, values of properties, etc.). The term "abs(X)" means absolute value of a quantity X (without sign).

In the glass compositions described herein, $SiO_2$ may play a role of a major glass former. Without wishing to be bound by theory, it is believed that tetrahedra $[SiO_4]$, as a part of the structural network of glass, are connected with other structural units that may be rotatable, such as, in particular, tetrahedra $[AlO_4]$ and triangles $[BO_3]$. Such connections between tetrahedra and triangles may cause the anomalous fracture behavior described herein. Additionally, $SiO_2$ was found to increase the viscosity of the glass forming melts, increase the liquidus viscosity, reduce the thermal expansion coefficient and increase the Young's modulus, therefore improving mechanical properties. Then, at high content of silica, a glass may become more chemically durable. However, when the content of $SiO_2$ in a glass composition becomes too high, this may cause an unacceptably large high-temperature viscosity, which may cause some difficulties with melting, such as, for example, corrosion of the refractories in the glass melting tank. Also, at very high content of $SiO_2$, the structural network of glass may contain insufficient amounts of rotatable units, may cause the loss of the anomalous fracture behavior. Accordingly, in embodiments, the glass compositions described herein may contain, in addition to the other ranges of $SiO_2$ contents described herein, $SiO_2$ in an amount greater than or equal to 60.0 mol % and less than or equal to 96.0 mol %, greater than or equal to 60.0 mol % and less than or equal to 80.0 mol %, greater than or equal to 60.0 mol % and less than or equal to 77.5 mol %, greater than or equal to 72.0 mol % and less than or equal to 78.0 mol %, greater than or equal to 73.0 mol % and less than or equal to 77.0 mol %, greater than or equal to 73.4 mol % and less than or equal to 76.8 mol %, greater than or equal to 73.8 mol % and less than or equal to 76.4 mol %, greater than or equal to 74.62 mol % and less than or equal to 75.88 mol %, greater than or equal to 65.0 mol % and less than or equal to 75.9 mol %, greater than or equal to 72.0 mol % and less than or equal to 75.9 mol %, greater than or equal to 73.0 mol % and less than or equal to 96.0 mol %, greater than or equal to 74.6 mol % and less than or equal to 75.9 mol %.

In the glass compositions described herein, $B_2O_3$ may play a role of the network former together with $SiO_2$ and $Al_2O_3$. As a part of the structural network of glass, boron oxide may form either tetrahedra $[BO_4]$ or triangles $[BO_3]$, depending on the contents of other components. Without wishing to be bound by a particular theory, it is believed that the amount of tetrahedra $[BO_4]$ increases when the content of modifiers (monovalent metal oxides $R_2O$ and divalent metal oxides RO) exceeds the amount of alumina in a particular glass composition. In embodiments, both triangles $[BO_3]$ and tetrahedra $[BO_4]$ may play a significant role in the glass compositions described herein. Tetrahedra $[BO_4]$ may increase the connectivity of structural network, which may make the network more rigid and increase the viscosity, especially at low temperatures, not causing undesirable precipitation of refractory minerals from the melt. Triangles $[BO_3]$ may be rotatable structural units, which may provide the anomalous fracture behavior described herein. Accordingly, the glass compositions of the present disclosure include boron oxide. However, when the content of $B_2O_3$ becomes too high, this may reduce the liquidus viscosity, which may potentially cause precipitation of refractory minerals in the glass. Also, at high content of boron oxide, a glass composition may not be acceptably durable to alkalis and acids, or a glass forming melt may tend to liquid-liquid phase separation, which may make a glass opaque. In embodiments, the glass compositions described herein may contain, in addition to the other ranges of $B_2O_3$ contents described herein, $B_2O_3$ in an amount greater than or equal to 1.0 mol % and less than or equal to 25.0 mol %, greater than or equal to 5.0 mol % and less than or equal to 20.0 mol %, greater than or equal to 5.0 mol % and less than or equal to 17.0 mol %, greater than or equal to 10.5 mol % and less than or equal to 19.0 mol %, greater than or equal to 11.75 mol % and less than or equal to 17.75 mol %, greater than or equal to 12.07 mol % and less than or equal to 13.8 mol %.

In an investigation, it was empirically found that the addition of even small amounts of rare earth metal oxides to the glass compositions described herein may result in increased liquidus temperatures and precipitation of refractory minerals. It was also empirically found that addition of rare earth oxides may reduce the chemical durability of resultant glasses, especially to acids. For that reason, in some embodiments of the present disclosure, the content of rare earth metal oxides in the glass composition is limited, or a glass composition may preferably be free (or substantially free) of rare earth metal oxides.

Glass compositions of the present disclosure may also include lithium oxide ($Li_2O$). Lithium oxide may play a role of modifier, similar to other alkali metal oxides. However, it was empirically found that addition of $Li_2O$ to the glass compositions of the present disclosure may result in increasing the liquidus temperature and reducing the liquidus viscosity. Also, glasses with $Li_2O$ may have lower chemical durability comparing to the glasses with same amounts of other alkali metal oxides. $Li_2O$ was also found to potentially cause reduction of the anomalous fracture behavior described herein. Without wishing to be bound by theory, it is believed that $Li_2O$ additions may lead to higher packing density of cations, which may increase the density and reduce the anomalous fracture behavior. Accordingly, in embodiments, the content of $Li_2O$ in the glass compositions described herein may be limited, or the glass composition may preferably be free (or substantially free) of $Li_2O$.

Glass compositions of the present disclosure may also include magnesia (MgO). In embodiments, magnesia may be added to the glass composition to increase the Young's modulus of the resultant glass and/or improve other mechanical properties. Magnesia may beneficially not increase the density and also not increase the thermal expansion coefficient of glass to the same extent as other glass modifiers. It was also found that adding a small amount of magnesia to the glass compositions of the present disclosure may improve the anomalous fracture behavior. However, when the content of MgO in a glass composition is too large, the glass forming melt may precipitate the refractory minerals, which may increase the liquidus temperature and/or result in appearance of crystalline defects in the glass articles. Accordingly, in embodiments, the glass compositions of the present disclosure may contain magnesia (MgO) in an amount from greater than or equal to 0.0 mol % to less than or equal to 5.0 mol % and all ranges and sub-ranges between the foregoing values. In embodiments, the glass compositions may contain MgO in an amount less than or equal to 5.0 mol %, less than or equal to 2.5 mol %, less than or equal to 2.0 mol %, less than or equal to 1.8 mol %, or less than or equal to 1.75 mol %. In embodiments, the glass composition may contain MgO in an amount greater than or equal to 0.0 mol % and less than or equal to 5.0 mol %, greater than or equal to 0.0 mol % and less than or equal to 2.0 mol %, greater than or equal to 0.0 mol % and less than or equal to 1.8 mol %, greater than or equal to 0.35 mol % and less than or equal to 1.75 mol %, greater than or equal to 0.68 mol % and less than or equal to 1.75 mol %, greater than or equal to 0.0 mol % and less than or equal to 1.75 mol %.

Glass compositions of the present disclosure may also include calcium oxide (CaO). Calcium oxide may be added in a glass composition to improve chemical durability and increase the Young's modulus, therefore improving mechanical properties. Also, alkaline earth oxides, such as CaO and MgO, tend to reduce liquidus temperature and increase liquidus viscosity. It was empirically found that adding a small amount of CaO may improve the anomalous fracture behavior. However, when the content of CaO is high, this may cause precipitation of refractory minerals, which may result in appearance of crystalline defects in glass articles. Also, adding high amount of CaO to the glass compositions with high content of $B_2O_3$ may sometimes cause liquid-liquid phase separation of the melt, resulting in loss of light transmittance. Accordingly, in embodiments, the glass composition may contain calcium oxide (CaO) in an amount from greater than or equal to 0.0 mol % to less than or equal to 5.0 mol % and all ranges and sub-ranges between the foregoing values. In some other embodiments, the glass composition may contain CaO in an amount less than or equal to 5.0 mol %, less than or equal to 2.5 mol %, less than or equal to 2.0 mol %, less than or equal to 1.9 mol %, less than or equal to 1.7 mol %, less than or equal to 1.5 mol %, or less than or equal to 1.0 mol %. In some more embodiments, the glass composition may contain CaO in an amount greater than or equal to 0.0 mol % and less than or equal to 2.0 mol %, greater than or equal to 0.0 mol % and less than or equal to 1.9 mol %, greater than or equal to 0.0 mol % and less than or equal to 1.7 mol %, greater than or equal to 0.0 mol % and less than or equal to 1.5 mol %, greater than or equal to 0.02 mol % and less than or equal to 1.02 mol %, greater than or equal to 0.0 mol % and less than or equal to 5.0 mol %, greater than or equal to 0.0 mol % and less than or equal to 1.0 mol %.

In embodiments, the glass compositions of the present disclosure may have a combined amount of CaO and MgO (CaO+MgO) that is less than or equal to 5.0 mol % or less than or equal to 2.5 mol %. In embodiments, CaO+MgO is greater than or equal to 0.0 mol % and less than or equal to 5.0 mol %, or greater than or equal to 0.0 mol % and less than or equal to 2.5 mol %.

Glass compositions of the present disclosure may also include zirconia ($ZrO_2$). Zirconia may be added in the glass compositions of the present disclosure to improve the mechanical properties and/or to increase the viscosity of the glass forming melts. However, it was empirically found that in some embodiments of the present disclosure, especially when the total content of alkali metal oxides (in mol %) does not exceed or only slightly exceeds the content of alumina (in mol %), adding zirconia to the glass compositions, sometimes even in a very small amount, may increase the liquidus temperature and/or cause precipitation of the refractory minerals from the glass forming melts. Accordingly, in some embodiments of the present disclosure, the content of zirconia in the glass composition is limited, or the glass composition may be substantially free of $ZrO_2$. In embodiments, the glass composition may contain zirconia ($ZrO_2$) in an amount from greater than or equal to 0.0 mol % to less than or equal to 5.0 mol % and all ranges and sub-ranges between the foregoing values. In some other embodiments, the glass composition may contain $ZrO_2$ in an amount less than or equal to 5.0 mol %, less than or equal to 2.5 mol %, less than or equal to 1.5 mol %, less than or equal to 1.35 mol %, less than or equal to 1.2 mol %, or less than or equal to 1.0 mol %. In some more embodiments, the glass composition may contain $ZrO_2$ in an amount greater than or equal to 0.0 mol % and less than or equal to 1.5 mol %, greater than or equal to 0.0 mol % and less than or equal to 1.35 mol %, greater than or equal to 0.0 mol % and less than or equal to 1.2 mol %, greater than or equal to 0.01 mol % and less than or equal to 1.01 mol %, greater than or equal to 0.0 mol % and less than or equal to 5.0 mol %, greater than or equal to 0.0 mol % and less than or equal to 1.0 mol %.

Glass compositions of the present disclosure may include barium oxide (BaO). Barium oxide may be unintentionally added in a glass composition as an impurity in other raw materials or intentionally added in favor of lower melting temperatures or higher chemical durability. It was empirically found that adding BaO to glass compositions of the present disclosure may result in increasing the liquidus temperature, which may cause crystallization of the glass forming melts when cooling and forming. Also, barium as a large cation may reduce the anomalous fracture behavior. Accordingly, in the glass compositions of the present disclosure, the content of BaO is limited, and the glass compositions may preferably be free of BaO. In embodiments, the glass composition may contain barium oxide (BaO) in an amount from greater than or equal to 0.0 mol % to less than or equal to 0.2 mol % and all ranges and sub-ranges between the foregoing values. In some other embodiments, the glass composition may contain BaO in an amount less than or equal to 0.2 mol % or less than or equal to 0.1 mol %. In some more embodiments, the glass composition may contain BaO in an amount greater than or equal to 0.0 mol % and less than or equal to 0.2 mol %, greater than or equal to 0.0 mol % and less than or equal to 0.1 mol %.

Glass compositions of the present disclosure may include potassium oxide $K_2O$. Potassium oxide may be unintentionally added in a glass composition as an impurity in other raw materials, or intentionally added, for example, to preserve a glass-forming melt from liquid-liquid phase separation. Additions of $K_2O$ may improve the chemical durability of glasses and/or reduce the liquidus temperature. Without wishing to be bound by theory, it is believed that $K_2O$ transforms the structural units created by boron oxide from the triangles [$BO_3$] to the tetrahedra [$BO_4$], which may improve the balance between these structural units in the glass composition and, therefore, improve the anomalous fracture behavior. However, adding $K_2O$ to the glass compositions of the present disclosure may reduce the Young's modulus of glass, which may reduce the mechanical properties of the glass articles. Also, adding high amounts of $K_2O$ may unacceptably increase the thermal expansion coefficient of glass. Accordingly, in some embodiments of the present disclosure the content of $K_2O$ in a glass composition is limited, or the glass composition may be substantially free of $K_2O$. In embodiments, the glass composition may contain potassium oxide ($K_2O$) in an amount from greater than or equal to 0.0 mol % to less than or equal to 10.0 mol % and all ranges and sub-ranges between the foregoing values. In embodiments, the glass composition may contain $K_2O$ in an amount greater than or equal to 0.0 mol % and less than or equal to 3.0 mol %, greater than or equal to 0.3 mol % and less than or equal to 2.8 mol %, greater than or equal to 0.6 mol % and less than or equal to 2.5 mol %, greater than or equal to 0.92 mol % and less than or equal to 2.18 mol %, greater than or equal to 0.0 mol % and less than or equal to 10.0 mol %, greater than or equal to 0.3 mol % and less than or equal to 2.2 mol %, greater than or equal to 0.6 mol % and less than or equal to 10.0 mol %, greater than or equal to 0.6 mol % and less than or equal to 2.2 mol %, greater than or equal to 0.8 mol % and less than or equal to 2.2 mol %, greater than or equal to 0.9 mol % and less than or equal to 2.2 mol %, greater than or equal to 5.0 mol % and less than or equal to 7.0 mol %.

Glass compositions of the present disclosure may also include alumina ($Al_2O_3$). In the glass compositions of the present disclosure, alumina plays a role of a network former together with $B_2O_3$ and $SiO_2$. As a network former, alumina may increase the viscosity of glass-forming melts and increase the liquidus viscosity, and provide better protection from crystallization. Also, additions of alumina, even in a small amount, may preserve a melt from phase separation. Then, alumina may improve chemical durability of glass. Accordingly, the glass compositions of the present disclosure contain some amount of alumina. However, when added in a large amount, alumina may cause precipitation of refractory minerals from the melt, which may cause crystalline defects in the glass articles. Also, at high content of alumina the viscosity may become too high, which may cause corrosion of the refractories in the glass melting tank. Accordingly, in some embodiments of the present disclosure the content of alumina is limited. In embodiments, the glass composition may contain alumina ($Al_2O_3$) in an amount from greater than or equal to 0.3 mol % to less than or equal to 5.3 mol % and all ranges and sub-ranges between the foregoing values. In some embodiments, the glass composition may contain $Al_2O_3$ in an amount greater than or equal to 0.3 mol %, greater than or equal to 2.0 mol %, greater than or equal to 2.2 mol %, greater than or equal to 2.4 mol %, greater than or equal to 2.5 mol %, greater than or equal to 3.45 mol %, greater than or equal to 3.8 mol %, greater than or equal to 4.3 mol %, greater than or equal to 4.8 mol %, or greater than or equal to 5.0 mol %. In some other embodiments, the glass composition may contain $Al_2O_3$ in an amount less than or equal to 5.3 mol %, less than or equal to 5.0 mol %, less than or equal to 4.8 mol %, less than or equal to 4.3 mol %, less than or equal to 4.0 mol %, less than or equal to 3.9 mol %, less than or equal to 3.8 mol %, less than or equal to 3.65 mol %, less than or equal to 3.53 mol %, or less than or equal to 2.5 mol %. In some more embodiments, the glass composition may contain $Al_2O_3$ in an amount greater than or equal to 0.3 mol % and less than or equal to 5.3 mol %, greater than or equal to 2.0 mol % and less than or equal to 4.0 mol %, greater than or equal to 2.2 mol % and less than or equal to 3.9 mol %, greater than or equal to 2.4 mol % and less than or equal to 3.65 mol %, greater than or equal to 3.45 mol % and less than or equal to 3.53 mol %, greater than or equal to 0.3 mol % and less than or equal to 2.5 mol %, greater than or equal to 2.0 mol % and less than or equal to 5.3 mol %, greater than or equal to 2.0 mol % and less than or equal to 2.5 mol %, greater than or equal to 2.2 mol % and less than or equal to 2.5 mol %, greater than or equal to 2.4 mol % and less than or equal to 2.5 mol %, greater than or equal to 2.5 mol % and less than or equal to 5.3 mol %, greater than or equal to 3.8 mol % and less than or equal to 3.9 mol %.

Glass compositions of the present disclosure may also include sodium oxide ($Na_2O$). Sodium oxide may play a role of a modifier, transforming the structural units formed by aluminum and boron cations to a tetrahedral form ([$AlO_4$] and [$BO_4$]), which may result in better balance between the structural units that we assume rotatable and non-rotatable, which may result in an improved anomalous fracture behavior of glasses. Also, additions of $Na_2O$ may improve the chemical durability of glass, reduce the liquidus temperature and increase the liquidus viscosity, therefore, better protecting the glass forming melt from crystallization. However, when being added in large amounts, $Na_2O$ may unacceptably reduce the Young's modulus and, therefore, worsen the mechanical properties of the glass articles. Also, large amounts of $Na_2O$ in a glass composition may cause inacceptable increasing the thermal expansion coefficient and, in some cases, reduce the chemical durability of glass. Accordingly, in some embodiments of the present disclosure, content of sodium oxide in the glass composition is limited, or the glass composition may be substantially free of $Na_2O$. In embodiments, the glass composition may contain sodium oxide ($Na_2O$) in an amount from greater than or equal to 0.0 mol % to less than or equal to 10.0 mol % and all ranges and sub-ranges between the foregoing values. In some embodiments, the glass composition may contain $Na_2O$ in an amount greater than or equal to 0.0 mol %, greater than or equal to 2.0 mol %, greater than or equal to 2.5 mol %, greater than or equal to 2.9 mol %, greater than or equal to 3.4 mol %, greater than or equal to 4.55 mol %, greater than or equal to 5.0 mol %, greater than or equal to 7.0 mol %, greater than or equal to 8.0 mol %, or greater than or equal to 9.0 mol %. In some other embodiments, the glass composition may contain $Na_2O$ in an amount less than or equal to 10.0 mol %, less than or equal to 9.7 mol %, less than or equal to 9.0 mol %, less than or equal to 8.0 mol %, less than or equal to 7.0 mol %, less than or equal to 6.0 mol %, less than or equal to 5.5 mol %, less than or equal to 5.45 mol %, less than or equal to 5.3 mol %, less than or equal to 5.2 mol %, or less than or equal to 5.0 mol %. In some more embodiments, the glass composition may contain $Na_2O$ in an amount greater than or equal to 0.0 mol % and less than or equal to 5.2 mol %, greater than or equal to 2.0 mol % and less than or equal to 8.0 mol %, greater than or equal to 2.0 mol % and less than or equal to 6.0 mol %, greater than or equal to 2.5 mol % and less than or equal to 5.3 mol %, greater than or equal to 2.9 mol % and less than or equal to 5.5 mol %, greater than or equal to 3.4 mol % and less than or equal to 6.0 mol %, greater than or equal to 4.55 mol % and less than or equal to 5.45 mol %, greater than or equal to 0.0 mol % and less than or equal to 10.0 mol %, greater than or equal to 2.0 mol % and less than or equal to 5.0 mol %, greater than or equal to 2.5 mol % and less than or equal to 5.0 mol %, greater than or equal to 3.4 mol % and less than or equal to 5.0 mol %, greater than or equal to 4.55 mol % and less than or equal to 5.0 mol %.

Glass compositions of the present disclosure may include fluorine (F). Fluorine may be added in a small amount to the glass compositions of the present disclosure as an ingredient of a fining agent or as a component that reduces the liquidus temperature. However, adding fluorine in a glass composition may cause environmental concern. For that reason, in some embodiments of the present disclosure the content of fluorine is limited, and, preferably, the glass composition may be free of fluorine.

In embodiments, the glass compositions of the present disclosure may include a combined amount of iron, chromium, molybdenum, vanadium, copper, and cobalt (Fe+Cr+Mo+V+Cu+Co) that is less than or equal to 1.0 mol % or less than or equal to 0.5 mol %. In embodiments, Fe+Cr+Mo+V+Cu+Co is greater than or equal to 0.0 mol % and less than or equal to 1.0 mol %, or greater than or equal to 0.0 mol % and less than or equal to 0.5 mol %.

In embodiments, the glass compositions of the present disclosure may contain a combined amount of iron(II) and iron (III) oxides (FeO+Fe$_2$O$_3$) that is less than or equal to 0.5 mol % or less than or equal to 0.25 mol %. In embodiments, FeO+Fe$_2$O$_3$ is greater than or equal to 0.0 mol % and less than or equal to 0.5 mol %, or greater than or equal to 0.0 mol % and less than or equal to 0.25 mol %.

In embodiments, the glass compositions of the present disclosure may have a combined amount of lanthanum oxide and yttrium(III) oxide La$_2$O$_3$+Y$_2$O$_3$ that is less than or equal to 1.0 mol % or less than or equal to 0.5 mol %. In embodiments, La$_2$O$_3$+Y$_2$O$_3$ is greater than or equal to 0.0 mol % and less than or equal to 1.0 mol %, or greater than or equal to 0.0 mol % and less than or equal to 0.5 mol %.

In embodiments, the glass compositions of the present disclosure may have a combined amount of sodium oxide and potassium oxide (Na$_2$O+K$_2$O) that is greater than or equal to 0.0 mol %, greater than or equal to 5.0 mol %, or greater than or equal to 6.11 mol %. In embodiments, Na$_2$O+K$_2$O is less than or equal to 6.84 mol % or less than or equal to 5.0 mol %. In embodiments, Na$_2$O+K$_2$O is greater than or equal to 0.0 mol % and less than or equal to 6.84 mol %, or greater than or equal to 0.0 mol % and less than or equal to 5.0 mol %.

In embodiments, the glass compositions of the present disclosure may have a combined amount of sodium oxide and alumina (Na$_2$O+Al$_2$O$_3$) that is greater than or equal to 0.0 mol %, greater than or equal to 5.0 mol %, or greater than or equal to 7.7 mol %. In embodiments, Na$_2$O+Al$_2$O$_3$ is less than or equal to 9.7 mol %, less than or equal to 8.9 mol %, or less than or equal to 5.0 mol %. In embodiments, Na$_2$O+Al$_2$O$_3$ is greater than or equal to 0.0 mol % and less than or equal to 9.7 mol %, greater than or equal to 0.0 mol % and less than or equal to 8.9 mol %, greater than or equal to 0.0 mol % and less than or equal to 5.0 mol %, greater than or equal to 5.0 mol % and less than or equal to 9.7 mol %, or greater than or equal to 5.0 mol % and less than or equal to 8.9 mol %, greater than or equal to 7.7 mol % and less than or equal to 9.7 mol %.

In embodiments, the glass compositions of the present disclosure may have a combined amount of sodium oxide, potassium oxide, magnesium oxide, calcium oxide, zinc oxide, alumina, boron oxide, and silica (Na$_2$O+K$_2$O+MgO+CaO+ZnO+Al$_2$O$_3$+B$_2$O$_3$+SiO$_2$) that is greater than or equal to 95.0 mol %.

In embodiments, the glass compositions of the present disclosure may have a value for a ratio (Na$_2$O+K$_2$O+MgO+CaO+SrO+BaO+ZnO)/(R$_2$O+RO) that is greater than or equal to 0.000, or greater than or equal to 0.95. The oxides of sodium and potassium, as well as alkaline earth metal oxides and zinc oxide, are the most common options for the modifiers (R$_2$O and RO), as they may not reduce the light transmittance of the resultant glass articles and are well soluble in glass melts of the present disclosure. Other monovalent and divalent metal oxides, such as, for example, MnO, NiO, CuO, Ag$_2$O, PbO, etc. may either be less soluble, or provide undesirable coloring, or cause ecology concern, or be more expensive.

In embodiments, the glass compositions of the present disclosure may have a value for a ratio Na$_2$O/Al$_2$O$_3$. In the case when Na$_2$O is added to a glass composition, it may be desirable to have it connected with the structural units formed by different network formers. When this occurs, the mobility of sodium ions may be decreased, which may cause some improvement of chemical durability of glass. Without wishing to be bound by theory, it is believed that such connections may occur when the content of Na$_2$O is greater than or equal to the content of Al$_2$O$_3$ in a glass composition. Accordingly, in some embodiments of the present disclosure, it may be desirable to have the ratio Na$_2$O/Al$_2$O$_3$ (in mole percent) greater than or equal to about 1.0. On the other hand, when the ratio Na$_2$O/Al$_2$O$_3$ becomes too high, anomalous fracture behavior described herein may be inhibited. Accordingly, in embodiments, Na$_2$O/Al$_2$O$_3$ is greater than or equal to 1.0 mol %, greater than or equal to 1.01 mol %, greater than or equal to 1.1 mol %, or greater than or equal to 1.5 mol %. In embodiments, Na$_2$O/Al$_2$O$_3$ is less than or equal to 1.67 mol %, less than or equal to 1.6 mol %, less than or equal to 1.5 mol %, or less than or equal to 1.35 mol %. In embodiments, Na$_2$O/Al$_2$O$_3$ is greater than or equal to 1.0 mol % and less than or equal to 1.35 mol %, greater than or equal to 1.01 mol % and less than or equal to 1.67 mol %, greater than or equal to 1.0 mol % and less than or equal to 1.67 mol %, greater than or equal to 1.0 mol % and less than or equal to 1.6 mol %, greater than or equal to 1.0 mol % and less than or equal to 1.5 mol %, greater than or equal to 1.01 mol % and less than or equal to 1.6 mol %, greater than or equal to 1.01 mol % and less than or equal to 1.5 mol %, or greater than or equal to 1.01 mol % and less than or equal to 1.35 mol %, greater than or equal to 1.1 mol % and less than or equal to 1.67 mol %, greater than or equal to 1.1 mol % and less than or equal to 1.6 mol %, greater than or equal to 1.1 mol % and less than or equal to 1.5 mol %, or greater than or equal to 1.1 mol % and less than or equal to 1.35 mol %.

In embodiments, the glass compositions of the present disclosure may include a parameter B$_2$O$_3$+3.5*Al$_2$O$_3$ within certain numerical ranges. It was empirically found that the anomalous fracture behavior described herein is preferably observed when the sum (B$_2$O$_3$+3.5*Al$_2$O$_3$) is approximately 25 mol %. Accordingly, in embodiments, B$_2$O$_3$+3.5*Al$_2$O$_3$ is greater than or equal to 20.3 mol %, greater than or equal to 24.2 mol %, or greater than or equal to 25 mol %. In embodiments, B$_2$O$_3$+3.5*Al$_2$O$_3$ is less than or equal to 27.5 mol %, less than or equal to 25.9 mol %, or less than or equal to 25 mol %. In embodiments, B$_2$O$_3$+3.5*Al$_2$O$_3$ greater than or equal to 20.3 mol % and less than or equal to 27.5 mol %, greater than or equal to 20.3 mol % and less than or equal to 25.9 mol %, or greater than or equal to 20.3 mol % and less than or equal to 25 mol %, greater than or equal to 24.2 mol % and less than or equal to 27.5 mol %, greater than or equal to 24.2 mol % and less than or equal to 25.9 mol %, or greater than or equal to 24.2 mol % and less than or equal to 25 mol %, greater than or equal to 25 mol % and less than or equal to 27.5 mol %, or greater than or equal to 25 mol % and less than or equal to 25.9 mol %.

In some embodiments, the glass compositions described herein may exhibit a decimal logarithm of liquidus viscosity (Log(eta$_{liq}$P)) that is greater than or equal to 5.5 to less than or equal to 8.0 and all ranges and sub-ranges between the foregoing values. In embodiments, Log(eta$_{liq}$P) is greater than or equal to 5.5, greater than or equal to 5.9, greater than or equal to 6.0, greater than or equal to 6.5, greater than or equal to 7.4, greater than or equal to 7.5, greater than or equal to 7.6, or greater than or equal to 7.8. In embodiments, Log(eta$_{liq}$P) less than or equal to 8.0, less than or equal to 7.8, less than or equal to 7.7, less than or equal to 7.6, less than or equal to 7.5, less than or equal to 7.4, less than or equal to 6.5, or less than or equal to 6.0. In embodiments, Log(eta$_{liq}$P) is greater than or equal to 5.5 and less than or equal to 8.0, greater than or equal to 5.9 and less than or equal to 7.7, greater than or equal to 5.5 and less than or equal to 6.0, greater than or equal to 5.9 and less than or equal to 6.0, greater than or equal to 6.0 and less than or equal to 8.0, greater than or equal to 6.0 and less than or equal to 6.5, greater than or equal to 7.4 and less than or equal to 8.0, greater than or equal to 7.4 and less than or equal to 7.5.

In embodiments, glass compositions according to the present disclosure may exhibit a modifier excess parameter $M_{exc}$ that is calculated according to the following relation:

$$M_{exc}=\max(0,(Alk_2O+RO)-(Al_2O_3+B_2O_3)), \quad \text{(Equation 2)}$$

where $Alk_2O$ is total sum of alkali metal oxides, RO is total sum of divalent metal oxides, and chemical formulas mean the amounts of corresponding components in the glass composition. $M_{exc}$ represents the excess of modifiers $R_2O$ and RO over the network former $Al_2O_3$ and $B_2O_3$. In the case when the total content of $Al_2O_3+B_2O_3$ exceeds the total content of $R_2O+RO$, the modifiers excess parameter is defined to be equal to zero. Without wishing to be bound by theory, it is believed that the value of $M_{exc}$ correlates with the amount of the non-bridging oxygen atoms in the structural network of glass.

In embodiments, glass compositions according to the present disclosure may exhibit a total polyhedral parameter $P_{total}$ that is calculated according to the following relation:

$$P_{total}=SiO_2+2*Al_2O_3+2*B_2O_3, \quad \text{(Equation 3)}$$

where chemical formulas mean the amounts of corresponding components in the glass composition. $P_{total}$ may represent the total number of network forming cations $Si_4^+$, $Al_3^+$ and $B_3^+$ in terms of gram-atoms per total 100 moles of oxides presented in a glass composition.

In embodiments, glass compositions according to the present disclosure may exhibit a boron excess parameter $B_{exc}$ that is calculated according to the following relation:

$$B_{exc}=\max(0,B_2O_3-\max(0,R_2O+RO-Al_2O_3)), \quad \text{(Equation 4)}$$

where $R_2O$ is total sum of monovalent metal oxides, RO is total sum of divalent metal oxides, and chemical formulas mean the amounts of corresponding components in the glass composition. $B_{exc}$ represents the excess of boron oxide, in terms of mole %, over the content of modifiers $R_2O$ and RO (in mole %) after deduction of the content of alumina (in mole %) in a glass composition. In the case when the content of alumina is greater than or equal to the total content of $R_2O$ and RO, the boron excess parameter is assumed being equal to the content of the boron oxide in the glass composition.

In embodiments, glass compositions according to the present disclosure may exhibit a silica excess parameter $S_{exc}$ that is calculated according to the following relation:

$$Si_{exc}=SiO_2-6*\min(Alk_2O,Al_2O_3)-2*\min(Alk_2O+RO-Al_2O_3,B_2O_3), \quad \text{(Equation 5)}$$

where $Alk_2O$ is total sum of alkali metal oxides, RO is total sum of divalent metal oxides, and chemical formulas mean the amounts of corresponding components in the glass composition. $S_{exc}$ approximates the content of silica that is assumed not to be connected with the structural polyhedra formed by aluminum and boron cations.

In embodiments, the parameters $P_{total}$, $M_{exc}$, $B_{exc}$, and $S_{exc}$ of the glass compositions described herein may satisfy the following relation $$(abs(2*M_{exc}+2*\min(B_2O_3,R_2O+RO-Al_2O_3)+0.65*P_{total}-80))-(3.4-0.5*(abs(Si_{exc}-\max(24+2*B_{exc},44))))\leq 0.000$$

In embodiments, the parameters $P_{total}$, $M_{exc}$, $B_{exc}$, and $S_{exc}$ of the glass compositions described herein may satisfy the following relation $$(abs(2*M_{exc}+2*\min(B_2O_3,R_2O+RO-Al_2O_3)+0.65*P_{total}-80))-(2.8-0.5*(abs(Si_{exc}-\max(24+2*B_{exc},44))))\leq 0.000.$$

In some embodiments, glasses including the compositions described herein may have a quantity $12*(Alk_2O+RO)/P_{total}$ that is greater than or equal to 0.83.

Glasses including the compositions described herein may also include a non-rotatable polyhedra parameter $P_{nr}$ that is calculated as $$P_{nr}=2*\max(0,(Alk_2O+RO)-(Al_2O_3+B_2O_3))+2*\min(B_2O_3,R_2O+RO-Al_2O_3), \quad \text{(Equation 6)}$$

where $Alk_2O$ is total sum of alkali metal oxides, RO is total sum of divalent metal oxides, $R_{20}$ is total sum of monovalent metal oxides, and chemical formulas mean the amounts of corresponding components in the glass composition. Without wishing to be bound by theory, it is believed that $P_{nr}$ represents an approximate number of network forming cations $Si_4^+$, $Al_3^+$ and $B_3^+$ that cannot be rotated as described above, in terms of gram-atoms of non-rotatable network forming cations per total 100 moles of oxides presented in a glass composition.

Glasses including the compositions described herein may also include a network rotatability ratio $R_{nr}$ is a quantity calculated by the following formula:

$$R_{nr}=1-2*(Alk_2O+RO)/(SiO_2+2*Al_2O_3+2*B_2O_3), \quad \text{(Equation 7)}$$

where $Alk_2O$ is total sum of alkali metal oxides, RO is total sum of divalent metal oxides, and chemical formulas mean the amounts of corresponding components in the glass composition. Applicants believe that $R_{nr}$ may relate to fracture behavior of borosilicate glass compositions disclosed herein and characterize aspects of "rotatability" of the respective compositions. For compositions of the form $xSiO2 \cdot yAl2O3 \cdot zB2O3 \cdot uR20 \cdot vRO$, where x, y, z, u, v can represent mol % or molar fraction of each type of oxide. If $(u+v) \geq y$, Applicants believe the fracture behavior is related to a network rotatability ratio $R_{nr}$ as determined by Equation 7. In instances when $R_{nr}$ is between about 0.80 and about 0.93, Applicant have found that Vickers indenter tests produce radial and lateral cracks that are contained within a small (<1 mm in diameter) crack loop. A result is that sheets of glasses within this range may not crack to failure during Vickers indenter tests, but instead only form small round cracks that contain other cracks and prevent them from spreading.

In embodiments, glass compositions according to the present disclosure may include a network balance criterion $C_{nb}$ that is calculated as $$C_{nb}=abs(SiO_2-6*\min(Alk_2O,Al_2O_3)-2*\min(Alk_2O+RO-Al_2O_3,B_2O_3)-\max(24+2*\max(0,B_2O_3-\max(0,R_2O+RO-Al_2O_3)),44)), \quad \text{Equation (8)}$$

where $Alk_2O$ is total sum of alkali metal oxides, RO is total sum of divalent metal oxides, $R_2O$ is total sum of monovalent metal oxides, and chemical formulas mean the amounts of corresponding components in the glass composition. $C_{nb}$ represents the relationship between the parameters $Si_{exc}$ and $B_{exc}$ described herein. When values for the $Si_{exc}$ parameter are plotted as a function of the $B_{exc}$ parameter for the example compositions described herein, the examples are grouped around the line y=24−x and y=44−3*x, where y corresponds to the parameter $Si_{exc}$ and x corresponds to the parameter $B_{exc}$. The examples described herein are located around the highest values calculated by these equations, which can be expressed as follows:

$$Si_{exc}=\max(24-B_{exc}, 44-4*B_{exc}), \quad \text{(Equation 9)}$$

Without wishing to be bound by theory, it is believed that the difference between $Si_{exc}$ and the expression specified in the right part of Equation 9, $\max(24-B_{exc}, 44-4*B_{exc})$, may characterize the balance between silicon and boron connectivity in the structural network. The absolute value of the said difference, after substituting the expressions for $Si_{exc}$ and $B_{exc}$, finally gives the expression for $C_{nb}$. In other words, the network balance criterion can be expressed in terms of $Si_{exc}$ and $B_{exc}$ as follows:

$$C_{nb}=\text{abs}(Si_{exc}-\max(24-B_{exc}, 44-4*B_{exc})). \quad \text{(Equation 10)}$$

The example compositions described herein that exhibit anomalous and intermediate fracture behavior are characterized by relatively small values of $C_{nb}$, such as, for example, less than or equal to 5.0, or less than or equal to 4.5, or less than or equal to 4.0, or less than or equal to 3.5, or less than or equal to 3.0, or less than or equal to 2.5, or even less than or equal to 2.0.

The term "fracture category" refers to the type of fracture behavior observed while performing the Vickers indenter test, being described in terms of three categories: "normal", "anomalous" and "intermediate". The said Vickers indenter tests may be used to characterize fracture behavior of glass, as discussed in Gross et al., Crack-resistant glass with high shear band density, Journal of Non-Crystalline Solids, 494 (2018) 13-20; and Gross, Deformation and cracking behavior of glasses indented with diamond tips of various sharpness, Journal of Non-Crystalline Solids, 358 (2012) 3445-3452, both of which are incorporated by reference herein. In some embodiments, when glass having the borosilicate glass composition of the first glass ply is formed as at least ten polished, flat samples (e.g., 100 samples) of 1 mm thickness with a major surface of at least 2×2 cm² area (e.g., 2 cm by 2 cm square), and tested using square-based, 136° four-sided, pyramidal Vickers indenter directed orthogonally into a center of the major surface at 25° C. in 50% relative humidity and the indenter is quasi-statically displaced at rate of 60 µm per second up to maximum 3 kg-force with indentation load held for 10 seconds (unless failure by fracture of the sample occurs first), more often than not (at least 51 times out of 100; at least 6 times out of 10) all cracks extending through the sample radially and/or laterally from beneath the indenter tip (i.e. the location where the indenter tip contacted the glass) are interrupted by a self-terminating crack loop (e.g., ring crack), whereby fracture of the samples from the Vickers indenter is limited to cracking within the loop. In this case, the fracture category is identified as "intermediate". Essentially the indenter crushes and cracks the glass beneath the indenter. However, the crack loop forms and stops spread of cracking originating from the indenter contact beyond the crack loop. By contrast, lateral or radial cracks may otherwise form prior to and/or pass through such crack loops in other glasses (e.g., anomalous cracking) or crack loops may not form (e.g., normal cracking), and in either case the lateral or radial cracks would not be contained by the crack loop, and may propagate through the full glass article causing overall fracture through the article and failure thereof. This type of fracture behavior is identified as "normal".

In embodiments, glass compositions according to the present disclosure may include a rotatability balance criterion $C_{rb}$ is a quantity calculated as $$C_{rb}=\text{abs}(2*\max(0,(Alk_2O+RO)-(Al_2O_3+B_2O_3))+ \\ 2*\min(B_2O_3, R_2O+RO-Al_2O_3)+0.65*(SiO_2+ \\ 2*Al_2O_3+2*B_2O_3)-80), \quad \text{(Equation 11)}$$

where $Alk_2O$ is total sum of alkali metal oxides, RO is total sum of divalent metal oxides, $R_2O$ is total sum of monovalent metal oxides, and chemical formulas mean the amounts of corresponding components in the glass composition. $C_{rb}$ represents the relationship between the quantities $P_{total}$ and $P_{nr}$ described herein. When values of the $P_{nr}$ parameter are plotted as a function of values of the $P_{total}$ parameter for the Examples described herein, $P_{nr}$ values for the Examples of present disclosure fall around the line y=80−0.65*x, where y corresponds to the parameter $P_{nr}$ and x corresponds to the parameter $P_{total}$, which can be mathematically expressed as follows:

$$P_{nr}=80-0.65*P_{total}, \quad \text{(Equation 12)}$$

where $P_{total}$ and $P_{nr}$ refer to total polyhedra parameter and non-rotatable polyhedra parameter as described herein. Without wishing to be bound be theory, it is believed that the difference between $P_{nr}$ and the expression specified in the right part of Equation 12, $80-0.65*P_{total}$, may characterize the balance between the rotatable and non-rotatable structural polyhedra. The absolute value of the said difference, after substituting the expressions for $P_{nr}$ and $P_{total}$, finally gives the expression for $C_{rb}$. In other words, the network balance criterion can be expressed in terms of $Si_{exc}$ and $B_{exc}$ as follows:

$$C_{rb}=\text{abs}(P_{nr}-(80-0.65*P_{total})). \quad \text{(Equation 13)}$$

Density at room temperature (referred to herein using the term "$d_{RT}$") is a property of glass that can be predicted from the glass composition. A linear regression analysis of the Examples of the present disclosure as well as certain existing compositions was performed to generate an equation that can be used to predict the compositional dependence of the density for various glass compositions.

To select from among existing glass compositions, the criteria set forth in the Table 600 below were used to search the SciGlass Property Information System.

TABLE 600

| Property | $d_{RT}$, g/cm³ | |
| --- | --- | --- |
| Component limits | Min, mol % | Max, mol % |
| SiO₂ | 60 | 80 |
| Na₂O | 1 | 10 |
| Al₂O₃ | 0.3 | 10 |
| K₂O | 0 | 5 |
| Li₂O | 0 | 5 |
| BaO | 0 | 5 |
| Na₂O + K₂O | 5 | Not limited |
| B₂O₃ + 3.5 * Al₂O₃ | 15 | 30 |
| Other species | 0 | Not limited |

About 100 glass compositions were randomly selected from the search results and from the Exemplary Glasses from the embodiments presented herein. The linear regression analysis on the above-specified dataset was used to determine the formulas, with the exclusion of insignificant variables and outliers. The resulting formulas are presented in Table 700 below.

TABLE 700

| Property | Abbreviation | Unit | Predicting Parameter | Regression Formula | Composition Unit | Standard error |
|---|---|---|---|---|---|---|
| Density at room temperature | $d_{RT}$ | g/cm$^3$ | $P_d$ | Equation 14 | Mol % | 0.024 |

Another set of compositions satisfying the criteria in the Table 600 was used as a validation set to evaluate the ability of Equation 14 herein to interpolate within predefined compositional limits, which corresponds to the standard deviations specified in the Table 700. An external dataset of prior art glass compositions, also randomly selected from the SciGlass Property Information System database, was used to evaluate the ability to predict the properties outside of the specified compositional limits with a reasonable accuracy. Multiple iterations of this process were performed in order to determine the best variant for each property, corresponding to the above-mentioned regression formulas specified in the Table 700.

The data for the compositions used in the linear regression modeling, including the training dataset, validation dataset and external dataset were obtained from the publicly available SciGlass Property Information System database. Equation 14 below was obtained from the linear regression analysis and used to predict the density of the glasses:

$$P_d = 2.487 - 0.0068998*B_2O_3 + 0.041371*BaO + 0.13897*Bi_2O_3 + 0.011637*CaO + 0.055366*Cs_2O + 0.025420*Fe_2O_3 + 0.10294*Gd_2O_3 + 0.0051134*K_2O + 0.079903*La_2O_3 + 0.0041594*Li_2O + 0.0084582*MgO + 0.019720*MnO + 0.0064419*Na_2O + 0.018282*NiO + 0.065781*PbO - 0.002953*SiO_2 + 0.027682*SrO + 0.0055367*TiO_2 + 0.0068497*V_2O_5 + 0.048699*Y_2O_3 + 0.021527*ZnO + 0.026527*ZrO_2 + 0.011033*(min(B_2O_3, max(0, Alk_2O + RO - Al_2O_3))).$$  (Equation 14)

In Equation 14, the density parameter Pa is a parameter that predicts the density at room temperature [g/cm$^3$], calculated from the components of the glass composition expressed in mol %. In Equation 14, each component of the glass composition is listed in terms of its chemical formula, where the chemical formula refers to the concentration of the component expressed in mol %. For example, for purposes of Equation 14, $B_2O_3$ refers to the concentration of $B_2O_3$, expressed in mol %, in the glass composition. It is understood that not all components listed in Equation 14 are necessarily present in a particular glass composition and that Equation 14 are equally valid for glass compositions that contain less than all of the components listed in the formulas. It is further understood that Equation 14 are also valid for glass compositions within the scope and claims of the present disclosure that contain components in addition to the components listed in the formulas. If a component listed in Equation 14 is absent in a particular glass composition, the concentration of the component in the glass composition is 0 mol % and the contribution of the component to the value calculated from the formulas is zero. Equation 14 was used to generate predicted values for the density of the Examples described herein as well as glasses found in the prior art. The predicted values were plotted as a function of the measured densities at room temperature $d_{RT}$. Equation 14 was found to accurately predict the actual measured density, within an error of +/−.024 g/cm$^3$.

Applicant has found that, for certain glass compositions according to the Examples contained herein, the density parameter Pa, representing a predicted value of the density from the compositional components of each composition, satisfies a relation as a function of the ratio $Na_2O/Al_2O_3$. A first set of the Examples described herein were selected as satisfying the following criteria listed in the Table 800 below. In the Table 800, "Not limited" refers to a limitation that was not considered when selecting the compositions.

TABLE 800

| Quantity | Unit | Min | Max |
|---|---|---|---|
| $SiO_2$ | mol % | 60 | 77.5 |
| $B_2O_3$ | mol % | 5 | 17 |
| $Na_2O$ | mol % | 2.5 | 5.3 |
| $Al_2O_3$ | mol % | 0.3 | 5.3 |
| $K_2O$ | mol % | 0 | 3 |
| $Li_2O$ | mol % | 0 | 0.2 |
| BaO | mol % | 0 | 0.2 |
| $Na_2O + K_2O$ | mol % | 5 | Not limited |
| $B_2O_3 + 3.5 * Al_2O_3$ | mol % | 20.3 | 27.5 |

For the first set of examples, the density parameter Pa value was plotted as a function of the value of $Na_2O/Al_2O_3$ for each composition. It was found that the first set of examples satisfied the following relation:

$$P_d - (2.58 - 0.2*Na_2O/Al_2O_3) < 0.0 \quad \text{(Equation 15)}.$$

A subset of the first set of examples was found to satisfy the following relation:

$$P_d - (2.54 - 0.2*Na_2O/Al_2O_3) < 0.0 \quad \text{(Equation 16)}.$$

Certain existing glass compositions do not satisfy the relation defined by Equation 15 (and therefore also do not satisfy the relation defined by Equation 16). That is, the glass compositions according to the Examples described herein exhibit lower density parameter values (and lower measured $d_{RT}$ values) than certain existing glass compositions having comparable $Na_2O/Al_2O_3$ ratios. As described herein, such lower densities may facilitate the glasses according to the present disclosure exhibiting the unique fracture behaviors described herein.

A second set of the Examples described herein were selected as satisfying the following criteria listed in the Table 900 below.

TABLE 900

| Composition | Amount (mol %) |
|---|---|
| $SiO_2$ | 60.0 to 96.0 mol % |
| $B_2O_3$ | 1.0 to 25.0 mol % |
| $Al_2O_3$ | ≥0.3 mol % |
| Sum of ($Na_2O + Al_2O_3$) | ≥9.7 mol % |

In embodiments, the second set of Examples may also satisfy each of the following conditions: $1.01 \leq Na_2O/Al_2O_3$ [mol %] $\leq 1.67$, $B_2O_3 + 3.5*Al_2O_3$ [mol %] $\leq 27.5$, $C_{rb} - (3.4 - 0.5*C_{nb}) < 0.000$, where $C_{rb}$ is a rotatability balance criterion defined herein, and $C_{nb}$ is a network balance criterion defined herein, or $C_{rb} - (2.8 - 0.5*C_{nb}) < 0.000$, and $1-2*(Alk_2O + RO)/P_{total} > 0.83$, where total is $P_{total}$ polyhedra parameter. It was found that certain existing compositions failed to satisfy the above conditions.

A third set of the Examples described herein were selected as satisfying the following criteria listed in the Table 1000 below.

TABLE 1000

| Composition | Amount (mol %) |
|---|---|
| $SiO_2$ | 60.0 to 77.5 mol % |
| $B_2O_3$ | 5.0 to 17.0 mol % |
| $Na_2O$ | 2.5 to 5.3 mol % |
| $Al_2O_3$ | 0.3 to 5.3 mol % |

The third set of Examples was found satisfy each of the following conditions: $20.3 \leq B_2O_3 + 3.5 * Al_2O_3$ [mol %] $\leq 27.5$, $d_{RT} - (2.58 - 0.2 * (Na_2O/Al_2O_3)) < 0.00$, $d_{RT}$ is a density at room temperature, or, in some cases, $d_{RT} - (2.54 - 0.2 * (Na_2O/Al_2O_3)) < 0.000$. It was found that certain existing compositions failed to satisfy the above conditions.

A fourth set of the Examples described herein were selected as satisfying the following criteria listed in the Table 1100 below.

TABLE 1100

| Quantity | Unit | Min | Max |
|---|---|---|---|
| $SiO_2$ | mol % | 60 | 80 |
| $Al_2O_3$ | mol % | 0.3 | Not limited |
| $Li_2O$ | mol % | 0 | 0.3 |
| $Na_2O + Al_2O_3$ | mol % | Not limited | 9.7 |
| BaO | mol % | 0 | 0.1 |
| F | at % | 0 | 0.05 |
| $RE_mO_n$ | mol % | 0 | 0.1 |
| $Na_2O/Al_2O_3$ | mol % | 1.01 | 1.67 |
| $B_2O_3 + 3.5 * Al_2O_3$ | mol % | Not limited | 27.5 |
| $1 - 2 * (Alk_2O + RO)/P_{total}$ | | 0.83 | Not limited |

For each of the Examples in the fourth set, the $C_{rb}$ parameter was computed and plotted as a function of the $C_{nb}'$ parameter. It was determined that the $C_{rb}$ and $C_{nb}$ parameters for each of the Examples in the fourth set satisfy the relationship $$C_{rb} - (3.4 - 0.5 * C_{nb}) < 0.00. \quad \text{(Equation 17)}$$

The glasses according to the present disclosure were found to be distinguished from certain existing compositions in that Equation 17 is satisfied.

For a subset of the Examples in the fourth set, values for the $C_{rb}$ and $C_{nb}$ parameters were found to also satisfy the relationship $$C_{rb} - (2.8 - 0.5 * C_{nb}) < 0.00. \quad \text{(Equation 16)}$$

Such glasses were found to be further distinguished from certain existing compositions in that Equation 16 is satisfied.

Embodiments of the present disclosure may be further understood in view of the following information.

Additional samples of the borosilicate glasses described herein were tested for chemical durability when subjected to weathering in conditions of elevated temperature and humidity. The results were compared with other glasses subjected to testing under the same conditions. Samples having the composition of Example 26 provided in the Table 200, Comparative Example 26A, and Comparative Example 26B were subjected to lateral Knoop scratch testing on surfaces thereof to determine the scratch resistance. A mechanical tester holding a Knoop diamond was used to scratch surfaces of the samples at about 23° C. at a relative humidity of about 50%. The scratch length on each of the samples was 5.0 mm, with a load of 3N. Each of the samples was subjected to 5 such indentation events. FIG. 18A is an image of a sample with the composition of Counter Example 26B. FIG. 18B is an image of a sample with the composition of Counter Example 26A. FIG. 18C is an image of a sample with the composition of Example 26 provided in the Table 200. FIGS. 18A-18C are images of the samples prior to weathering (just after being subjected to the indentation events). As shown, consistent to the results described herein with respect to FIGS. 17A-17C, the sample according to Example 26 exhibited superior scratch performance, with a substantially smaller scratch widths being observed.

To further characterize the abrasion resistance performance of the glass articles described herein, after the formation of the indentations depicted in FIGS. 18A-18C, each of the samples was subjected to high temperature, high humidity conditions (85° C./85% relative humidity) for a period of 14 days, and the indentations were re-imaged after such exposure. FIG. 19A is an image of the sample with the composition of Counter Example 26B after weathering. FIG. 19B is an image of the sample with the composition of Counter Example 26A after weathering. FIG. 19C is an image of the sample with the composition of Example 26 after weathering. As is demonstrated via comparison of FIGS. 18A-18C with FIGS. 19A-19C, the superior abrasion resistance of the glass articles of the present disclosure is even further exaggerated when the indentations are exposed to weathering. Each of the Counter Examples 26A and 26B exhibited Knoop Scratch Lateral Cracking threshold of less than 3N post-weathering, in that lateral cracking was observed in at least 3 of the 5 indentation events after weathering. The Example 26 of the present disclosure, in contrast, exhibits a Knoop Scratch Lateral Cracking threshold that is greater than 3N after weathering (less than 3 of the 5 indentation events exhibited lateral cracking).

As used herein, "Knoop Scratch Lateral Cracking Threshold" is the onset of lateral cracking or failure (in 3 or more of 5 indentation events). In Knoop Lateral Cracking Scratch Threshold testing, samples of the glass articles and articles were first scratched with a Knoop indenter under a constant load to form a five indentation events. Whether the constant load was over or under the Knoop Scratch Lateral Cracking Threshold for a particular sample was determined by observing lateral cracks propagating from the indentation events. Particularly, the test specimen was inspected for at least one of the following 3 failure modes: 1) sustained lateral surface cracks that are more than two times the width of the groove, 2) damage that is contained within the groove, but there are lateral surface cracks that are less than two times the width of groove and there is damage visible by naked eye, or 3) the presence of large subsurface lateral cracks which are greater than two times the width of groove and/or there is a median crack at the vertex of the scratch.

Analysis of the samples according to Example 26 (as shown in FIGS. 18C and 19C) indicated that visible lateral cracking damage was observable in only one of the five indentation events after weathering. This is a significant improvement over Counter Example 26B (lateral damage outside of the groove was visible with the naked eye in all five indentation events after weathering) and Counter Example 26A (lateral damage outside of the groove was visible with the naked eye in all five indentation events after weathering). Given that vehicle glazings or windshields are typically exposed to extreme weather conditions for significant periods over their use lifetimes, such results demonstrate the superior durability of the glass articles described herein for such applications.

Haze measurements on samples according to Example 26 and Counter Example 26B (annealed soda lime glass) were also conducted both prior to and after exposure to high temperature, high humidity (85° C./95% relative humidity) conditions for 9 days. The results are provided in the Table 1200 below.

TABLE 1200

| Sample | CE 26B | E26 |
|---|---|---|
| Haze before | 0.21 | 0.05 |
| Haze after | 9.66 ± 1.44 | 0.38 ± 0.15 |

As shown in the Table 1200, weathering effected the haze results for the sample according to Example 26 to a significantly lesser extent than for the sample according to Counter Example 26B. Without wishing to be bound by theory, it is believed that these results are due to a lack of sodium and calcium carbonates in the sample according to Example 26. In embodiments, the glass articles described herein (e.g., either single glass sheets or laminates including a glass ply of the compositions described herein) may exhibit a haze of less than or equal to 5.0% (e.g., less than or equal to 2.5%, less than or equal to 1.0%) throughout the use lifetime of thereof (e.g., as an outer ply in an automotive window). Such consistent optical performance demonstrates the how the chemical durability of the glass articles described herein favorably effects optical performance for light transmission applications.

Figure 21:
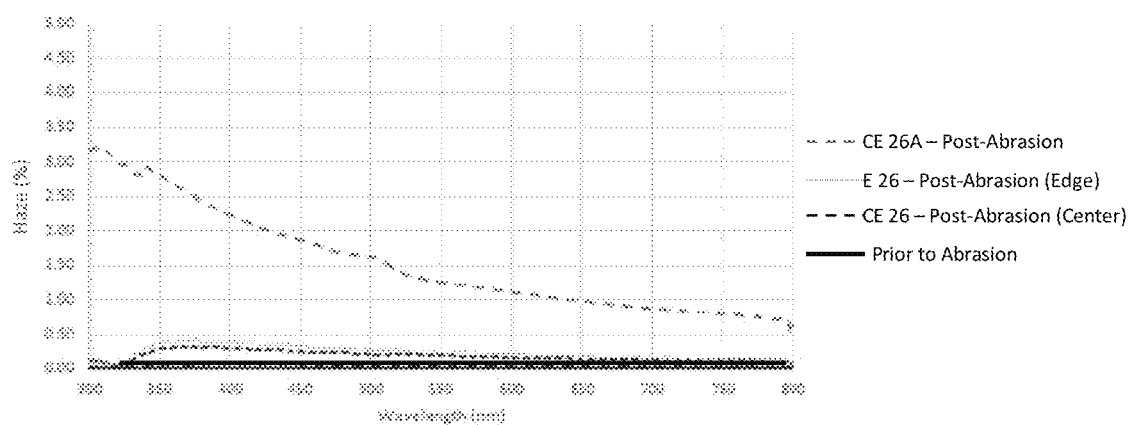
FIG. 21 is a graph depicting changes in haze from a wiper abrasion test of a sample constructed according to an example composition described herein and a sample constructed in accordance with a counter example composition described herein, according to exemplary embodiments.

To characterize the benefits of the superior abrasion resistance exhibited by the glass articles described herein over existing borosilicate glasses, windshield abrasion testing was conducted. Such testing was conducted to approximate the effects of repeated contact between the glass articles of the present disclosure and a wiper blade (e.g., associated with a windshield wiper) on optical performance. In this testing, 4" by 4" flat samples according to Counter Example 26A and Example 26 herein were subjected to 100 cycles of a wiper blade with a 250 g load being slid across a surface thereof. Arizona test grit described in ISO 12103-1 (A4 "course" test grit) was applied to the surfaces of the samples. Haze measurements were conducted both prior to and after abrasion via the wiper. The results for wet conditions are plotted in FIG. 21. Both samples exhibited low haze prior to abrasion and so the spectra are depicted as a single line. As shown, the samples according to Example 26 exhibited a relatively low change in haze from the abrasion testing, with the sample exhibiting a haze of less than 0.5% throughout a wavelength range of 300 nm to 800 nm (irrespective of location on the sample). The sample according to Counter Example 26A, in contrast, exhibited a substantial drop in haze performance, particularly in wet conditions (with the haze exceeding 2.0% over at least some of the wavelength range of 400 nm to 700 nm). These results demonstrate that the improved abrasion resistance provided by the glass articles described herein can favorably improve windshield performance over the usage lifetime thereof.

In embodiments, the glass articles described herein may exhibit a transmission haze of less than 1.0% throughout a wavelength range of 400 nm to 700 nm (and an average haze of less than or equal to 0.3% throughout the same wavelength range) after being exposed to 100 cycles of a wiper with a 250 g load with ISO 12103-1 A4 course grit particles being present between the glass and the wiper.

Additional ring-on-ring testing was also conducted for various samples after being indented with a Vickers indenter to determine the effects of the unique ring cracking behavior described herein on crack stability. Particularly, samples having a 2 mm thickness and the compositions of Example 26 and Counter Examples 26A and 26B were subjected to flexural strength testing after indentation via a Vickers indenter at a plurality of sub-critical loads (the samples did not immediately crack after application of the sub-critical loads). The flexural strength testing was conducted via ring-on-ring tests, which were generally performed according to the ASTM C-1499-03 standard test method for Monotonic Equibiaxial Flexural Strength of Advanced Ceramics at Ambient Temperatures. In particular, samples according to Example 26 and Counter Examples 26A and 26B described herein were indented with a Vickers indenter at 3 kgf as discussed above in relation to FIGS. 5A and 5B (such that a ring crack was observed on the sample including the composition according to Example 26). Ring-on-ring testing was then conducted for some of the specimens immediately after indentation (with the indentations being centered on the rings).

Figure 20:
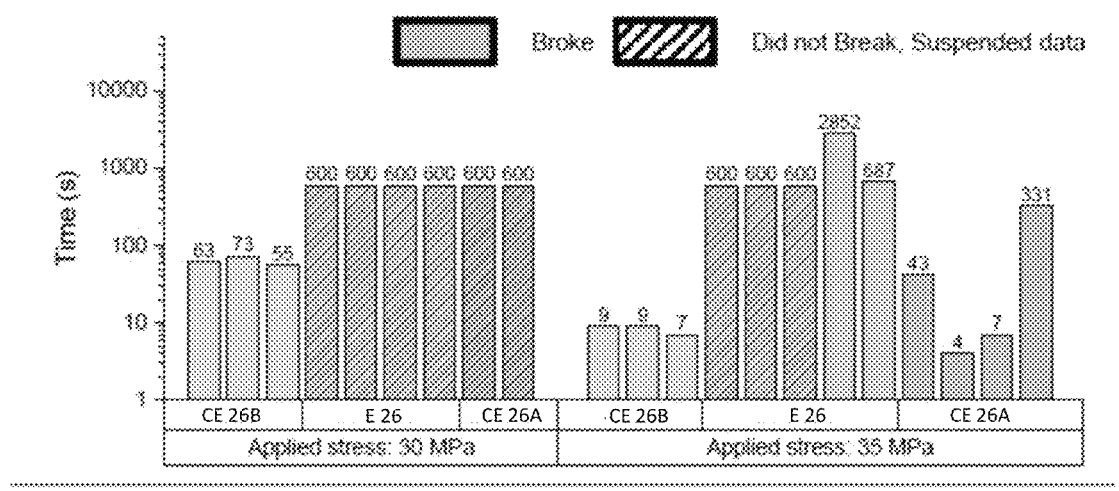
FIG. 20 is a graph depicting time periods that indented samples were exposed to at a load during ring-on-ring testing either prior to failure or prior to test completion, according to exemplary embodiments.

FIG. 20 depicts results for flexural strength testing at loads of 30 MPa and 35 MPa post indentation. As shown, at a load of 30 MPa, all of the samples of the composition according to Counter Example 26B failed at times of less than 80 seconds, whereas the samples having compositions according to Counter Example 26A and Example 26 did not fail when tested for a period of 10 minutes. These results indicate the crack stability superiority of borosilicate glasses in general over soda-lime glass. At a load of 35 MPa, all of the samples of the composition according to the Counter Example 26B failed at times of less than 10 seconds. At 35 MPa, all of the samples of the composition according to Counter Example 26A failed at times of less than 6 minutes (with three of the four samples failing at times of less than 1 minute). The samples of the composition according to Example 26, in contrast, did not fail at times of less than or equal to 10 minutes. All of the indented samples of the composition according to Example 26 survived a period of at least 10 minutes when subjected to a 35 MPa load post indentation. One of the samples according to Example 26 survived for a period of greater than 45 minutes. These results demonstrate that the unique fracture behavior of the glass articles described herein improve crack stability when the glass is subjected to subcritical loads by a factor of at least 10 when compared to soda lima glasses and at least 2 when compared with other borosilicate glasses.

In embodiments, when a sample of a glass composition described herein comprises a ring crack and is subjected to applied stresses of greater than or equal to 30 MPa and less than or equal to 35 MPa for a time period of at least 5 minutes (e.g., at least 6 minutes, at least 7 minutes, at least 8 minutes, at least 9 minutes, at least 10 minutes, at least 15 minutes, at least 20 minutes, at least 25 minutes, at least 30 minutes, at least 35 minutes, at least 40 minutes, at least 45 minutes), the sample does not break. The sources of such applied stresses may be thermal (e.g., as a result of CTE mismatch between a component adjacent the glass article such as a window frame), vibrational (e.g., from driving conditions associated with a vehicle), and structural (e.g., as a result of the glass article being incorporated into a laminate with another glass ply and the other glass ply being cold-formed against the glass article, as a result of the glass article being mounted in an opening).

Accelerated UV exposure testing was also conducted to determine long-term optical performance of laminates incorporating glass articles of the present disclosure. Long-term UV exposure is known to induce coloring in polymer interlayers. With reference to FIG. 15, it was believed that samples according to Example 26, due to their reduced levels of UV transmission, will tend to protect polymer interlayers in laminates from exposure and exhibit favorable long-term color performance compared with existing borosilicate glasses. To test this hypothesis, laminates were constructed using glass layers formed with compositions according to Examples 26 and Counter Example 26A herein. Each of the laminates comprised a 0.7 mm thick aluminosilicate inner ply, a PVB polymer interlayer, and 3.8 mm thick outer ply. The composition of the outer ply was the only difference between the laminates.

Figure 22:
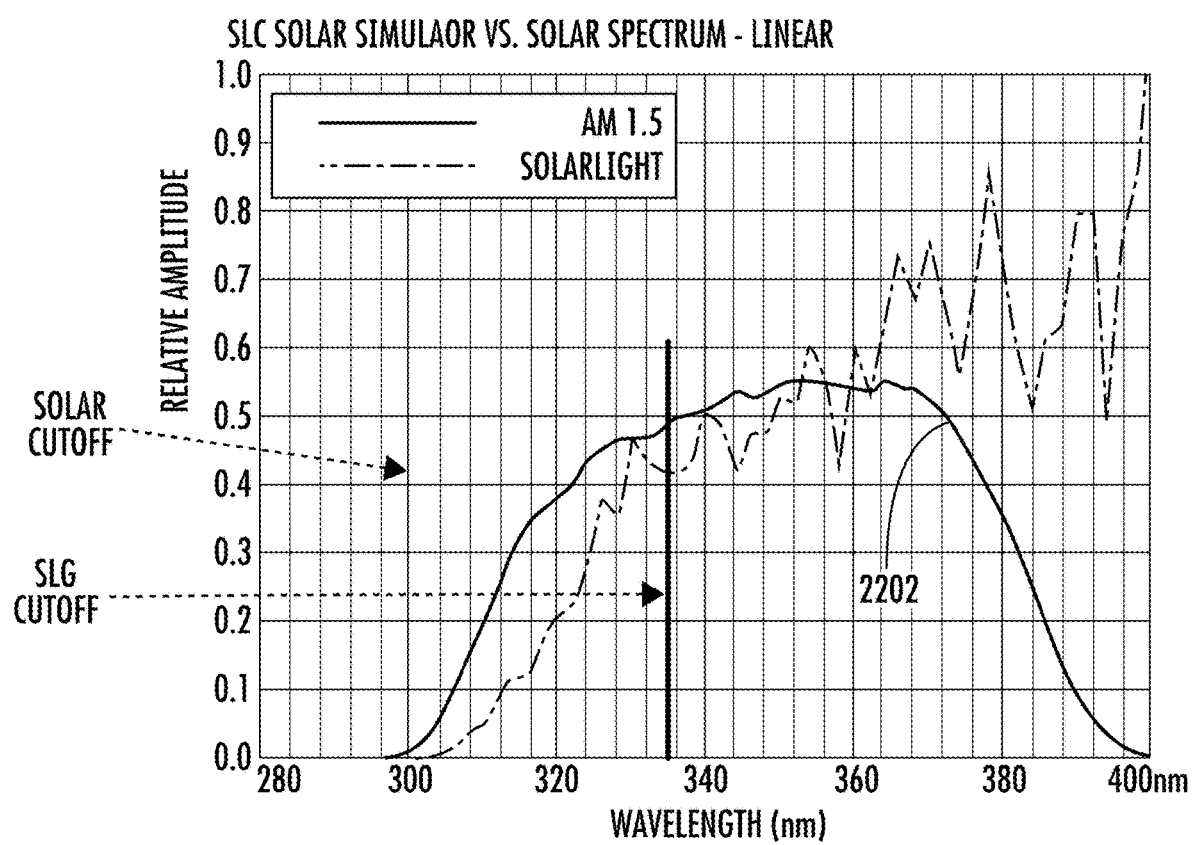
FIG. 22 is a graph depicting a spectrum of simulated solar light used in an accelerated UV exposure test, according to exemplary embodiments.

Each of the laminates were subjected to accelerated UV exposure using a Solar Simulator from Solar Light Inc. The simulator output UV light having the spectrum indicated by the line 2202 depicted in FIG. 22. As shown, the spectrum was focused on the UV portion of the solar spectrum. Each of the samples was exposed to UV light (through the outer ply) having a flux of 600 W/m² for a period of 240 hours, to simulate a subtropical exposure period of 1.8 years. Additional tests were conducted with an increased exposure period of 480 hours, to simulate a subtropical exposure period of 3.8 years. The results for the laminate with an outer ply according to Example 26 are given in the Table 1300 below. The results for the laminate with an outer ply according to Counter Example 26A are given in the Table 1350 below.

TABLE 1300

| | $T_{vis}$(%) | $T_{ds}$(%) | L* value | a* value | b* value | ΔE |
|---|---|---|---|---|---|---|
| Initial | 82.5 | 48.8 | 92.8 | −2.8 | 3.8 | |
| 1.8 years (delta) | −0.02 | 0.02 | −0.03 | 0.03 | 0.21 | 0.22 |
| 3.8 years (delta) | 0.03 | −0.05 | −0.03 | 0.02 | 0.44 | 0.44 |

TABLE 1350

| | $T_{vis}$(%) | $T_{ds}$(%) | L* value | a* value | b* value | ΔE |
|---|---|---|---|---|---|---|
| Initial | 83.2 | 49.6 | 93.1 | −2.9 | 3.7 | |
| 1.8 years (delta) | −0.5 | −0.5 | −0.3 | −0.2 | 1.1 | 1.16 |
| 3.8 years (delta) | −0.82 | −0.83 | −0.53 | −0.28 | 2.54 | 2.61 |

In the Tables 1300 and 1350, the L*, a*, and b* values are calculated in accordance with the CIELAB color coordinate system. The ΔE value was calculated in accordance with the 1976 formula. $T_{ds}$ values are measures of solar direct transmittance in accordance with ISO 9050.

As shown, the laminate with the outer ply constructed in accordance with Example 26 exhibited dramatically lower changes in optical performance and appearance than the laminate with the outer ply constructed in accordance with Example 26A. The laminate with the outer ply constructed in accordance with Example 26 exhibited changes in a* and b* values that were each less than 0.5 (with the a* values changing by less than 0.05) as a result of the UV exposure (for both exposure periods). The laminate with the outer ply constructed in accordance with Counter Example 26A exhibited changes in a* value and b* values that were at least 0.2 (with the b* values changing by more than 1.0 for the shorter exposure period and more than 2.5 for the longer exposure period). The ΔE values for the laminate with the outer ply constructed in accordance with Example 26 were each less than 0.5 (less than 0.25 for the shorter exposure period), which represents an unnoticeable color difference. The ΔE values for the laminate with the outer ply constructed in accordance with Counter Example 26A were at least 1.0 (and greater than 2.5 for the longer exposure period). For both exposure periods, the exposed area of the counter example exhibited a color change noticeable to the human eye when placed in front of a white grid, while the laminate with the outer ply constructed according to Example 26 did not exhibit any noticeable color change. These results demonstrate the advantages associated with the glass articles described herein, especially with iron additions, in terms of UV-blocking in order to prevent interlayer yellowing. It is believed that these favorable results are due to the lower UV transmission of the glass articles described herein than existing borosilicate glass compositions. For example, a 3.8 mm thick sample constructed according to Example 26 was shown to have an average transmittance for light from 300 nm to 400 nm of less than 75% (approximately 71%), whereas a 3.8 mm thick sample constructed according to Counter Example 26A was shown to have an average transmittance for light from 300 nm to 400 nm of greater than 90% (approximately 91%).

Sharp impact testing was also conducted on laminates to quantify sharp impact performance benefits associated with the glass articles described herein. In a first set of tests, a plurality of laminates were subjected to a blow dart sharp impact test where compressed gas was used to launch a sharp, diamond-tipped dart (120° conical tip) into the outer plies of the laminates. The velocity of the darts at impact was measured to determine the impact energy. Such tests were conducted on three laminates: a first laminate was constructed of two 2.1 mm thick plies of soda lime glass, a second laminate was constructed of a 0.7 mm thick inner ply of aluminosilicate glass and a 3.8 mm thick outer ply constructed according to Counter Example 26B, and a third laminate was constructed of a 0.7 mm thick inner ply of aluminosilicate glass and a 3.8 mm thick outer ply constructed according to Example 26. In all of the laminates, a PVB interlayer was used to attach the inner ply to the outer ply. Weibull distributions were generated for each of the laminates. The results are plotted in FIG. 23. As shown, both borosilicate glasses exhibit substantially improved sharp impact performance over the soda lime glass (with B10 values, or the impact energy where the probability of breakage is 10%, being approximately four times higher for the borosilicate glasses). As shown, for the laminates constructed with the outer ply of a composition according to Example 26, the B10 value is approximately 0.29 Joules. It is thought that these improvements are driven at least in part by the tendencies for borosilicate glasses to densify upon impact, thereby absorbing some the of the energy.

Figure 23:
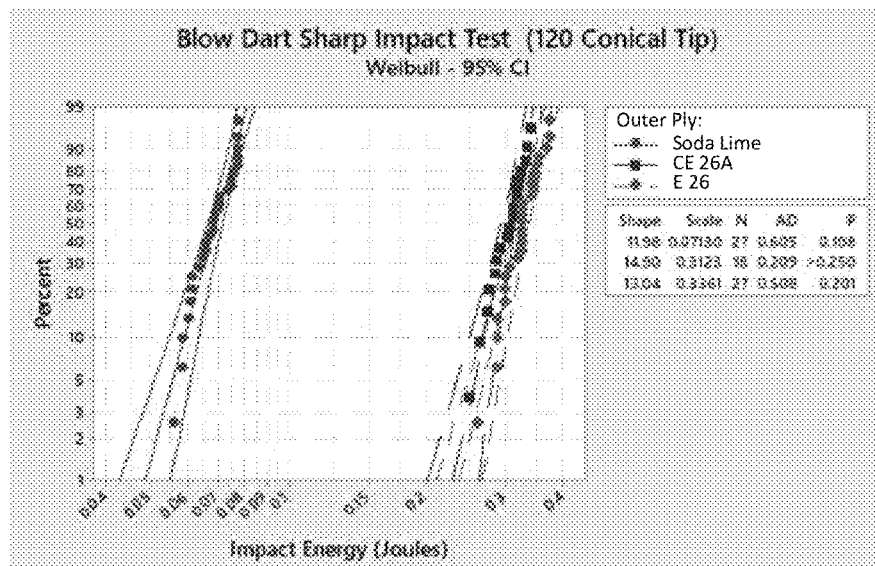
FIG. 23 is a graph of a Weibull distribution for laminates including outer plies constructed according to example and counter example compositions described herein, when subjected to a blow dart sharp impact test, according to exemplary embodiments.

As demonstrated by the results plotted in FIG. 23, the laminates with outer plies constructed according to Example 26 exhibited superior sharp impact performance over the laminates with outer plies constructed according to Counter Example 26A. The B10 value for the laminates with outer plies constructed in accordance with Counter Example 26A was less than 0.28 Joules, whereas the B10 value for the laminates with outer plies constructed in accordance with Example 26 was greater than 0.28 Joules. The entire Weibull distribution for the laminates with outer plies constructed in accordance with Example 26 was shifted to the right relative to that for the laminates with outer plies constructed in accordance with Counter Example 26A, demonstrating superior performance at a variety of impact energies.

Figure 24:
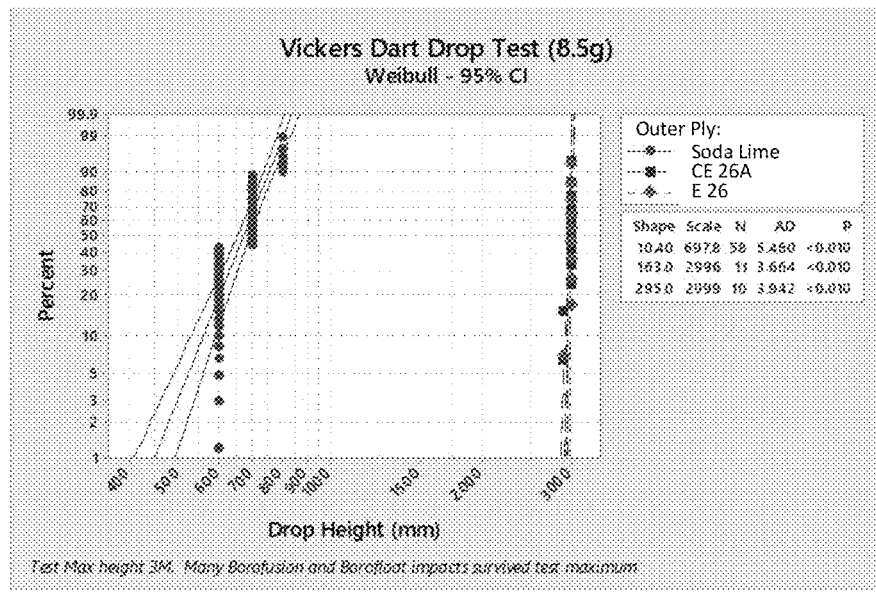
FIG. 24 is a graph of a Weibull distribution for laminates including outer plies constructed according to example and counter example compositions described herein, when subjected to a Vickers dart drop test, according to exemplary embodiments.

Referring now to FIG. 24, a similar set of laminates that was subjected to the blow dart sharp impact test was subjected to a Vickers dart drop test. The Vickers dart had a weight of 8.5 g with a pyramid tip having a 136° angle between faces. The test was performed by dropping the dart from incrementally increasing heights until failure is observed. Failure is defined as when the glass surface exhibits any number of radial/median cracks emanating from the corners of the indent impression that are greater than 10 mm. Measurements were performed at room temperature. Weibull distributions are depicted in FIG. 24. As shown, the borosilicate glasses demonstrated superior sharp impact performance, with many examples surviving the maximum drop height of 3000 mm.

Figure 25:
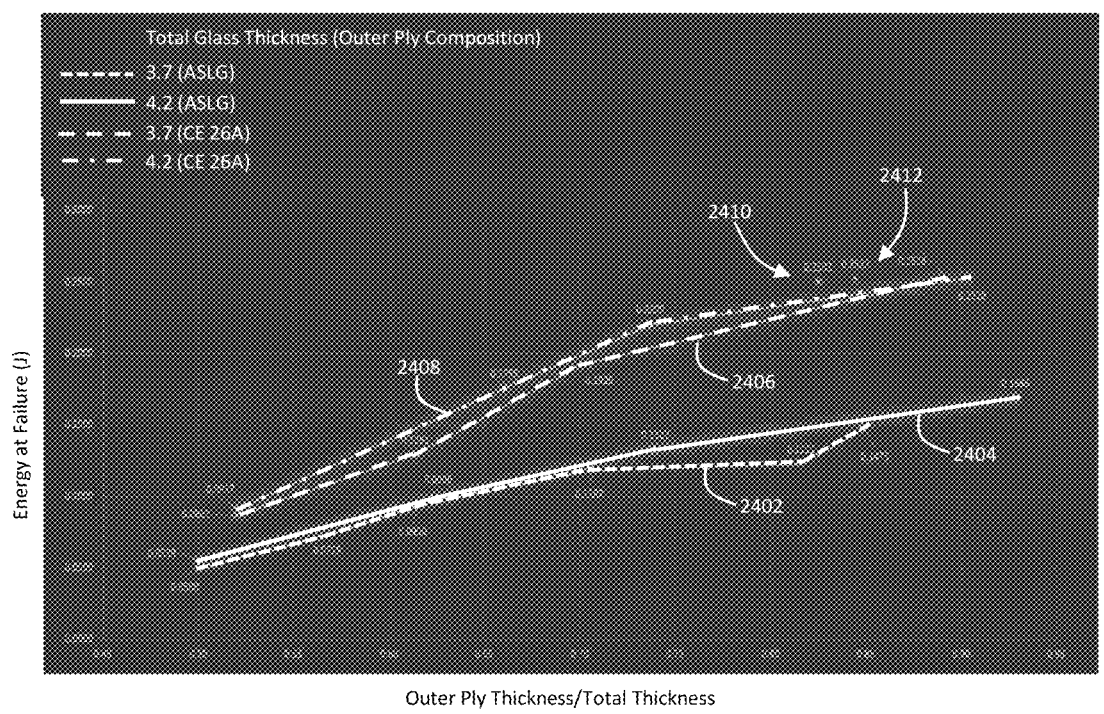
FIG. 25 is a graph depicting impact energy at value for a plurality of laminates with different outer ply thickness portions for outer plies constructed according to example and counter example compositions described herein, when subjected to a Vickers dart drop test, according to exemplary embodiments.

A plurality of laminates were subjected to the Vickers dart drop test to quantify the effects of (a) laminate asymmetry; and (b) outer ply composition on sharp impact performance of glass laminates. A plurality of laminates were constructed for various different outer ply compositions. For each outer ply composition, a single value for the total glass thickness (a combined thickness of the inner and outer ply) was used and the laminate asymmetry was varied by changing the thickness of the outer ply and the thickness of the inner ply. The composition of the inner ply in each laminate varied from sample to sample. On each laminate, the Vickers dart was dropped at incrementally increasing heights on the outer ply until a failure was observed. The results are depicted in FIG. 25. In FIG. 25, the line 2502 represents results for a plurality of laminates with a total glass thickness of 3.7 mm and an outer ply composition of soda lime glass, the line 2504 represents results for a plurality of laminates with a total glass thickness of 4.2 mm and an outer ply composition of soda lime glass, the line 2406 represents results for a plurality of laminates with a total glass thickness of 3.7 mm and an outer ply composition according to Counter Example 26A, and the line 2408 represents results for a plurality of laminates with a total glass thickness of 4.2 mm and an outer ply composition according to Counter Example 26A. The point 2410 represents results for a single laminate having a 0.7 mm thick inner ply of an aluminosilicate glass and a 3.3 mm thick outer ply having a composition according to Example 26 (total glass thickness of 4.0 mm and an outer thickness proportion of 82.5). The point 2412 represents results for a single laminate having a 0.7 mm thick inner ply of an aluminosilicate glass and a 3.8 mm thick outer ply having a composition according to Example 26 (total glass thickness of 4.5 mm).

As shown by the results plotted in FIG. 25, increased asymmetry (or increased outer layer thickness proportion) is generally associated with superior sharp impact performance. For each of the plots, an outer ply thickness proportion greater than 0.85 resulted in a failure energy that was more than two times greater than an outer ply thickness proportion of about 0.5. These results indicate that asymmetric laminates are generally superior from a sharp impact performance perspective, by providing a more rigid outer layer. The results also demonstrate that, especially for laminates including borosilicate outer plies, smaller total glass thicknesses may provide superior sharp impact performance, provided that an appropriate outer ply thickness proportion is selected. As demonstrated by the line 2406, for example, laminate with a total glass thickness of 3.7 mm (with outer ply thickness proportions of greater than 0.75) can provide superior sharp impact performance than a laminate with a total glass thickness of 4.2 mm (with outer ply thickness proportions of less than 0.70). As these results demonstrate, in some applications, a laminate of reduced overall thickness may be used by leveraging thickness asymmetry, while still providing the same sharp impact performance. Asymmetry may enable weight reduction of glass laminates for certain applications (e.g., by decreasing the thickness of the inner ply and either increasing the thickness of the outer ply or holding the thickness of the outer ply constant). The lines 2406 and 2408 have slopes that are greater than the lines 2402 and 2404, indicating that asymmetry benefits are especially enhanced with borosilicates. Without wishing to be bound by theory, it is believed that this is due to the densification behavior of borosilicate glasses.

Referring still to FIG. 25, the point 2410 indicates that a laminate with a total glass thickness of 4.0 can achieve superior sharp impact performance over another laminate with the same thickness, just by changing the outer ply composition from an existing borosilicate (corresponding to Counter Example 26A) to glass composition described herein. Without wishing to be bound by theory, it is believed that such favorable results are at least in part caused by the unique fracture behavior exhibited by the glass articles described herein. Laminates incorporating outer plies having a borosilicate glass composition described herein may not fail at impact energies of less than 0.25 J with a Vickers diamond impactor, provided that the outer ply is at least 3.3 mm thick, and the outer ply thickness proportion is greater than or equal to 0.825. Laminates with outer plies constructed of existing borosilicate glasses, in contrast require greater outer ply thickness proportions (of greater than 0.875) to obtain equivalent sharp impact performance. The compositions described herein may therefore facilitate utilization of thicker inner plies (e.g., such that the inner ply constitutes greater than 12.5% of a total glass thickness of the laminate) while exhibiting superior sharp impact performance. It is believed that use of thicker outer plies may aid in producing glass laminates with superior shape and optical qualities, as reduced thickness differential may reduce co-sagging difficulties.

To characterize the optical performance of the glass articles described herein, measurements were conducted with a Labscan system from ISRA Vision AG. The system transmitted zebra patterns through samples and measured both horizontal (i.e., measuring the tendency for objects to be longer or shorter than they actually are) and vertical (i.e., measuring the tendency for objects to be wider or narrower than they actually are) distortions via imaging errors in the zebra patterns. As used herein, "horizontal" refers to a direction parallel to the length of the sample, while "vertical" refers to a direction perpendicular to the length (i.e., a width). Vertical distortion measures the tendency for objects to appear wider or narrower along the length (e.g., vertical lines in an image get closer or further apart along the direction of the length). Vertical distortions will result in objects appearing wider or narrower than they should in a direction parallel to the ground, when installed in a vehicle as a windshield.

Figure 26A:
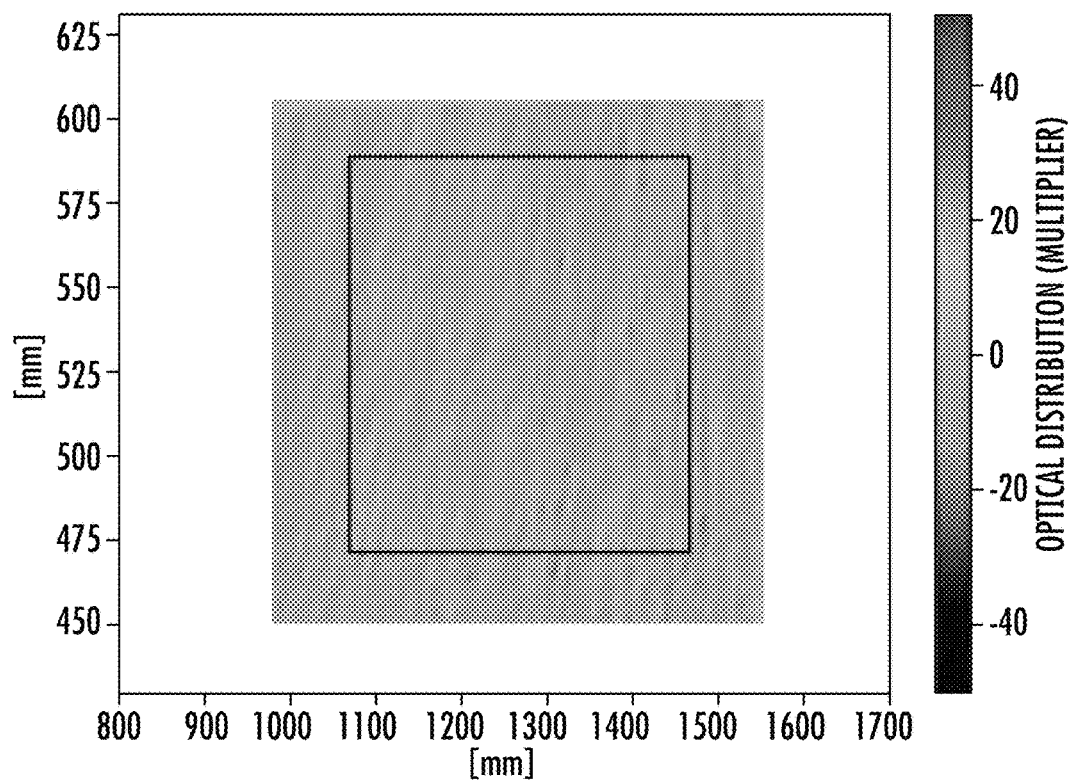
FIG. 26A is a graph of vertical optical distortions for a 3.8 mm thick sample constructed according to a counterexample described herein, according to exemplary embodiments.
Figure 26B:
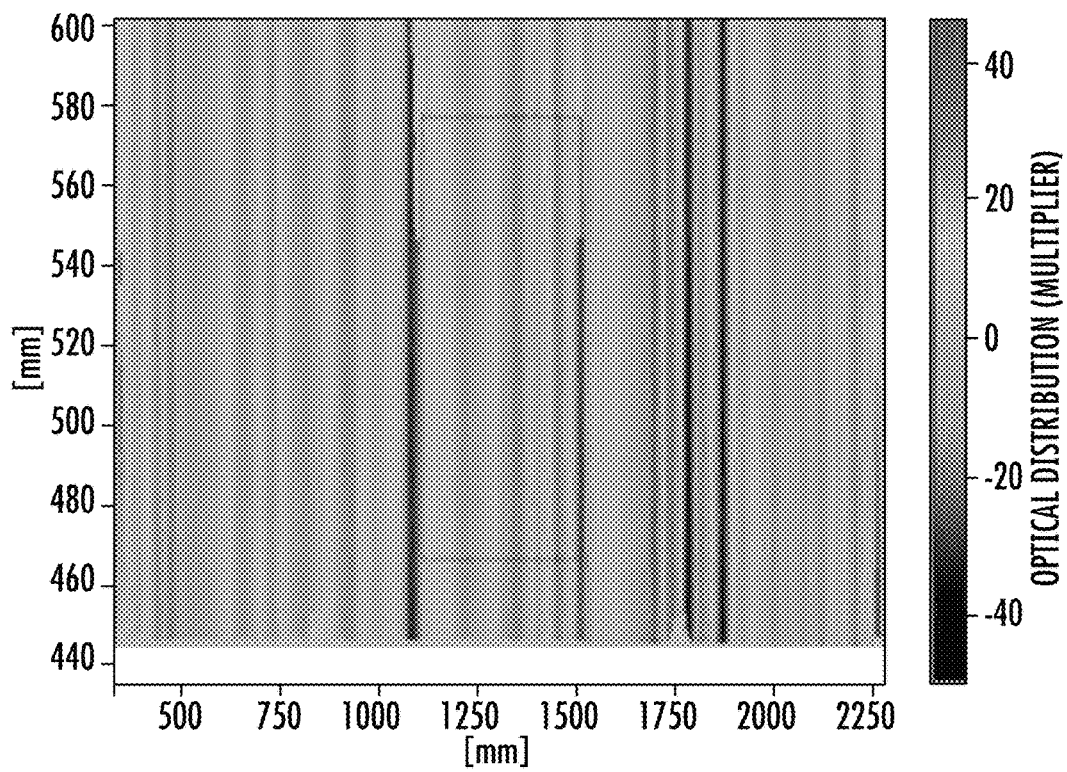
FIG. 26B is a graph of vertical optical distortions for a 3.8 mm thick sample constructed according to an example described herein, according to exemplary embodiments.

Samples of float-formed glass having a composition according to Counter Example 26A herein and fusion-formed glass having a composition according to Example 26 herein were measured. The vertical distortion measurements for a sample of the float-formed glass are depicted in FIG. 26A. The vertical distortion measurements for the fusion-formed glass are depicted in FIG. 26B. As is demonstrated by comparing FIGS. 26A and 26B, the fusion formed sample is distinguished in that the vertical distortion measurements exhibit well defined draw lines (continuous strips of positive or negative optical distortion extending vertically through the entire region). It is believed that these draw lines originate from the fusion process. The fusion-formed sample is also distinguished in that, in the fusion-formed example, variations in the vertical distortion are less frequent. That is, the spacing between adjacent draw lines (a center-to-center distance between two adjacent draw lines) is 80 mm to 100 mm, on average. In the float-formed sample, variations in the vertical distortion are much more frequent, with variations between adjacent regions of positive and negative vertical distortion being much closer together on average (between 20 mm and 30 mm in the depicted example). It is believed that the increased spacing of vertical distortion variations in the fusion-formed samples are advantaged in terms of overall optical distortion performance of the glass articles described herein for use as outer plies in windshields.

With reference to FIG. 8, it is worth noting that glass articles of the present disclosure generally absorb relatively high levels of infrared radiation (at wavelengths greater than or equal to 780 nm). In embodiments, glass articles of the present disclosure exhibit an average transmittance for light from 1000 nm to 2500 nm of less than or equal to 80%. In embodiments, the average transmittance for light from 1000 nm to 2500 nm is less than or equal to 70%. In embodiments, the average transmittance for light from 1000 nm to 2500 nm is less than or equal to 60%. While the data depicted in FIG. 8 demonstrates that such infrared transmissions are obtainable for glass having 3.3 mm thicknesses, such transmittances are also obtainable for glass articles with lower thicknesses by increasing the iron additions to the glass relative to the examples represented in FIG. 8. Embodiments of the borosilicate glass compositions described herein can comprise greater than or equal to 0.5 mol % Fe (represented as constituent oxides FeO and $Fe_2O_3$), such as greater than or equal to 0.5 mol % Fe and less than or equal to 1.0 mol % Fe. Such high Fe embodiments may provide enhanced IR absorption to facilitate heating. Such high Fe embodiments (or any of the other glass compositions described) may be formed via float-forming techniques.

A benefit associated with the relatively high absorbance in the infrared of the glass articles described herein over certain existing borosilicate glasses is that the absorbance aids in heating the glass articles described herein using infrared radiation to a greater extent than existing borosilicate glasses. Existing furnaces used in, for example, bending glass plies for automotive applications rely on infrared radiation to heat the glass. The IR absorption of the glass articles described herein beneficially facilitates use of existing bending furnaces for shaping.

Embodiments of the present disclosure may be further understood in view of the following aspects.

A first aspect of the present disclosure includes a borosilicate glass composition, comprising: at least 74 mol % $SiO_2$; at least 10 mol % $B_2O_3$; and $Al_2O_3$ in an amount such that sum of $SiO_2$, $B_2O_3$, and $Al_2O_3$ is at least 90 mol %; wherein the borosilicate glass composition comprises a liquidus viscosity of greater than 500 kP; and wherein the borosilicate glass composition comprises a temperature at which a viscosity of the borosilicate glass composition is 200 P of 1725° C. or less.

A second aspect of the present disclosure includes the borosilicate glass according to the first aspect, further comprising about 2 mol % to about 8 mol % $Na_2O$.

A third aspect of the present disclosure includes the borosilicate glass according to any of the first aspect through the second aspect, further comprising about 0.8 mol % to about 4 mol % $K_2O$.

A fourth aspect of the present disclosure includes the borosilicate glass according to any of the first aspect through the third aspect, wherein a total amount of $Na_2O$ and $K_2O$ is at least 4 mol %.

A fifth aspect of the present disclosure includes the borosilicate glass according to any of the first aspect through the fourth aspect, wherein a total amount of MgO and CaO is at most 5 mol %.

A sixth aspect of the present disclosure includes the borosilicate glass according to any of the first aspect through the fifth aspect, further comprising $P_2O_5$, wherein $P_2O_5$ is present in an amount up to 4 mol %.

A seventh aspect of the present disclosure includes the borosilicate glass according to any of the first aspect through the sixth aspect, further comprising about 0.05 mol % to about 0.25 mol % of $SnO_2$.

An eighth aspect of the present disclosure includes the borosilicate glass according to any of the first aspect through the seventh aspect, further comprising 0.05 mol % to 0.50 mol % of an iron compound.

A ninth aspect of the present disclosure includes the borosilicate glass according to any of the first aspect through the eighth aspect, wherein total solar transmittance as measured according to ISO 13837A is 90% or less.

A tenth aspect of the present disclosure includes the borosilicate glass according to any of the first aspect through the ninth aspect, wherein visible transmission as measured according to ISO 13837A is at least 73%.

An eleventh aspect of the present disclosure includes the borosilicate glass according to any of the first aspect through the tenth aspect, comprising a coefficient of thermal expansion of 5.6 ppm/° C. or less as measured over a temperature range of 0° C. to 300° C.

A twelfth aspect of the present disclosure includes the borosilicate glass according to any of the first aspect through the eleventh aspect, comprising a density of less than 2.4 $g/cm^3$.

A thirteenth aspect of the present disclosure includes the borosilicate glass according to any of the first aspect through the twelfth aspect, comprising a strain point of about 480° C. to about 560° C.

A fourteenth aspect of the present disclosure includes the borosilicate glass according to any of the first aspect through the thirteenth aspect, comprising an anneal point of about 520° C. to about 590° C.

A fifteenth aspect of the present disclosure includes the borosilicate glass according to any of the first aspect through the fourteenth aspect, wherein the glass ply comprises the borosilicate glass composition according to any of the preceding claims.

A sixteenth aspect of the present disclosure includes the borosilicate glass according to any of the first aspect through the fifteenth aspect, wherein, when subjected to a quasi-static 2 kgf indentation load with a Vickers tip, the glass ply exhibits a ring crack and a plurality of radial cracks and wherein each radial crack of the plurality of radial cracks is bounded by the ring crack.

A seventeenth aspect of the present disclosure includes the borosilicate glass according to any of the first aspect through the sixteenth aspect, wherein the glass ply is formed via fusion draw and wherein a thickness between the first major surface and the second major surface is greater than 2 mm.

An eighteenth aspect of the present disclosure includes the borosilicate glass according to any of the first aspect through the seventeenth aspect, wherein the thickness is at least 3 mm.

A nineteenth aspect of the present disclosure includes a laminate, comprising: a first glass ply according to any of the first aspect through the eighteenth aspect, a second glass ply; and an interlayer bonding the first glass ply to the second glass ply.

A twentieth aspect of the present disclosure includes a laminate according to the nineteenth aspect, wherein the first glass ply is thicker than the second glass ply.

A twenty-first aspect of the present disclosure includes a laminate according to any of the nineteenth aspect through the twentieth aspect, wherein the second glass ply is strengthened.

A twenty-second aspect of the present disclosure includes a laminate according to any of the nineteenth aspect through the twenty-first aspect, wherein the first glass ply and the second glass ply are pair-shaped, wherein the first glass ply comprises a first curvature depth of at least 2 mm, wherein the second glass ply comprises a second curvature depth of at least 2 mm, and wherein the first curvature depth is within 10% of the second curvature depth.

A twenty-third aspect of the present disclosure includes a laminate according to any of the nineteenth aspect through the twenty-second aspect, wherein the first glass ply is sagged and comprises a curvature depth of at least 2 mm and wherein the second glass ply is cold-formed into conformity with the first glass ply.

A twenty-fourth aspect of the present disclosure includes an automotive glazing including the laminate according to any of the nineteenth aspect through the twenty-fourth aspect.

A twenty-fifth aspect of the present disclosure includes a vehicle, comprising: a body defining an interior of the vehicle and at least one opening; the automotive glazing according to claim 24 disposed in the at least one opening; wherein the second glass ply is arranged facing the interior of the vehicle and the first glass ply faces an exterior of the vehicle.

A twenty-sixth aspect of the present disclosure includes a vehicle according to the twenty-fifth aspect, wherein the automotive glazing is at least one of a sidelight, a windshield, a rear window, a window, or a sunroof.

A twenty-seventh aspect of the present disclosure includes a method of forming a glass ply, the glass ply comprising a first major surface and a second major surface, the method comprising: overflowing a trough in an isopipe with at least two streams of a borosilicate glass composition comprising a liquidus viscosity of greater than 500 kP and a temperature at which a viscosity of the borosilicate glass composition is 200 P of 1725° C. or less, wherein the borosilicate glass composition comprises at least 74 mol % $SiO_2$ and at least 10 mol % of $B_2O_3$ and wherein a combined amount of $SiO_2$, $B_2O_3$, and $Al_2O_3$ is at least 90 mol %; fusing the at least two streams of the borosilicate glass composition at a root of the isopipe to form the glass ply having a thickness of at least 2 mm between the first major surface and the second major surface.

A twenty-eighth aspect of the present disclosure includes the method according to the twenty-seventh aspect, wherein the glass ply comprises a coefficient of thermal expansion of 5.6 ppm/° C. or less as measured over a temperature range of 0° C. to 300° C.

A twenty-ninth aspect of the present disclosure includes the method according to any of the twenty-seventh to the twenty-eighth aspects, wherein the glass ply comprises a density of less than 2.4 g/cm³.

A thirtieth aspect of the present disclosure includes the method according to any of the twenty-seventh to the twenty-ninth aspects, wherein the borosilicate glass composition further comprises from about 2 mol % to about 8 mol % $Na_2O$.

A thirty-first aspect of the present disclosure includes the method according to any of the twenty-seventh to the thirtieth aspects, wherein the borosilicate glass composition further comprises from about 0.8 mol % to about 4 mol % $K_2O$.

A thirty-second aspect of the present disclosure includes the method according to any of the twenty-seventh to the thirtieth aspects, wherein a total amount of $Na_2O$ and $K_2O$ is at least 4 mol %.

A thirty-third aspect of the present disclosure includes the method according to any of the twenty-seventh to the twenty second aspects, wherein the borosilicate glass composition further comprises at least one of MgO or CaO, wherein a total amount of MgO and CaO is at most 5 mol %.

A thirty-fourth aspect of the present disclosure includes the method according to any of the twenty-seventh to the thirty-third aspects, wherein the borosilicate glass composition further comprises about 0.05 mol % to about 0.25 mol % of $SnO_2$.

A thirty-fifth aspect of the present disclosure includes the method according to any of the twenty-seventh to the thirty-fourth aspects, wherein the borosilicate glass composition further comprises 0.05 mol % to 0.50 mol % of an iron compound.

A thirty-sixth aspect of the present disclosure includes the method according to any of the twenty-seventh to the thirty-fifth aspects, further comprising $P_2O_5$, wherein $P_2O_5$ is present in an amount up to 4 mol %.

A thirty-seventh aspect of the present disclosure includes a glass ply, comprising: a first major surface and a second major surface opposite to the first major surface, wherein the glass ply comprises a borosilicate glass composition; and wherein, when subjected to a quasi-static 2 kgf indentation load with a Vickers tip, the glass ply exhibits a ring crack and a plurality of radial cracks and wherein each radial crack of the plurality of radial cracks is bounded by the ring crack.

A thirty-eighth aspect of the present disclosure includes a glass ply according to the thirty-seventh aspect, wherein the borosilicate glass composition comprises: at least 74 mol % $SiO_2$; at least 10 mol % $B_2O_3$; and $Al_2O_3$ in an amount such that sum of $SiO_2$, $B_2O_3$, and $Al_2O_3$ is at least 90 mol %.

A thirty-ninth aspect of the present disclosure includes a glass ply according to the thirty-eighth aspect, wherein the borosilicate glass composition comprises a liquidus viscosity of greater than 500 kP.

A fortieth aspect of the present disclosure includes a glass ply according to any of the thirty eighth through the thirty ninth aspects, wherein the borosilicate glass composition comprises a temperature at which a viscosity of the borosilicate glass composition is 200 P of 1725° C. or less.

A forty-first aspect of the present disclosure includes a glass ply according to any of the thirty-eighth through the forty-first aspects, wherein the borosilicate glass composition comprises about 2 mol % to about 8 mol % $Na_2O$.

A forty-second aspect of the present disclosure includes a glass ply according to any of the thirty-eighth through the fortieth aspects, wherein the borosilicate glass composition comprises about 0.8 mol % to about 4 mol % $K_2O$.

A forty-third aspect of the present disclosure includes a glass ply according to any of the thirty-eighth through the forty-second aspects, wherein the borosilicate composition comprises a total amount of $Na_2O$ and $K_2O$ that is at least 4 mol %.

A forty-fourth aspect of the present disclosure includes a glass ply according to any of the thirty-eighth through the forty-third aspects, wherein the borosilicate glass composition comprises at least one of MgO or CaO, wherein a total amount of MgO and CaO is at most 5 mol %.

A forty-fifth aspect of the present disclosure includes a glass ply according to any of the thirty-eighth through the forty-fourth aspects, wherein the borosilicate glass composition comprises $P_2O_5$ in an amount up to 4 mol %.

A forty-sixth aspect of the present disclosure includes a glass ply according to any of the thirty-eighth through the forty-fifth aspects, wherein the borosilicate glass composition comprises about 0.05 mol % to about 0.25 mol % of $SnO_2$.

A forty-seventh aspect of the present disclosure includes a glass ply according to any of the thirty-eighth through the forty-sixth aspects, wherein the borosilicate glass composition comprises 0.05 mol % to 0.50 mol % of an iron compound.

A forty-eighth aspect of the present disclosure includes a glass ply according to any of the thirty-eighth through the forty-seventh aspects, wherein total solar transmittance through the glass ply as measured according to ISO 13837A is 90% or less.

A forty-ninth aspect of the present disclosure includes a glass ply according to any of the thirty-eighth through the forty-eighth aspects, wherein visible transmission through the glass ply as measured according to ISO 13837A is at least 73%.

A fiftieth aspect of the present disclosure includes a glass ply according to any of the thirty eighth through the forty-ninth aspects, wherein the first major surface exhibits an optical distortion of at most 200 millidiopters, as measured by an optical distortion detector using transmission optics according to ASTM 1561.

A fifty-first aspect of the present disclosure includes a glass laminate, comprising: a first glass ply comprising a first major surface and a second major surface opposite to the first major surface, wherein the first glass ply comprises a borosilicate glass composition; a second glass ply comprising a third major surface and a fourth major surface opposite to the third major surface; and an interlayer bonding the second major surface of the first glass ply to the third major surface of the second glass ply; wherein the borosilicate glass composition comprises: at least 74 mol % $SiO_2$; at least 10 mol % $B_2O_3$; and $Al_2O_3$ in an amount such that sum of $SiO_2$, $B_2O_3$, and $Al_2O_3$ is at least 90 mol %.

A fifty-second aspect of the present disclosure includes a glass laminate according to the fifty-second aspect, wherein the first glass ply is thicker than the second glass ply.

A fifty-third aspect of the present disclosure includes a glass laminate according to any of fifty-first through the fifty-second aspects, wherein the second glass ply is strengthened.

A fifty-fourth aspect of the present disclosure includes a glass laminate according to any of fifty-first through the fifty-third aspects, wherein the second glass ply is chemically strengthened through an ion-exchange treatment.

A fifty-fifth aspect of the present disclosure includes a glass laminate according to any of fifty-first through the fifty-fourth aspects, wherein the glass laminate is configured for use in a vehicle having a body defining an interior and an opening, wherein the glass laminate is configured to be positioned in the opening, and wherein the first glass ply is arranged facing an exterior of the vehicle and the second glass ply is arranged facing the interior of the vehicle.

A fifty-sixth aspect of the present disclosure includes a glass laminate according to any of fifty-first through the fifty-fifth aspects, wherein the first glass ply has a first thickness between the first major surface and the second major surface of at least 2 mm and wherein the second glass ply has a second thickness between the third major surface and the fourth major surface of less than 2 mm.

A fifty-seventh aspect of the present disclosure includes a glass laminate according to any of fifty-first through the fifty-sixth aspects, wherein the glass laminate comprises a total glass thickness equal to a sum of the first thickness and the second thickness and wherein a ratio of the first glass thickness to the total glass thickness is at least 0.7.

A fifty-eighth aspect of the present disclosure includes a glass laminate according to any of fifty-first through the fifty-seventh aspects, wherein the first glass thickness is at least 3 mm and the second glass thickness is 1.1 mm or less.

A fifty-ninth aspect of the present disclosure includes a glass laminate according to any of fifty-first through the fifty-eighth aspects, wherein the first glass thickness is at least 3.3. mm and the second glass thickness is 0.7 mm or less.

A sixtieth aspect of the present disclosure includes a glass laminate according to any of fifty-first through the fifty-ninth aspects, wherein the second glass ply comprises a second glass composition.

A sixty-first aspect of the present disclosure includes a glass laminate according to any of fifty-first through the sixtieth aspects, wherein the second glass composition is different from the borosilicate glass composition.

A sixty-second aspect of the present disclosure includes a glass laminate according to any of fifty-first through the sixty-first aspects, wherein the second glass composition is selected from the group consisting of a soda lime silicate glass composition, an aluminosilicate glass composition, an alkali aluminosilicate glass composition, an alkali containing borosilicate glass composition, an alkali aluminophosphosilicate glass composition, an alkali aluminoborosilicate glass composition, and combinations thereof.

A sixty-third aspect of the present disclosure includes a glass laminate according to any of fifty-first through the sixty-second aspects, wherein visible transmission through the glass laminate as measured according to ISO 13837A is at least 73%.

A sixty-fourth aspect of the present disclosure includes a glass laminate according to any of fifty-first through the sixty-second aspects, wherein total solar transmittance through the glass laminate as measured according to ISO 13837A is 90% or less.

A sixty-fifth aspect of the present disclosure includes a glass laminate according to any of fifty-first through the sixty-fourth aspects, wherein the first major surface, the fourth major surface, or both the first major surface and the fourth major surface exhibit an optical distortion of at most 200 millidiopters, as measured by an optical distortion detector using transmission optics according to ASTM 1561.

A sixty-sixth aspect of the present disclosure includes a glass laminate according to any of fifty-first through the sixty-fifth aspects, wherein the interlayer is selected from the group consisting of a polyvinyl butyral (PVB), an acoustic PVB (APVB), an ionomer, an ethylene-vinyl acetate (EVA), a thermoplastic polyurethane (TPU), a polyester (PE), a polyethylene terephthalate (PET), and combinations thereof.

A sixty-seventh aspect of the present disclosure includes a glass laminate according to any of fifty-first through the sixty-second aspects, wherein the interlayer comprises a thickness in a range from about 0.5 mm to about 2.5 mm.

A sixty-eighth aspect of the present disclosure includes a glass laminate according to any of fifty-first through the sixty-seventh aspects, wherein the interlayer comprises at least one functional layer or film.

A sixty-ninth aspect of the present disclosure includes a glass laminate according to any of fifty-first through the sixty-eighth aspects, wherein the functional layer or film provides a function selected from the group consisting of ultraviolet absorption, infrared absorption, infrared reflection, acoustic dampening, tint, an antenna, adhesion promotion, an anti-glare treatment, an anti-reflective treatment, and combinations thereof.

A seventieth aspect of the present disclosure includes a glass laminate according to any of fifty-first through the sixty-ninth aspects, wherein the first glass ply and the second glass ply are pair-shaped, wherein the first glass ply comprises a first curvature depth of at least 2 mm, wherein the second glass ply comprises a second curvature depth of at least 2 mm, and wherein the first curvature depth is within 10% of the second curvature depth.

A seventy-first aspect of the present disclosure includes a glass laminate according to any of fifty-first through the seventieth aspects, wherein the first glass ply is sagged and comprises a curvature depth of at least 2 mm and wherein the second glass ply is cold-formed into conformity with the first glass ply.

A seventy-second aspect of the present disclosure includes a system, comprising: a sensor; and a glass laminate, comprising: a first glass ply comprising a first major surface and a second major surface opposite to the first major surface, wherein the first glass ply comprises a borosilicate glass composition; a second glass ply comprising a third major surface and a fourth major surface opposite to the third major surface; and an interlayer bonding the second major surface of the first glass ply to the third major surface of the second glass ply; wherein the borosilicate glass composition comprises at least 74 mol % $SiO_2$, at least 10 mol % $B_2O_3$, and $Al_2O_3$ in an amount such that sum of $SiO_2$, $B_2O_3$, and $Al_2O_3$ is at least 90 mol %; wherein the sensor is configured to receive, transmit, or both receive and transmit signals through the glass laminate; wherein the signals comprise a peak wavelength in a range of 400 nm to 750 nm or a range of 1500 nm or greater.

A seventy-third aspect of the present disclosure includes a system according to the seventy second aspect, wherein the sensor is a LIDAR.

A seventy-fourth aspect of the present disclosure includes a system according to any of the seventy-second through the seventy-third aspects, wherein the glass laminate is a glazing for a vehicle.

A seventy-fifth aspect of the present disclosure includes a system according to any of the seventy-second through the seventy-fourth aspects, wherein visible transmission through the glass laminate as measured according to ISO 13837A is at least 73%.

A seventy-sixth aspect of the present disclosure includes a system according to any of the seventy-second through the seventy-fifth aspects, wherein total solar transmittance through the glass laminate as measured according to ISO 13837A is 90% or less.

A seventy-seventh aspect of the present disclosure includes a system according to any of the seventy-second through the seventy-sixth aspect, wherein the first major surface, the fourth major surface, or both the first major surface and the fourth major surface exhibit an optical distortion of at most 200 millidiopters, as measured by an optical distortion detector using transmission optics according to ASTM 1561.

A seventy-eighth aspect of the present disclosure includes a system according to any of the seventy-second through the seventy-seventh aspects, wherein the first glass ply is thicker than the second glass ply.

A seventy-ninth aspect of the present disclosure includes a system according to any of the seventy-second through the seventy-eighth aspects, wherein the second glass ply is strengthened.

An eightieth aspect of the present disclosure includes a system according to any of the seventy-second through the seventy-ninth aspects, wherein the second glass ply is chemically strengthened through an ion-exchange treatment.

An eighty-first aspect of the present disclosure includes a glass laminate, comprising: a first glass ply comprising a first major surface and a second major surface opposite to the first major surface, wherein the first glass ply comprises a fusion-formed borosilicate glass composition; a second glass ply comprising a third major surface and a fourth major surface opposite to the third major surface; and an interlayer bonding the second major surface of the first glass ply to the third major surface of the second glass ply; wherein transmission of ultraviolet light having a wavelength in a range of 300-380 nm through the glass laminate is 75% or less; wherein transmission of light in the visible spectrum through the glass laminate is 73% or more; and wherein total solar transmission through the glass laminate is 61% or less.

An eighty-second aspect of the present disclosure includes a glass laminate according to the eighty-first aspect, wherein the borosilicate glass composition comprises at least 74 mol % $SiO_2$, at least 10 mol % $B_2O_3$, and $Al_2O_3$ in an amount such that sum of $SiO_2$, $B_2O_3$, and $Al_2O_3$ is at least 90 mol %.

An eighty-third aspect of the present disclosure includes a glass laminate according to any of the eighty-first through the eighty-second aspects, wherein the first glass ply is thicker than the second glass ply.

An eighty-fourth aspect of the present disclosure includes a glass laminate according to any of the eighty-first through the eighty-third aspects, wherein the second glass ply is strengthened.

An eighty-fifth aspect of the present disclosure includes a glass laminate according to any of the eighty-first through the eighty-fourth aspects, wherein the second glass ply is chemically strengthened through an ion-exchange treatment.

An eighty-sixth aspect of the present disclosure includes a glass laminate according to any of the eighty-first through the eighty-fifth aspects, wherein the second glass ply comprises an ion-exchangeable frit applied to the third major surface, the fourth major surface, or both the third major surface and the fourth major surface.

An eighty-seventh aspect of the present disclosure includes a glass laminate according to any of the eighty-first through the eighty-sixth aspects, wherein the first glass ply has a first thickness between the first major surface and the second major surface of at least 2 mm and wherein the second glass ply has a second thickness between the third major surface and the fourth major surface of less than 2 mm.

An eighty-eighth aspect of the present disclosure includes a glass laminate according to any of the eighty-first through the eighty-seventh aspects, wherein the glass laminate comprises a total glass thickness equal to a sum of the first thickness and the second thickness and wherein a ratio of the first glass thickness to the total glass thickness is at least 0.7.

An eighty-ninth aspect of the present disclosure includes a glass laminate according to any of the eighty-first through the eighty-eighth aspects, wherein the first glass thickness is at least 3 mm and the second glass thickness is 1.1 mm or less.

A ninetieth aspect of the present disclosure includes a glass laminate according to any of the eighty-first through the eighty-ninth aspects, wherein the first glass thickness is at least 3.3. mm and the second glass thickness is 0.7 mm or less.

A ninety-first aspect of the present disclosure includes a glass laminate according to any of the eighty-first through the ninetieth aspects, wherein the second glass ply comprises a second glass composition.

A ninety-second aspect of the present disclosure includes a glass laminate according to any of the eighty-first through the ninety-first aspects, wherein the second glass composition is different from the borosilicate glass composition.

A ninety-third aspect of the present disclosure includes a glass laminate according to any of the eighty-first through the ninety-second aspects, wherein the second glass composition is selected from the group consisting of an aluminosilicate glass composition, an alkali aluminosilicate glass composition, an alkali containing borosilicate glass composition, an alkali aluminophosphosilicate glass composition, an alkali aluminoborosilicate glass composition, and combinations thereof.

A ninety-fourth aspect of the present disclosure includes a glass laminate according to any of the eighty-first through the ninety-third aspects, wherein the interlayer is selected from the group consisting of a polyvinyl butyral (PVB), an acoustic PVB (APVB), an ionomer, an ethylene-vinyl acetate (EVA), a thermoplastic polyurethane (TPU), a polyester (PE), a polyethylene terephthalate (PET), and combinations thereof.

A ninety-fifth aspect of the present disclosure includes a glass laminate according to any of the eighty-first through the ninety-third aspects, wherein the interlayer comprises a thickness in a range from about 0.5 mm to about 2.5 mm.

A ninety-sixth aspect of the present disclosure includes a glass laminate according to any of the eighty-first through the ninety-fifth aspects, wherein the interlayer comprises at least one functional layer or film.

A ninety-seventh aspect of the present disclosure includes a glass laminate according to any of the eighty-first through the ninety-sixth aspects, wherein the functional layer or film provides a function selected from the group consisting of ultraviolet absorption, infrared absorption, infrared reflection, acoustic dampening, tint, an antenna, adhesion promotion, an anti-glare treatment, an anti-reflective treatment, and combinations thereof.

A ninety-eighth aspect of the present disclosure includes a glass laminate according to any of the eighty-first through the ninety-seventh aspects, wherein the first glass ply and the second glass ply are pair-shaped, wherein the first glass ply comprises a first curvature depth of at least 2 mm, wherein the second glass ply comprises a second curvature depth of at least 2 mm, and wherein the first curvature depth is within 10% of the second curvature depth.

A ninety-ninth aspect of the present disclosure includes a glass laminate according to any of the eighty-first through the ninety-eighth aspects, wherein the first glass ply comprises a first temperature at which a viscosity of the first glass ply is $10^{11}$ Poise, the second glass ply comprises a second temperature at which a viscosity of the second glass ply is $10^{11}$ Poise, and the first temperature is different from the second temperature.

A hundredth aspect of the present disclosure includes a glass laminate according to any of the eighty-first through the ninety-ninth aspects, wherein the first glass ply is thicker than the second glass ply and wherein the second temperature is greater than the first temperature.

A hundred first aspect of the present disclosure includes a glass laminate according to any of the eighty-first through hundredth aspects, wherein the first glass ply is sagged and comprises a curvature depth of at least 2 mm and wherein the second glass ply is cold-formed into conformity with the first glass ply.

A hundred second aspect of the present disclosure includes a glass laminate according to any of the eighty-first through hundred first aspects, wherein the second glass ply comprises a pigment coating on the third major surface.

A hundred third aspect of the present disclosure includes a glass laminate according to any of the eighty-first through hundred second aspects, wherein the first glass ply or the second glass ply comprises a coating.

A hundred fourth aspect of the present disclosure includes a glass laminate according to any of the eighty-first through hundred third aspects, wherein the coating comprises an infrared-reflective coating having at least one layer of a metal and optionally at least layer of a dielectric.

A hundred fifth aspect of the present disclosure includes a glass composition, comprising: $SiO_2$ in an amount in a range from about 72 mol % to about 80 mol %; $Al_2O_3$ in an amount in a range from about 2.5 mol % to about 5 mol %; and $B_2O_3$ in an amount in a range from about 11.5 mol % to about 14.5 mol %; wherein the glass composition comprises a liquidus viscosity of greater than 500 kP; and wherein the glass composition comprises a temperature at which a viscosity of the borosilicate glass composition is 200 P of 1725° C. or less.

A hundred sixth aspect of the present disclosure includes the glass composition according to the hundred fifth aspect, further comprising $Na_2O$ in an amount in a range from about 4 mol % to about 8 mol %.

A hundred seventh aspect of the present disclosure includes the glass composition according to any of the hundred fifth through hundred sixth aspects, wherein the amount of $Na_2O$ is in the range from about 4.5 mol % to about 8 mol %.

A hundred eighth aspect of the present disclosure includes the glass composition according to any of the hundred fifth through hundred seventh aspects, further comprising $K_2O$ in an amount in a range from about 0.5 mol % to about 3 mol %.

A hundred ninth aspect of the present disclosure includes the glass composition according to any of the hundred fifth through hundred eighth aspects, further comprising MgO in an amount in a range from about 0.5 to about 2.5 mol %.

A hundred tenth aspect of the present disclosure includes the glass composition according to any of the hundred fifth through the hundred ninth aspects, further comprising up to about 4 mol % CaO.

A hundred-eleventh aspect of the present disclosure includes the glass composition according to any of the hundred fifth through the hundred tenth aspects, wherein the amount of $SiO_2$ is at least 74 mol %.

A hundred twelfth aspect of the present disclosure includes a glass composition comprising: 74 mol % to 80 mol % of $SiO_2$; 2.5 mol % to 5 mol % of $Al_2O_3$; 11.5 mol % to 14.5 mol % $B_2O_3$; 4.5 mol % to 8 mol % $Na_2O$; 0.5 mol % to 3 mol % $K_2O$; 0.5 mol % to 2.5 mol % MgO; and 0 mol % to 4 mol % CaO.

A hundred thirteenth aspect of the present disclosure includes a glass composition according to the hundred twelfth aspect, wherein a combined amount of Na$_2$O and K$_2$O is at least 5.5 mol %.

A hundred fourteenth aspect of the present disclosure includes a glass composition according to any of the hundred-twelfth through the hundred thirteenth aspects, wherein a combined amount of MaO and CaO is at least 1.5 mol %.

A hundred fifteenth aspect of the present disclosure includes a glass composition according to any of the hundred twelfth through the hundred-fourteenth aspects, wherein a combined amount of Na$_2$O, K$_2$O, MaO, and CaO is at least 7 mol %.

A hundred sixteenth aspect of the present disclosure includes a glass composition according to any of the hundred twelfth through the hundred fourteenth aspects, wherein a combined amount of Na$_2$O and K$_2$O is at least 8 mol %.

A hundred seventeenth aspect of the present disclosure includes a glass composition according to any of the hundred twelfth through the hundred sixteenth aspects, comprising a total amount of Fe$_2$O$_3$ and FeO of 0.03 mol % to 0.5 mol %.

A hundred eighteenth aspect of the present disclosure includes an article comprising: a first glass ply comprising a first major surface and a second major surface opposite to the first major surface, wherein the first glass ply comprises a borosilicate glass composition; a second glass ply comprising a third major surface and a fourth major surface opposite to the third major surface; and an interlayer bonding the second major surface of the first glass ply to the third major surface of the second glass ply; wherein: (A) the borosilicate glass composition of the first glass ply comprises: (i) SiO$_2$, B$_2$O$_3$, and, optionally, Al$_2$O$_3$ and/or P$_2$O$_5$; and (ii) one or more alkali metal oxides and, optionally, one or more alkaline earth metal oxides and/or ZnO; wherein the concentrations in mole percent on an oxide basis of SiO$_2$, B$_2$O$_3$, the one or more alkali metal oxides, and, when included in the composition, Al$_2$O$_3$, P$_2$O$_5$, and the one or more alkaline earth metal oxides and/or ZnO satisfy the relationships: SiO$_2$≥72; B$_2$O$_3$≥10; (R$_2$O+R'O+P$_2$O$_5$)≥Al$_2$O$_3$; and 0.80≤(1−[(2R$_2$O+2R'O+2P$_2$O$_5$)/(SiO$_2$+2Al$_2$O$_3$+2B$_2$O$_3$)])≤0.93; where R$_2$O is the sum of the concentrations of the one or more alkali metal oxides and, when included in the borosilicate glass composition, R'O is the sum of the concentrations of the one or more alkaline earth metal oxides and/or ZnO; (B) when glass having the borosilicate glass composition of the first glass ply is Vickers indent tested using a quasi-static 2 kg-force indentation load and a 136° Vickers indenter, the glass exhibits a plurality of radial cracks and a ring crack which limits spread of the radial cracks; and (C) when the article is installed in a vehicle, the first glass ply is outboard of the second glass ply.

A hundred nineteenth aspect of the present disclosure includes an article according to the hundred-eighteenth aspect, wherein the first glass ply is thicker than the second glass ply, and wherein the second glass ply is chemically strengthened through an ion-exchange treatment.

A hundred twentieth aspect of the present disclosure includes an article according to any of the hundred eighteenth through the hundred nineteenth aspects, wherein the first glass ply has a first thickness between the first major surface and the second major surface of at least 2 mm, and wherein the second glass ply has a second thickness between the third major surface and the fourth major surface of less than 2 mm.

A hundred twenty-first aspect of the present disclosure includes an article according to any of the hundred eighteenth through the hundred twentieth aspects, wherein ratio of the first thickness to the sum of the first and second thicknesses is at least 0.7.

A hundred twenty-second aspect of the present disclosure includes an article according to any of the hundred-eighteenth through the hundred twenty-first aspects, wherein the first thickness is at least 3.3 mm and the second thickness is 0.7 mm or less.

A hundred twenty-third aspect of the present disclosure includes an article according to any of the hundred eighteenth through the hundred twenty-second aspects, wherein the second glass ply comprises a second glass composition that is different from the borosilicate glass composition of the first glass ply, and wherein the second glass composition is selected from the group consisting of a soda lime silicate glass composition, an aluminosilicate glass composition, an alkali aluminosilicate glass composition, an alkali containing borosilicate glass composition, an alkali aluminophosphosilicate glass composition, and an alkali aluminoborosilicate glass composition.

A hundred twenty-fourth aspect of the present disclosure includes an article according to any of the hundred eighteenth through the hundred twenty-third aspects, wherein visible transmission through the article as measured according to ISO 13837A is at least 73%, and wherein total solar transmittance through the article as measured according to ISO 13837A is 90% or less.

A hundred twenty-fifth aspect of the present disclosure includes an article according to any of the hundred eighteenth through the hundred twenty fourth aspects, wherein the first major surface, the fourth major surface, or both the first major surface and the fourth major surface exhibit an optical distortion of at most 200 millidiopters, as measured by an optical distortion detector using transmission optics according to ASTM 1561.

A hundred twenty-sixth aspect of the present disclosure includes an article according to any of the hundred eighteenth through the hundred twenty-fifth aspects, wherein the interlayer is selected from the group consisting of a polyvinyl butyral (PVB), an acoustic PVB (APVB), an ionomer, an ethylene-vinyl acetate (EVA), a thermoplastic polyurethane (TPU), a polyester (PE), a polyethylene terephthalate (PET), and combinations thereof wherein the interlayer has a thickness in a range from 0.5 mm to 2.5 mm; wherein the interlayer comprises at least one functional layer or film, and wherein the functional layer or film provides a function selected from the group consisting of ultraviolet absorption, infrared absorption, infrared reflection, acoustic dampening, tint, an antenna, adhesion promotion, an anti-glare treatment, an anti-reflective treatment, and combinations thereof.

A hundred twenty-seventh aspect of the present disclosure includes an article according to any of the hundred eighteenth through the hundred twenty-sixth aspects, wherein the first glass ply and the second glass ply are pair-shaped, wherein the first glass ply comprises a first curvature depth of at least 2 mm, wherein the second glass ply comprises a second curvature depth of at least 2 mm, and wherein the first curvature depth is within 10% of the second curvature depth.

A hundred twenty-eighth aspect of the present disclosure includes an article according to any of the hundred eighteenth through the hundred twenty-seventh aspects, wherein the first glass ply is sagged and comprises a curvature depth of at least 2 mm and wherein the second glass ply is cold-formed into conformity with the first glass ply.

A hundred twenty-ninth aspect of the present disclosure includes an article according to any of the hundred eighteenth through the hundred twenty-eighth aspects, wherein the first glass ply is made by a downdraw process, wherein the downdraw process is a fusion downdraw process, wherein glass having the borosilicate glass composition of the first glass ply has a liquidus viscosity which is greater than or equal to 500 kilopoise, and wherein glass having the borosilicate glass composition of the first glass ply has a 200-poise temperature less than or equal to 1725° C.

A hundred thirtieth aspect of the present disclosure includes an article comprising: an outer ply comprising a borosilicate glass and having thickness of at least 200 μm and no more than 1 cm, wherein in terms of constituent oxides, composition of the borosilicate glass comprises: $SiO_2$, $B_2O_3$, $Al_2O_3$, one or more alkali metal oxides, and one or more divalent cation oxides of the group consisting of MgO, CaO, SrO, BaO, and ZnO, wherein concentrations in mole percent on an oxide basis of $SiO_2$, $B_2O_3$, the one or more alkali metal oxides, $Al_2O_3$, and the one or more alkaline earth metal oxides, satisfy the relationships: $(R_2O+R'O) \geq Al_2O_3$, $0.80 < (1-[(2R_2O+2R'O)/(SiO_2+2Al_2O_3+2B_2O_3)]) < 0.93$, where $R_2O$ is the sum of the concentrations of the one or more alkali metal oxides and R'O is the sum of the concentrations of the one or more alkaline earth metal oxides; an inner ply comprising a second glass that is different from the composition of the borosilicate glass of the outer ply, wherein the inner ply reinforces the outer ply, stiffening the outer ply to bending forces applied thereto, and wherein composition of the second glass is selected from the group consisting of a soda lime silicate glass composition, an aluminosilicate glass composition, an alkali aluminosilicate glass composition, an alkali containing borosilicate glass composition, an alkali aluminophosphosilicate glass composition, and an alkali aluminoborosilicate glass composition; an interlayer coupling the inner and outer plies, wherein the interlayer is polymeric and dampens transmission of cracks from the outer ply to the inner ply.

A hundred thirty-first aspect of the present disclosure includes an article according to the hundred thirtieth aspect, wherein when glass having the composition of the borosilicate glass of the outer ply is formed as 100 polished, flat samples of 1 mm thickness with a major surface of 2×2 cm² area, and tested using square-based, 136° four-sided, pyramidal Vickers indenter directed orthogonally into a center of the major surface at 25° C. in 50% relative humidity and the indenter is quasi-statically displaced at rate of 60 μm per second to maximum 3 kg-force with indentation load held for 10 seconds, more often than not all cracks extending through the samples radially and/or laterally from the indenter are contained within a crack loop.

A hundred thirty-second aspect of the present disclosure includes an article according to any of the hundred thirtieth through the hundred thirty-first aspects, wherein when rapidly cooled from 25° C. to 1° C. by placement of the samples into cold water, more often than not cracks extending through the samples radially and/or laterally do not propagate beyond the crack loop.

A hundred thirty-third aspect of the present disclosure includes an article according to any of the hundred thirtieth through the hundred thirty-second aspects, wherein most of the crack loops of the samples are circular and have radii less than 1 mm.

A hundred thirty-fourth aspect of the present disclosure includes an article comprising a first glass ply comprising a first major surface and a second major surface opposite to the first major surface, wherein the first glass ply comprises a borosilicate glass and wherein in terms of constituent oxides, composition of the borosilicate glass comprises: $SiO_2$, $B_2O_3$, $Al_2O_3$, one or more alkali metal oxides, and one or more divalent cation oxides of the group consisting of MgO, CaO, SrO, BaO, and ZnO, wherein concentrations in mole percent on an oxide basis of $SiO_2$, $B_2O_3$, the one or more alkali metal oxides, $Al_2O_3$, and the one or more divalent cation oxides, satisfy the relationships: $(R_2O+R'O) \geq Al_2O_3$, $0.80 < (1-[(2R_2O+2R'O)/(SiO_2+2Al_2O_3+2B_2O_3)]) < 0.93$, where $R_2O$ is the sum of the concentrations of the one or more alkali metal oxides and R'O is the sum of the concentrations of the one or more divalent cation oxides; a second glass ply comprising a third major surface and a fourth major surface opposite to the third major surface; and an interlayer bonding the second major surface of the first glass ply to the third major surface of the second glass ply; wherein transmission of ultraviolet light having a wavelength in a range of 300-380 nm through the article is 75% or less; wherein transmission of light in the visible spectrum through the article is 73% or more; and wherein total solar transmission through the article is 61% or less.

A hundred thirty-fifth aspect of the present disclosure includes an article according to the hundred thirty fourth aspect, wherein the borosilicate glass composition comprises at least 74 mol % $SiO_2$, at least 10 mol % $B_2O_3$, and $Al_2O_3$ in an amount such that sum of $SiO_2$, $B_2O_3$, and $Al_2O_3$ is at least 90 mol %.

A hundred thirty-sixth aspect of the present disclosure includes an article comprising: borosilicate glass, wherein in terms of constituent oxides, composition of the borosilicate glass comprises: $SiO_2$, $B_2O_3$, $Al_2O_3$, one or more alkali metal oxides, and one or more divalent cation oxides of the group consisting of MgO, CaO, SrO, BaO, and ZnO, wherein concentrations in mole percent on an oxide basis of $SiO_2$, $B_2O_3$, the one or more alkali metal oxides, $Al_2O_3$, and the one or more divalent cation oxides, satisfy the relationships: $(R_2O+R'O) \geq Al_2O_3$, $0.80 < (1-[(2R_2O+2R'O)/(SiO_2+2Al_2O_3+2B_2O_3)]) < 0.93$, where $R_2O$ is the sum of the concentrations of the one or more alkali metal oxides and R'O is the sum of the concentrations of the one or more divalent cation oxides; a crack loop formed in the borosilicate glass, wherein the article is free of radial or lateral cracks intersecting the crack loop and extending outward beyond the crack loop.

A hundred thirty-seventh aspect of the present disclosure includes an article according to the hundred thirty-sixth aspect, wherein the crack loop has a circular perimeter.

A hundred thirty-eighth aspect of the present disclosure includes an article according to any of the hundred thirty-sixth through the hundred thirty-seventh aspects, wherein the circular perimeter has a diameter of less than 1 mm.

A hundred thirty-ninth aspect of the present disclosure includes an article according to any of the hundred thirty-sixth through the hundred thirty-eighth aspects, wherein the borosilicate glass has thickness of at least 200 μm and no more than 1 cm.

A hundred fortieth aspect of the present disclosure includes an article according to any of the hundred thirty-sixth through the hundred thirty-ninth aspects, wherein the borosilicate glass has a low-temperature coefficient of thermal expansion greater than 3.25 ppm/° C. and less than 8.7 ppm/° C.

A hundred forty-first aspect of the present disclosure includes an article according to any of the thirtieth through the hundred twenty-ninth aspects, wherein the thickness is greater than or equal to 2.0 mm.

A hundred forty-second aspect of the present disclosure includes an article according to any of the thirtieth through the hundred twenty-ninth aspects, wherein the composition of the borosilicate glass comprises greater than or equal to 4 mol % and less than or equal to 6 mol % $Na_2O$.

A hundred forty-third aspect of the present disclosure includes an article according to any of the thirtieth through the hundred twenty-ninth aspects, wherein the composition of the borosilicate glass comprises: greater than or equal to 3 mol % and less than or equal to 5 mol % $Al_2O_3$; and greater than or equal to 12 mol % and less than or equal to 16 mol % $B_2O_3$.

A hundred forty-fourth aspect of the present disclosure includes an article according to any of the thirtieth through the hundred twenty-ninth aspects, wherein at least one of: the composition of the borosilicate glass comprises greater than or equal to 0.03 mol % and less than or equal to 0.5 mol % $Fe_2O_3$, and the thickness is less than or equal to 3.3 mm and the outer ply has a transmittance that is greater than or equal to 90% and less than or equal to 92.5% throughout the visible spectrum.

A hundred forty-fifth aspect of the present disclosure includes an article according to any of the thirtieth through the hundred twenty ninth aspects, wherein the outer glass ply consists of the borosilicate glass.

A hundred forty-sixth aspect of the present disclosure includes a borosilicate glass composition comprising: greater than or equal to 60 mol % and less than or equal to 96.0 mol % $SiO_2$; greater than or equal to 1.0 mol % and less than or equal to 25.0 mol % $B_2O_3$, greater than or equal to 0.3 mol % $Al_2O_3$; greater than or equal to 0.0 mol % and less than or equal to 0.3 mol % $Li_2O$; a non-zero amount of $Na_2O$; and one or more divalent metal oxides RO, wherein: the compositional amounts of each component in mol %, represented by the molecular formula of each component, satisfy the relation $B_2O_3+3.5*Al_2O_3 \leq 27.5$ mol %, and at least one of: (A) the compositional amounts of each component satisfy both of the following conditions: (i) $C_{rb}-(3.4-0.5*C_{nb})<0.000$; and (ii) $1-2*(Alk_2O+RO)/P_{total}>0.83$, wherein: (a) $C_{rb}$ is a value of a rotatability balance parameter, calculated from the composition in terms of mol % of the components according to the following formula: $C_{rb}=abs(2*max(0,(Alk_2O+RO)-(Al_2O_3+B_2O_3))+2*min(B_2O_3,R_2O+RO-Al_2O_3)+0.65*(SiO_2+2*Al_2O_3+2*B_2O_3)-80)$, (b) $C_{nb}$ is a value of a network balance parameter, calculated from the composition in terms of mol % of the components according to the following formula: $C_{nb}=abs(SiO_{2-6*}min(Alk_2O,Al_2O_3)-2*min(Alk_2O+RO-Al_2O_3,B_2O_3)-max(24+2*max(0,B_2O_3-max(0,R_2O+RO-Al_2O_3)),44))$, (c) $Alk_2O$ represents one or more alkali metal oxides, if present in the composition, (d) $P_{total}$ is a value of a total polyhedra parameter, calculated from the glass composition in terms of mol % of the components according to the following formula: $P_{total}=SiO_2+2*Al_2O_3+2*B_2O_3$, and (B) the compositional amounts of each component satisfy the following condition: $P_d-(2.58-0.2*(Na_2O/Al_2O_3))<0.000$, wherein $P_d$ is a value of a density parameter, calculated from the glass composition in terms of mol % of the components according to the following formula:

$P_d=2.487-0.0068998*B_2O_3+0.041371*BaO+0.13897*Bi_2O_3+0.011637*CaO+0.055366*Cs_2O+0.025420*Fe_2O_3+0.10294*Gd_2O_3+0.0051134*K_2O+0.079903*La_2O_3+0.0041594*Li_2O+0.0084582*MgO+0.019720*MnO+0.0064419*Na_2O+0.018282*NiO+0.065781*PbO-0.002953*SiO_2+0.027682*SrO+0.0055367*TiO_2+0.0068497*V_2O_5+0.048699*Y_2O_3+0.021527*ZnO+0.026527*ZrO_2+0.011033*(min(B_2O_3,max(0,Alk_2O+RO-Al_2O_3)))$.

A hundred forty-seventh aspect of the present disclosure includes a borosilicate glass composition according to the hundred forty-sixth aspect, wherein: the compositional amounts of each component satisfy both of the following conditions: (i) $C_{rb}-(3.4-0.5*C_{nb})<0.000$; and (ii) $1-2*(Alk_2O+RO)/P_{total}>0.83$, the composition comprises a combined amount of $Na_2O$ and $Al_2O_3$ that is less than or equal to 9.7 mol %, the composition is substantially free of BaO, fluorine, and rare earth oxides.

A hundred forty-eighth aspect of the present disclosure includes a borosilicate glass composition according to any of the hundred forty-sixth to the hundred forty-seventh aspects, wherein: the composition comprises: greater than or equal to 60.0 mol % and less than or equal to 78 mol % $SiO_2$, greater than or equal to 5.0 mol % and less than or equal to 17.0 mol % $B_2O_3$, greater than or equal to 2.5 mol % and less than or equal to 5.3 mol % $Na_2O$, greater than or equal to 0.3 mol % and less than or equal to 5.3 mol % $Al_2O_3$, greater than or equal to 0.0 mol % and less than or equal to 3.0 mol % $K_2O$, greater than or equal to 0.0 mol % and less than or equal to 1.5 mol % CaO, greater than or equal to 0.0 mol % and less than or equal to 0.2 mol % $Li_2O$, greater than or equal to 5.0 mol % $Na_2O+K_2O$, and the compositional amounts of each components satisfy the condition: $20.3 \leq B_2O_3+3.5*Al_2O_3 \leq 27.5$.

A hundred-forty ninth aspect of the present disclosure includes a borosilicate glass composition according to any of the hundred forty-sixth to the hundred forty-eighth aspects, wherein the composition comprises: greater than or equal to 0.0 mol % and less than or equal to 5.0 mol % MgO; greater than or equal to 0.0 mol % and less than or equal to 4.0 mol % $P_2O_5$, greater than or equal to 0 mol % and less than or equal to 0.25 mol % $SnO_2$, a combined amount of $(Na_2O+K_2O+MgO+CaO+ZnO+Al_2O_3+B_2O_3+SiO_2)$ that is greater than or equal to 95.0 mol %, a combined amount of (CaO+MgO) that is greater than or equal to 0.0 mol % and less than or equal to 5.0 mol %, and a combined amount of $(FeO+Fe_2O_3)$ that is greater than or equal to 0.0 mol % and less than or equal to 0.5 mol %, and wherein the compositional amounts of each component of the composition satisfy both the conditions: (C) $(Na_2O+K_2O+MgO+CaO+SrO+BaO+ZnO)/(R_2O+RO) \leq 0.95$, and (D) $1.01 \leq Na_2O/Al_2O_3 \leq 1.35$.

A hundred fiftieth aspect of the present disclosure includes a borosilicate glass composition according to any of the hundred forty-sixth to the hundred forty-ninth aspects, wherein the composition comprises: greater than or equal to 72.0 mol % and less than or equal to 78.0 mol % $SiO_2$, greater than or equal to 5.0 mol % and less than or equal to 20.0 mol % $B_2O_3$, greater than or equal to 2.0 mol % and less than or equal to 8.0 mol % $Na_2O$, greater than or equal to 2.0 mol % and less than or equal to 4.0 mol % $Al_2O_3$, greater than or equal to 0.0 mol % and less than or equal to 3.0 mol % $K_2O$, greater than or equal to 0.0 mol % and less than or equal to 2.0 mol % CaO, greater than or equal to 0.0 mol % and less than or equal to 2.0 mol % MgO, and greater than or equal to 0.0 mol % and less than or equal to 0.2 mol % $SnO_2$.

A hundred fifty-first aspect of the present disclosure includes a borosilicate glass composition according to any of the hundred forty-sixth to the hundred fiftieth aspects, wherein the composition comprises: greater than or equal to 0.0 mol % and less than or equal to 0.5 mol % $MnO_2$, greater than or equal to 0.0 mol % and less than or equal to 0.5 mol % MnO, greater than or equal to 0.0 mol % and less than or equal to 0.5 mol % $TiO_2$, and a combined amount of (Fe+Cr+Mo+V+Cu+Co) that is greater than or equal to 0.0 mol % and less than or equal to 1.0 mol %, wherein the composition is: substantially free of $Li_2O$, and substantially free of PbO.

A hundred fifty-second aspect of the present disclosure includes a borosilicate glass composition according to any of the hundred forty-sixth to the hundred fifty first aspects, wherein the compositional amounts of each component of the composition satisfy the conditions: (E) $0.0 \le 2*M_{exc} + 2*min(B_2O_3, R_2O+RO-Al_2O_3)+0.65*P_{total}-80 \le 3.0$, wherein: $M_{exc}$ is a value of modifiers excess parameter, calculated from the glass composition in terms of mol % of the components according to the following formula: $M_{exc}=max(0,(Alk_2O+RO)-(Al_2O_3+B_2O_3))$, and (F) $0.0 \le abs(Si_{exc}-3*((B_2O_3+Al_2O_3)-(Alk_2O+RO))-max(24-B_{exc},44-3*B_{exc})) \le 3.0$, wherein: (i) $Si_{exc}$ is a value of a silica _exc excess parameter, calculated from the glass composition in terms of mol % of the components according to the following formula: $Si_{exc}=SiO_2-6*min(Alk_2O,Al_2O3O_3)-2*min(Alk_2O+RO—Al_2O3O_3,B_2O_3)$, and (ii) $B_{exc}$ is a value of a boron excess parameter, calculated from the glass composition in terms of mol % of the components according to the following formula: $B_{exc}=max(0,B_2O_3-max(0,R_2O+RO-Al_2O_3))$.

A hundred fifty-third aspect of the present disclosure includes a borosilicate glass composition according to any of the hundred forty sixth to the hundred fifty second aspects, wherein the compositional amounts of each component satisfy the condition: $P_d-(2.58-0.2*(Na_2O/Al_2O3O_3))<0.000$.

A hundred fifty-fourth aspect of the present disclosure includes a borosilicate glass composition according to any of the hundred forty-sixth to the hundred fifty-third aspects, wherein the composition comprises: greater than or equal to 60.0 mol % and less than or equal to 77.5 mol % $SiO_2$, greater than or equal to 5.0 mol % and less than or equal to 17.0 mol % $B_2O_3$, greater than or equal to 2.5 mol % and less than or equal to 5.3 mol % $Na_2O$, greater than or equal to 0.3 mol % and less than or equal to 5.3 mol % $Al_2O_3$, greater than or equal to 0.0 mol % and less than or equal to 3.0 mol % 1(20, greater than or equal to 0.0 mol % and less than or equal to 0.2 mol % $Li_2O$, greater than or equal to 0.0 mol % and less than or equal to 0.2 mol % BaO, and a combined amount of ($Na_2O+K_2O$) that is greater than or equal to 5.0 mol %.

A hundred fifty-fifth aspect of the present disclosure includes a borosilicate glass composition according to any of the hundred forty-sixth to the hundred fifty-fourth aspects, wherein the composition comprises: greater than or equal to 5.0 mol % and less than or equal to 5.2 mol % $Na_2O$, greater than or equal to 0.3 mol % MgO, and greater than or equal to 0.0 mol % and less than or equal to 0.3 mol % $TiO_2$, wherein the composition is substantially free of fluorine.

A hundred fifty-sixth aspect of the present disclosure includes a borosilicate glass composition according to any of the hundred forty-sixth to the hundred fifty-fifth aspects, wherein the compositional amounts of each component satisfy the condition: $1-2*(Alk_2O+RO)/P_{total}>0.83$.

A hundred fifty-seventh aspect of the present disclosure includes a borosilicate glass composition according to any of the hundred forty-sixth to the hundred fifty-sixth aspects, wherein the compositional amounts of each component satisfy the conditions: (G) $77 \le (2*M_{exc}+2*min(B_2O_3,R_2O+RO-Al_2O_3))+0.65*P_{total} \le 82$, wherein: $M_{exc}$ is a value of modifiers excess parameter, calculated from the glass composition in terms of mol % of the components according to the following formula: $M_{exc}=max(0,(Alk_2O+RO)-(Al_2O_3+B_2O_3))$, and (H) $0.84 \le 1-2*(Alk_2O+RO)/P_{total} \le 0.90$.

A hundred fifty-eighth aspect of the present disclosure includes a borosilicate glass composition according to any of the hundred forty sixth to the hundred fifty seventh aspects, wherein the composition comprises: greater than or equal to 0.0 mol % and less than or equal to 4.0 mol % $P_2O_5$, greater than or equal to 0 mol % and less than or equal to 0.25 mol % $SnO_2$, a combined amount of ($Na_2O+K_2O+MgO+CaO+ZnO+Al_2O_3+B_2O_3+SiO_2$) that is greater than or equal to 95.0 mol %, a combined amount of (CaO+MgO) that is greater than or equal to 0.0 mol % and less than or equal to 5.0 mol %, and a combined amount of ($FeO+Fe_2O_3$) that is greater than or equal to 0.0 mol % and less than or equal to 0.5 mol %, and wherein the compositional amounts of each component of the composition satisfy both the conditions: (I) $(Na_2O+K_2O+MgO+CaO+SrO+BaO+ZnO)/(R_2O+RO) \le 0.95$, and (J) $1.01 \le Na_2O/Al_2O_3 \le 1.35$.

A hundred fifty-ninth aspect of the present disclosure includes a borosilicate glass composition according to any of the hundred forty-sixth to the hundred fifty-eighth aspects, wherein the composition comprises: greater than or equal to 72.0 mol % and less than or equal to 77.5 mol % $SiO_2$, greater than or equal to 2.0 mol % and less than or equal to 4.0 mol % $Al_2O_3$, greater than or equal to 0.0 mol % and less than or equal to 2.0 mol % CaO, greater than or equal to 0.0 mol % and less than or equal to 2.0 mol % MgO, and greater than or equal to 0.0 mol % and less than or equal to 0.2 mol % $SnO_2$.

A hundred sixtieth aspect of the present disclosure includes a borosilicate glass composition according to any of the hundred forty-sixth to the hundred fifty-ninth aspects, wherein the composition comprises: greater than or equal to 0.0 mol % and less than or equal to 0.5 mol % $MnO_2$, greater than or equal to 0.0 mol % and less than or equal to 0.5 mol % MnO, greater than or equal to 0.0 mol % and less than or equal to 0.5 mol % $TiO_2$, a combined amount (Fe+Cr+Mo+V+Cu+Co) that is greater than or equal to 0.0 mol % and less than or equal to 1.0 mol %, and a combined amount ($La_2O_3+Y_2O_3$) that is greater than or equal to 0.0 mol % and less than or equal to 1.0 mol %.

A hundred sixty-first aspect of the present disclosure includes a borosilicate glass composition according to any of the hundred forty-sixth to the hundred sixtieth aspects, wherein the composition is substantially free of fluorine, BaO, $LiO_2$, and PbO.

A hundred sixty-second aspect of the present disclosure includes a borosilicate glass composition according to any of the hundred forty-sixth to the hundred sixty-first aspects, wherein the amounts of each component of the compositions satisfy the conditions: (K) $0.0 \le 2*M_{exc}+2*min(B_2O_3,R_2O+RO-Al_2O_3)+0.65*P_{total}-80 \le 3.0$, wherein: $M_{exc}$ is a value of modifiers excess parameter, calculated from the glass composition in terms of mol % of the components according to the following formula: $M_{exc}=max(0,(Alk_2O+RO)-(Al_2O_3+B_2O_3))$, and (L) $0.0 \le abs(Si_{exc}-3*((B_2O_3+Al_2O_3)-(Alk_2O+RO))-max(24-B_{exc},44-3*B_{exc})) \le 3.0$, wherein: (i) $Si_{exc}$ is a value of a silica excess parameter, calculated from the glass composition in terms of mol % of the components according to the following formula: $Si_{exc}=SiO_2-6*min(Alk_2O,Al_2O3O_3)-2*min(Alk_2O+RO-Al_2O3O_3,B_2O_3)$, and (ii) $B_{exc}$ is a value of a boron excess parameter, calculated from the glass composition in terms of mol % of the components according to the following formula: $B_{exc}=max(0,B_2O_3-max(0,R_2O+RO-Al_2O_3))$.

A hundred sixty-third aspect of the present disclosure includes a borosilicate glass composition according to any of the hundred forty-sixth to the hundred sixty-second aspects, wherein the composition comprises: greater than or equal to 11 mol % and less than or equal to 16 mol % $B_2O_3$, greater than or equal to 2 mol % and less than or equal to 6 mol % $Al_2O_3$, and a total amount of $Na_2O$, $K_2O$, MgO, and CaO that is greater than or equal to 7.0 mol %.

A hundred sixty-fourth aspect of the present disclosure includes a borosilicate glass composition according to any of the hundred forty-sixth to the hundred sixty-third aspects, wherein the composition comprises greater than or equal to 4 mol % and less than or equal to 6 mol % $Na_2O$.

A hundred sixty-fifth aspect of the present disclosure includes a borosilicate glass composition according to any of the hundred forty-sixth to the hundred sixty-fourth aspects, wherein the composition of the borosilicate glass comprises: greater than or equal to 3 mol % and less than or equal to 5 mol % $Al_2O_3$; and greater than or equal to 12 mol % and less than or equal to 16 mol % $B_2O_3$.

A hundred sixty-sixth aspect of the present disclosure includes a glass article comprising a borosilicate glass composition according to any of the hundred forty-sixth to hundred sixty fifth aspects.

A hundred sixty-seventh aspect of the present disclosure includes a glass article according to the hundred sixty-sixth aspect, wherein the glass article comprises a density measured at 20° C. that is less than 2.5 $g/cm^3$.

A hundred sixty-eighth aspect of the present disclosure includes a glass article according to the hundred sixty-seventh aspect, wherein the density measured at 20° C. is less than 2.3 $g/cm^3$.

A hundred sixty-ninth aspect of the present disclosure includes a glass article according to any of the hundred sixty-seventh to the hundred sixty-eighth aspects, wherein when glass having the borosilicate composition is formed as 100 polished, flat samples of 1 mm thickness with a major surface of 2×2 $cm^2$ area, and tested using square-based, 136° four-sided, pyramidal Vickers indenter directed orthogonally into a center of the major surface at 25° C. in 50% relative humidity and the indenter is quasi-statically displaced at rate of 60 μm per second to maximum 3 kg-force with indentation load held for 10 seconds, more often than not all cracks extending through the samples radially and/or laterally from the indenter are contained within a crack loop.

A hundred seventieth aspect includes a glass article according to the hundred sixty-ninth aspect, wherein most of the crack loops of the samples are circular and have radii less than 1 mm.

A hundred seventy-first aspect includes a glass laminate comprising: a first glass ply comprising a first glass composition, a first major surface, a second major surface opposite the first major surface, and a first thickness between the first major surface and a second major surface; a second glass ply comprising a second glass composition different from the first glass composition, a third major surface, a fourth major surface opposite the third major surface, and a second thickness between the third major surface and the fourth major surface; and a polymer interlayer disposed between the first glass ply and the second glass ply and attaching the second major surface to the third major surface, wherein: the second glass composition is a borosilicate glass composition, the second glass ply has a coefficient of thermal expansion of less than or equal to 5.1 ppm° C., a combined thickness of the first glass ply and the second glass ply is greater than or equal to 3.7 mm and less than or equal to 6.0 mm, a ratio of the second thickness to the combined thickness is greater than or equal to 0.825, and the outer ply does not fail when the first major surface is impacted by a Vickers diamond indenter having weight of 8.5 g with a pyramid tip having an angle of 136° between the faces at an impact energy of 0.25 Joules.

A hundred seventy-second aspect includes a glass laminate according to the hundred seventy-first aspect, wherein, when the first major surface is scratched with a Knoop indenter under a 3 N load, the Knoop Scratch Lateral Cracking Threshold is not met when the glass laminate is placed in an environment comprising a temperature of 85° C. and a relative humidity of 85% for a period of 14 days.

A hundred seventy-third aspect includes a glass laminate according to any of the hundred seventy-first through the hundred seventy-second aspects, wherein, when the glass laminate is placed in the environment comprising the temperature of 85° C. and the relative humidity of 85% for a period of 9 days, the glass laminate exhibits a haze of less than or equal to 5%.

A hundred seventy-fourth aspect includes a glass laminate according to any of the hundred seventy first through the hundred seventy third aspects, wherein, when the outer ply is subjected to 100 cycles of contact between a wiper blade with a 250 g load, with A4 course test grit according to ISO 12103-1 being present, the laminate exhibits a haze of less than or equal to 1.0% throughout a wavelength range of 400 nm to 700 nm.

A hundred seventy-fifth aspect includes a glass laminate according to any of the hundred seventy-first through the hundred seventy-fourth aspects, wherein, when the outer ply is indented using a Vickers indenter at 3 kgf, a ring crack is observed in the outer ply.

A hundred seventy-sixth aspect includes a glass laminate according to the hundred seventy-fifth aspect, wherein, when the glass laminate, with the ring crack in the outer ply, is subjected to a sub-critical load when tested in accordance with ASTM C-1499-03, the second ply does not break after a period of time, the period of time being greater than a second period of time in which a second laminate comprising the first glass ply, the interlayer, and a second outer ply comprising the thickness, but constructed of a second borosilicate glass composition comprising 83.60 mol % $SiO_2$, 1.20 mol % $Al_2O_3$, 11.60 mol % $B_2O_3$, 3.00 mol % $Na_2O$, and 0.70 mol % $K_2O$, does break when the second outer ply is indented using a Vickers indenter at 3 kgf prior to the testing in accordance with ASTM C-1499-03 using the sub-critical load.

A hundred seventy-seventh aspect includes a glass laminate according to the hundred seventy-sixth aspect, wherein the period of time is greater than 10 minutes.

A hundred seventy-eighth aspect includes a glass laminate according to any of the hundred seventy-first through the hundred seventy-seventh aspects, wherein: the interlayer comprises polyvinyl butyral that is not modified to block ultraviolet light, and when the laminate is exposed to UV light having a flux of 600 $W/m^2$ for a period of 240 hours through the second glass ply, the laminate exhibits a ΔE value according to the 1976 formula calculated using the CIELAB color coordinate system of less than 0.25.

A hundred seventy-ninth aspect includes a glass laminate according to the hundred seventy-eighth aspect, wherein, when the laminate is exposed to the UV light having a flux of 600 $W/m^2$ for a period of 480 hours through the second glass ply, the laminate exhibits a ΔE value according to the 1976 formula calculated using the CIELAB color coordinate system of less than 0.5.

A hundred eightieth aspect of the present disclosure includes a glass laminate according to any of the hundred seventy-first through the hundred seventy-ninth aspects, wherein: the outer ply comprises a thickness of greater than 3.5 mm, and when the first major surface is impacted with a 120° conical tip, the outer glass ply comprises a less than 10% probability of breaking at an impact energy of 0.28 Joules.

A hundred eighty-first aspect includes a glass laminate according to any of the hundred seventy-first through the hundred eightieth aspects, wherein: the outer ply comprises a thickness of greater than 3.5 mm, and when the first major surface is impacted with the Vickers diamond intenter from a height of 3000 mm, the outer ply does not exhibit failure.

A hundred eighty-second aspect includes a glass laminate according to any of the hundred seventy-first through the hundred eighty-first aspects, wherein vertical optical distortion measurements of the outer glass ply using transmission optics and Moire interferometry exhibit a plurality of continuous regions of positive or negative vertical optical distortion, wherein the plurality of continuous regions extend vertically in the outer glass ply in a direction perpendicular to a length of the laminate, wherein the draw lines extending vertically for a distance at least 100 mm.

A hundred eighty-third aspect includes a glass laminate according the hundred eighty-second aspect, wherein the plurality of continuous regions comprise an average width in a direction parallel to the length of the laminate that is greater than or equal to 80 mm and less than or equal to 100 mm.

A hundred eighty-fourth aspect includes a glass laminate according to any of the hundred seventy-first through the hundred eighty-third aspects, wherein the second thickness is greater than or equal to 3.3 mm.

A hundred eighty-fifth aspect includes a glass laminate according to any of the hundred seventy-first through the hundred eighty-fourth aspects, wherein the second glass ply comprises an average transmittance from 1000 nm to 2500 nm of less than or equal to 80%.

A hundred eighty-sixth aspect includes a glass laminate according to any of the hundred seventy-first through the hundred eighty-fifth aspects, wherein the second glass ply comprises an average transmittance from 1000 nm to 2500 nm of less than or equal to 70%.

A hundred eighty-seventh aspect includes a glass laminate according to any of the hundred seventy-first through the hundred eighty-sixth aspects, wherein the second glass ply comprises an average transmittance from 1000 nm to 2500 nm of less than or equal to 76%.

A hundred eighty-eighth aspect includes a glass laminate according to any of the hundred seventy-first through the hundred eighty-seventh aspects, wherein the borosilicate glass composition comprises greater than or equal to 0.5 mol % Fe.

Construction and arrangements of the compositions, assemblies, and structures, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Materials, such as the glazing disclosed herein, may be used for glazing in architectural applications (e.g., windows, partitions) or may be otherwise used, such as in packaging (e.g., containers).

The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A borosilicate glass composition comprising:
   $B_2O_3$ in an amount greater than or equal to 11 mol % and less than or equal to 16 mol %;
   $Fe_2O_3$ in an amount greater than or equal to 0.03 mol % and less than or equal to 0.5 mol %;
   $Al_2O_3$ in an amount greater than or equal to 2 mol % and less than or equal to 5 mol %;
   one or more alkali metal oxides;
   one or more alkaline earth metal oxides;
   a total amount of $Na_2O$, $K_2O$, MgO, and CaO that is greater than or equal to 7.0 mol %; and
   an annealing point that is greater than or equal to 520° and less than or equal to 590°,
   wherein amounts in mole percent on an oxide basis of $SiO_2$, $B_2O_3$, the one or more alkali metal oxides, $Al_2O_3$, and the one or more alkaline earth metal oxides, satisfy the relationships:

$$(R_2O+R'O) \geq Al_2O_3, \text{ and } 0.80 < (1-[(2R_2O+2R'O)/(SiO_2+2Al_2O_3+2B_2O_3)]) < 0.93,$$

where $R_2O$ is the sum of the concentrations of the one or more alkali metal oxides and $R'O$ is the sum of the concentrations of the one or more alkaline earth metal oxides,
   wherein, when the borosilicate glass composition is formed into a glass article comprising a thickness that is 2.1 mm, the glass article exhibits a visible transmission through the glass article as measured according to ISO 13837A of at least 73%.

2. The borosilicate glass composition of claim 1, further comprising:
   a combined amount of $Na_2O$ and $K_2O$ that is greater than or equal to 5.5 mol %; and
   a combined amount of CaO and MgO that is at greater than or equal to 1.5 mol %.

3. The borosilicate glass composition of claim 2, wherein the combined amount of CaO and MgO is less than or equal to 2.5 mol %.

4. The borosilicate glass composition of claim 2, wherein the borosilicate glass composition comprises $Na_2O$ in an amount greater than or equal to 5 mol % and less than or equal to 8 mol %.

5. The borosilicate glass composition of claim 4, wherein the borosilicate glass composition comprises $Al_2O_3$ in an amount greater than or equal to 3.0 mol % and less than or equal to 5.0 mol %.

6. The borosilicate glass composition of claim 5, wherein the amounts in mole percent on an oxide basis of $Na_2O$ and $Al_2O_3$ satisfy the relationship $Na_2O > Al_2O_3 + 1.25$.

7. The borosilicate glass composition of claim 6, wherein a ratio of an amount of $K_2O$ in the borosilicate glass composition to the amount of $Na_2O$ is greater than or equal to 0.1 and less than or equal to 0.75.

8. The borosilicate glass composition of claim 1, wherein the amount of $B_2O_3$ is greater than or equal to 12.07 mol % and less than or equal to 13.8 mol %.

9. The borosilicate glass composition of claim 8, further comprising an amount of $SiO_2$ that is greater than or equal to 72 mol %.

10. The borosilicate glass composition of claim 9, wherein the amount of $SiO_2$ is greater than or equal to 74 mol %.

11. The borosilicate glass composition of claim 10, wherein the amounts in mole percent on an oxide basis of $SiO_2$, $B_2O_3$, the one or more alkali metal oxides, $Al_2O_3$, and the one or more alkaline earth metal oxides, satisfy the relationship $(R_2O+R'O) \geq (Al_2O_3+2)$.

12. The borosilicate glass composition of claim 1, wherein the annealing point is greater than or equal to 540° and less than or equal to 590°.

13. The borosilicate glass composition of claim 12, wherein the borosilicate glass composition comprises a strain point that is greater than or equal to 480° and less than or equal to 520°.

14. The borosilicate glass composition of claim 13, wherein a viscosity of the borosilicate glass composition is 200 P at a temperature ($T_{200P}$) that is greater than or equal to 1525° C. and less than or equal to 1725° C.

15. The borosilicate glass composition of claim 14, wherein the borosilicate glass composition comprises a liquidus viscosity that is greater than or equal to 500 kP.

16. The borosilicate glass composition of claim 1, wherein the borosilicate glass composition comprises a sag temperature that is greater than or equal to 590° and less than or equal to 630°.

17. The borosilicate glass composition of claim 1, comprising a density of less than 2.3 g/cm³.

18. The borosilicate glass composition of claim 1, comprising low temperature coefficient of thermal expansion that is 5.6 ppm/° C. that or less.

19. A borosilicate glass composition comprising:
   $SiO_2$ in an amount greater than or equal to 72 mol % and less than or equal to 85 mol %;
   $B_2O_3$ in an amount greater than or equal to 12 mol %;
   $Al_2O_3$ in an amount greater than or equal to 2 mol % and less than or equal to 5 mol %;
   one or more alkali metal oxides, including $Na_2O$ in an amount that is greater than or equal to 4 mol % and less than or equal to 8 mol % and greater than the amount of $Al_2O_3$;
   one or more alkaline earth metal oxides;
   a total amount of $Na_2O$, $K_2O$, $MgO$, and $CaO$ that is greater than or equal to 7.0 mol %;
   an annealing point that is greater than or equal to 520° and less than or equal to 590°; and
   a strain point that is greater than or equal to 490° and less than or equal to 560°, wherein a viscosity of the borosilicate glass composition is 200 P at a temperature ($T_{200P}$) that is greater than or equal to 1525° C. and less than or equal to 1725° C.,
   wherein, when the borosilicate glass composition is formed into a glass article comprising a thickness that is 2.1 mm, the glass article exhibits a visible transmission through the glass article as measured according to ISO 13837A of at least 73%.

20. The borosilicate glass composition of claim 19, further comprising:
   a combined amount of $Na_2O$ and $K_2O$ that is greater than or equal to 5.5 mol %; and
   a combined amount of CaO and MgO that is at greater than or equal to 1.5 mol % and less than or equal to 2.5 mol.

21. The borosilicate glass composition of claim 19, wherein the amount of $SiO_2$ is greater than or equal to 74 mol %.

22. The borosilicate glass composition of claim 19, wherein amounts in mole percent on an oxide basis of $SiO_2$, $B_2O_3$, the one or more alkali metal oxides, $Al_2O_3$, and the one or more alkaline earth metal oxides, satisfy the relationships:

$(R_2O+R'O) \geq Al_2O_3$, and $0.80 < (1-[(2R_2O+2R'O)/(SiO_2+2Al_2O_3+2B_2O_3)]) < 0.93$, where $R_2O$ is the sum of the concentrations of the one or more alkali metal oxides and R'O is the sum of the concentrations of the one or more alkaline earth metal oxides.

23. The borosilicate glass composition of claim 22, wherein the amounts in mole percent on an oxide basis of $SiO_2$, $B_2O_3$, the one or more alkali metal oxides, $Al_2O_3$, and the one or more alkaline earth metal oxides, satisfy the relationship $(R_2O+R'O) \geq (Al_2O_3+2)$.

24. The borosilicate glass composition of 23, wherein the amounts of $Na_2O$ and $Al_2O_3$ satisfy the relationship $Na_2O > Al_2O_3+1.25$.

25. The borosilicate glass composition of 24, wherein a ratio of an amount of $K_2O$ in the borosilicate glass composition to the amount of $Na_2O$ is greater than or equal to 0.1 and less than or equal to 0.75.

26. The borosilicate glass composition of claim 19, wherein the borosilicate glass composition comprises a liquidus viscosity that is greater than or equal to 500 kP.

27. The borosilicate glass composition of claim 19, wherein the borosilicate glass composition comprises a sag temperature that is greater than or equal to 590° and less than or equal to 630°.

28. The borosilicate glass composition of claim 19, further comprising $Fe_2O_3$ in an amount greater than or equal to 0.03 mol % and less than or equal to 0.5 mol %.

29. The borosilicate glass composition according claim 19, comprising a density of less than 2.3 g/cm³.

30. The borosilicate glass composition of claim 19, comprising low temperature coefficient of thermal expansion that is 5.6 ppm/° C. that or less.

* * * * *